(12) United States Patent
Ettehadieh

(10) Patent No.: US 10,973,207 B1
(45) Date of Patent: Apr. 13, 2021

(54) TREAT DISPENSING PET TOY

(71) Applicant: Aslan Ettehadieh, Falls Church, VA (US)

(72) Inventor: Aslan Ettehadieh, Falls Church, VA (US)

( * ) Notice: Subject to any disclaimer, the term of this patent is extended or adjusted under 35 U.S.C. 154(b) by 0 days.

(21) Appl. No.: 16/868,450

(22) Filed: May 6, 2020

(51) Int. Cl.
*A01K 15/02* (2006.01)
*A01K 5/00* (2006.01)

(52) U.S. Cl.
CPC .............. *A01K 15/025* (2013.01); *A01K 5/00* (2013.01)

(58) Field of Classification Search
CPC ........ D06F 37/225; D06F 37/22; D06F 37/24; D06F 2101/02; D06F 2202/06; D06F 2202/12; D06F 2222/00; D06F 23/02; D06F 23/04; D06F 33/00; D06F 33/37; D06F 35/005; D06F 37/20; D06F 37/203; D06F 37/245; D06F 37/265; D06F 39/022; A01K 31/18; A01K 5/00; A01K 15/026; A01K 29/005; A01K 31/005; A01K 31/007; A01K 31/02; A01K 31/06; A01K 45/005; A01K 7/00; A63H 33/04; A63H 2027/1075; A63H 33/108; A63H 3/16; A63F 13/812; A63F 7/04; A63F 7/042
See application file for complete search history.

(56) References Cited

U.S. PATENT DOCUMENTS

| | | | | | |
|---|---|---|---|---|---|
| 3,106,397 | A | * | 10/1963 | Lacey | A63B 43/04 473/571 |
| 5,332,221 | A | * | 7/1994 | Reed | A63F 7/044 273/109 |
| 5,664,524 | A | * | 9/1997 | Piglia | A01K 1/03 119/452 |
| 5,768,917 | A | * | 6/1998 | Freida | D06F 39/024 206/0.5 |
| 7,389,748 | B2 | * | 6/2008 | Shatoff | A01K 15/025 119/702 |
| 9,566,520 | B2 | * | 2/2017 | Naum | A63H 33/18 |
| 2013/0055965 | A1 | * | 3/2013 | Valle | A01K 15/025 119/710 |

* cited by examiner

*Primary Examiner* — Timothy D Collins
*Assistant Examiner* — Brittany A Lowery
(74) *Attorney, Agent, or Firm* — Aslan Law, P.C.

(57) ABSTRACT

A treat dispensing apparatus (toy) for dispensing treats and/or food to a pet. The toy may include for example at least four main tubes extending outward in different directions, each in a straight linear fashion from a central location. The toy may also include one or more exit hole(s) for allowing treat(s) to exit out of the toy via the exit hole(s). In addition, the tubes may be hollow to allow for treats to move back and forth inside the toy until treats are able to exit out when the toy is being thrown, bounced, etc.

14 Claims, 30 Drawing Sheets

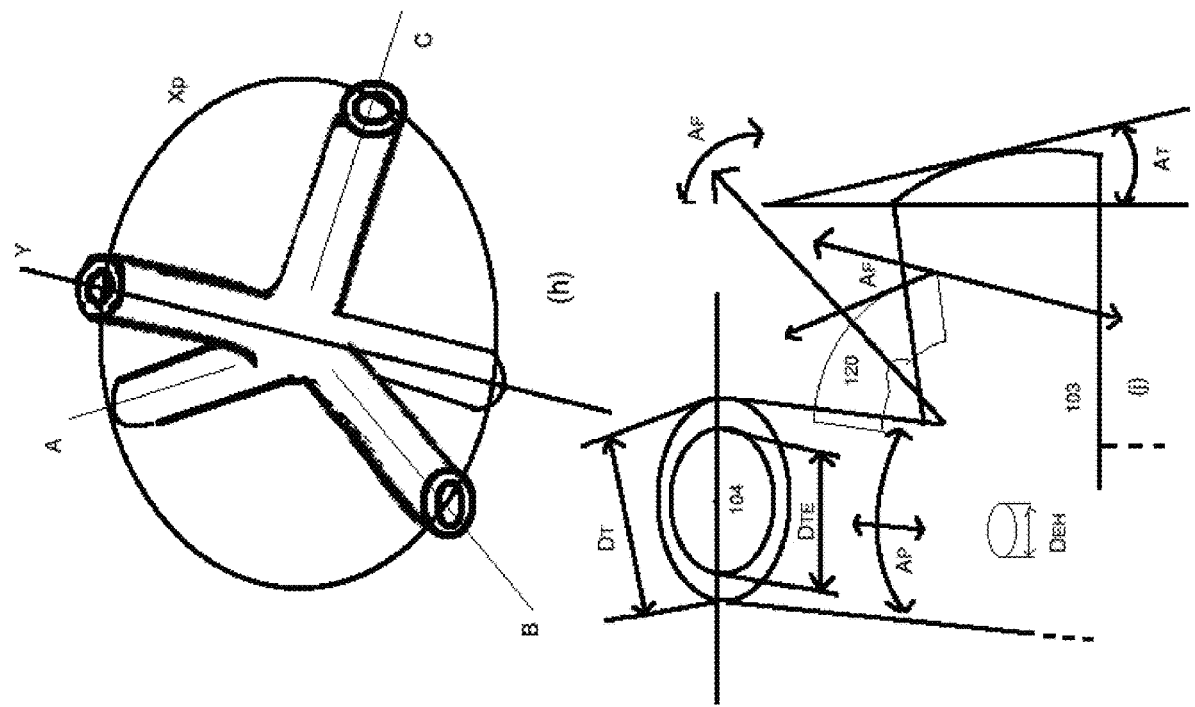
FIG. 3B
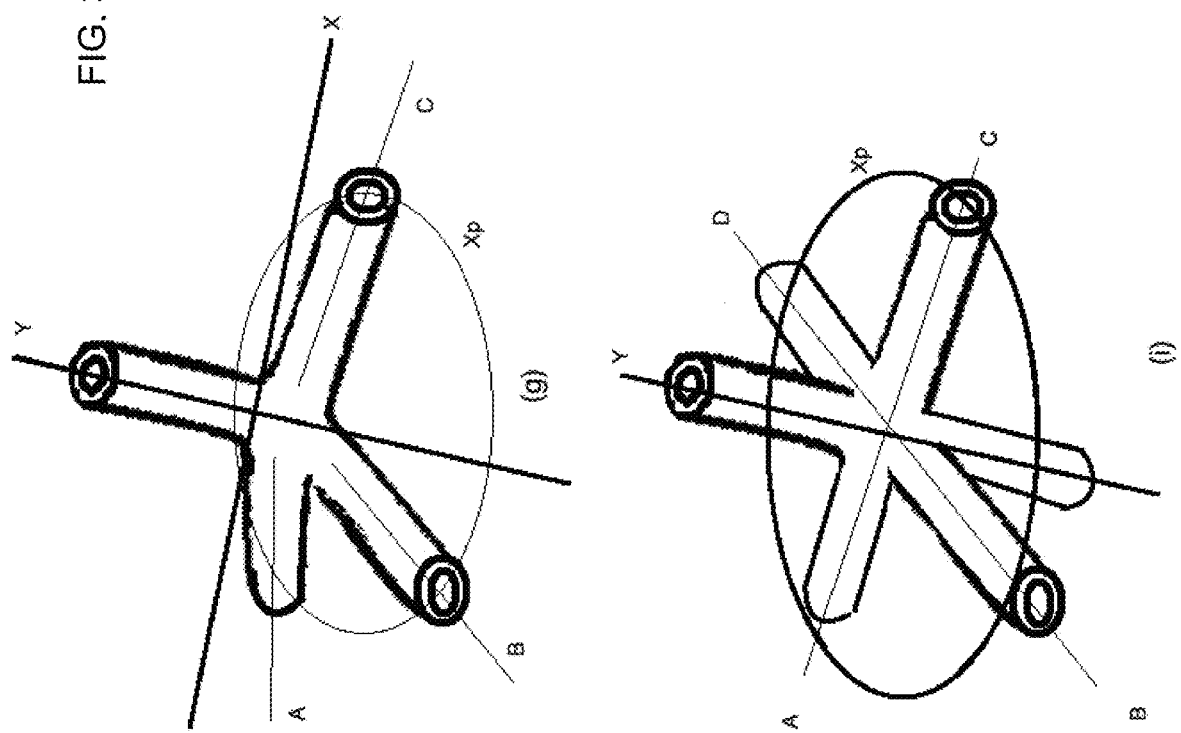

TREAT DISPENSING PET TOY

FIELD OF THE INVENTION

The present disclosure generally relates to a treat dispensing toy and/or an interactive food dispensing apparatus. More specifically, the present disclosure generally relates to an apparatus/product having a structure that is capable of dispensing food and/or treats for pets by bouncing, rolling, being thrown, etc. For example, the structure may have a plurality of hollow tubular extending arms that connect to each other via a hollow center portion whereby the center portion has at least an exit hole, wherein at least one of the tube ends is completely open so that treats can be filled into the apparatus and a cover and/or cap may be used to seal the tube end and wherein the treat is to pass through the center portion into the tubes and exit out the exit hole.

This toy helps slow down a pet's eating, increase caloric burn per food consumed, etc. In addition, this toy is especially beneficial for a pet that does not have the ability to go out and play (due to e.g., limited outdoor (unleased) resources, limited space, physically disabilities (hip/joint pain), etc.), etc. Accordingly, this toy has been designed to provide pets (and their owners) so many benefits for the pet's interactive play and eating.

BACKGROUND

In nature, animals hunt or scavenge for food resources. These activities take up a lot of their time and involve great physical exertion such as roaming large areas, chasing and digging; problem-solving; use of their senses of hearing, taste and smell; and social coordination.

In our homes, food is provided to our pets in a bowl or even a slow feeder. This type of eating goes against the fundamental nature of animals by removing a major source of stimulation and activity in their lives. Furthermore, this encourages overeating as our pets as they do not tend to stop eating when they are full.

While slow feeders might slightly increase the time it takes for eating a meal, there is still a need for increase exercise, increase play, increased stimulation, etc. One possible fun and/or humane method to increase exercise and/or increase stimulation and/or reduce the amount of food our animal companions eat is to make eating more challenging by placing dry dog food in a toy which will slowly dispense the dog food that requires being shaken or upended. The pet must then work to get the food out of the toy. This slows down the eating so that the mealtime lasts longer, and the pet eats less. It also challenges the pet mentally and physically.

However, there are only a few options in treat dispensing toys for our animal companions. And, these few options are not well thought out to provide better interaction, more fun, etc.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

Aspects of the present invention provide a treat dispensing apparatus for dispensing treats and/or food to a pet, the treat dispensing apparatus comprising for example a first tube; a first tube end; a second tube; a second tube end; a third tube; a third tube end; a fourth tube; a fourth tube end; a center portion; and at least one exit hole for allowing a treat for said pet to pass through said at least one exit hole, wherein the center portion is connected to the first tube, the center portion is connected to the second tube, the center portion is connected to the third tube, the center portion is connected to the fourth tube, the center portion is located between the first tube, the second tube, the third tube and the fourth tube, the first tube is a different tube than the second tube, the first tube is a different tube than the third tube, the first tube is a different tube than the fourth tube, the second tube is a different tube than the third tube, the second tube is a different tube than the fourth tube, the third tube is a different tube than the fourth tube, the first tube end is a different end than the second tube end, the first tube end is a different end than the third tube end, the first tube end is a different end than the fourth tube end, the second tube end is a different end than the third tube end, the second tube end is a different end than the fourth tube end, the third tube end is a different end than the fourth tube end, the first tube extends or projects in a first direction from the center portion to the first tube end, the second tube extends or projects in a second direction from the center portion to the second tube end, the third tube extends or projects in a third direction from the center portion to the third tube end, the fourth tube extends or projects in a fourth direction from the center portion to the fourth tube end, the first direction is a different direction than the second direction, the first direction is a different direction than the third direction, the first direction is a different direction than the fourth direction, the second direction is a different direction than the third direction, the second direction is a different direction than the fourth direction, the third direction is a different direction than the fourth direction, at least the first tube is hollow from the center portion to the first tube end, the center portion is hollow, said at least one exit hole is located at the center portion, along the first tube or at the intersection between the center portion and the first tube, and the first tube end is open to the ambient and/or the external environment.

In at least one embodiment, the first tube and the second tube extend or project along a first plane, the first tube and the third tube extend or project along a second plane, the first tube and the fourth tube extend or project along a third plane, the second tube and the third tube extend or project along a fourth plane, the second tube and the fourth tube extend or project along a fifth plane, the third tube and the fourth tube extend or project along a sixth plane, the first plane is a different plane as the second plane, the first plane is a different plane than the third plane, the first plane is a different plane than the fourth plane, the second plane is a different plane than the third plane, the second plane is a different plane than the fourth plane, and the third plane is a different plane than the fourth plane.

In at least one embodiment, the angle of extension or projection between the second tube and the third tube, the angle of extension or projection between the third tube and the fourth tube, and the angle of extension or projection between the fourth tube and the second tube totals between 30 and 345 degrees, the angle of extension or projection between the first tube and the second tube is greater than 90 degrees, the angle of extension or projection between the first tube and the third tube is greater than 90 degrees, the angle of extension or projection between the first tube and the fourth tube is greater than 90 degrees, the angle of extension or projection between the first tube and the second tube is less than 180 degrees, the angle of extension or projection between the first tube and the third tube is less than 180 degrees, and the angle of extension or projection between the first tube and the fourth tube is less than 180 degrees.

In at least one embodiment, the angle of extension or projection between the second tube and the third tube, the angle of extension or projection between the third tube and the fourth tube, and the angle of extension or projection between the fourth tube and the second tube totals between 60 and 330 degrees, the angle of extension or projection between the first tube and the second tube is greater than 100 degrees, the angle of extension or projection between the first tube and the third tube is greater than 100 degrees, the angle of extension or projection between the first tube and the fourth tube is greater than 100 degrees, the angle of extension or projection between the first tube and the second tube is less than 160 degrees, the angle of extension or projection between the first tube and the third tube is less than 160 degrees, and the angle of extension or projection between the first tube and the fourth tube is less than 160 degrees.

In at least one embodiment, the second tube is hollow from the center portion to the second tube end, the third tube is hollow from the center portion to the third tube end, and the fourth tube is hollow from the center portion to the fourth tube end.

In at least one embodiment, the treat dispensing apparatus may also include a fifth tube; a fifth tube end; the center portion is connected to the fifth tube, the center portion is located between the first tube, the second tube, the third tube, the fourth tube and the fifth tube, the fifth tube is a different tube than the first tube, the fifth tube is a different tube than the second tube, the fifth tube is a different tube than the third tube, the fifth tube is a different tube than the fourth tube, the fifth tube end is a different tube end than the first tube end, the fifth tube end is a different tube end than the second tube end, the fifth tube end is a different tube end than the third tube end, the fifth tube end is a different tube end than the fourth tube end, the fifth tube extends or projects in a fifth direction from the center portion to the fifth tube end, the fifth direction is a different direction than the first direction, the fifth direction is a different direction than the second direction, the fifth direction is a different direction than the third direction, and the fifth direction is a different direction than the fourth direction.

In at least one embodiment, the first tube extends or projects in the first direction along a first axis, the second tube extends or projects in the second direction along a second axis, the angle of extension or projection between the first axis and the second axis is between 0.0 degrees and 10.0 degrees, the angle of extension or projection between the third tube and the first tube is between 80 and 100 degrees, the angle of extension or projection between the third tube and the second tube is between 80 and 100 degrees, the angle of extension or projection between the fourth tube and the first tube is between 80 and 100 degrees, the angle of extension or projection between the fourth tube and the second tube is between 80 and 100 degrees, the angle of extension or projection between the fifth tube and the first tube is between 80 and 100 degrees, and the angle of extension or projection between the fifth tube and the second tube is between 80 and 100 degrees.

In at least one embodiment, the first tube extends or projects in the first direction along a first axis, the second tube extends or projects in the first direction along the first axis, the first tube and the second tube extend or project in opposite directions, the third tube extends or projects in the third direction along a third axis, the third axis is perpendicular to the first axis, the fourth tube extends or projects in the fourth direction along a fourth axis, the fourth axis is perpendicular to the first axis, the fifth tube extends or projects in the fifth direction along a fifth axis, and the fifth axis is perpendicular to the first axis.

In at least one embodiment, the first tube extends or projects in the first direction along a first axis, the second tube extends or projects in the first direction along the first axis, the first tube and the second tube extend or project in opposite directions, the third tube extends or projects along a first plane, the fourth tube extends or projects along a second plane, the fifth tube extends or projects along a third plane, the angle of extension or projection between the first plane and the first axis is between 80 and 100 degrees, the angle of extension or projection between the second plane and the first axis is between 80 and 100 degrees, and the angle of extension or projection between the third plane and the first axis is between 80 and 100 degrees.

In at least one embodiment, the second tube is hollow from the center portion to the second tube end, the third tube is hollow from the center portion to the third tube end, the fourth tube is hollow from the center portion to the fourth tube end, and the fifth tube is hollow from the center portion to the fifth tube end.

In at least one embodiment, the first tube extends or projects substantially along a first axis, the second tube extends or projects substantially along the first axis, the first tube and the second tube extend or project in substantially two opposite directions, the third tube extends or projects in the third direction along a first plane, the fourth tube extends or projects in the fourth direction along the first plane, the fifth tube extends or projects in the fifth direction along the first plane, the first plane intersects the first axis, and the first plane is substantially perpendicular to the first axis.

In at least one embodiment, the treat dispensing apparatus may also include a fifth tube; a fifth tube end; a sixth tube, a sixth tube end, the center portion is connected to the fifth tube, the center portion is connected to the sixth tube, the center portion is located between the first tube, the second tube, the third tube, the fourth tube, the fifth tube and the sixth tube, the fifth tube is a different tube than the first tube, the fifth tube is a different tube than the second tube, the fifth tube is a different tube than the third tube, the fifth tube is a different tube than the fourth tube, the sixth tube is a different tube than the first tube, the sixth tube is a different tube than the second tube, the sixth tube is a different tube than the third tube, the sixth tube is a different tube than the fourth tube, the sixth tube is a different tube than the fifth tube, the fifth tube end is a different tube end than the first tube end, the fifth tube end is a different tube end than the second tube end, the fifth tube end is a different tube end than the third tube end, the fifth tube end is a different tube end than the fourth tube end, the sixth tube end is a different tube end than the first tube end, the sixth tube end is a different tube end than the second tube end, the sixth tube end is a different tube end than the third tube end, the sixth tube end is a different tube end than the fourth tube end, the sixth tube end is a different tube end than the fifth tube end, the fifth tube extends or projects in a fifth direction from the center portion to the fifth tube end, the fifth direction is a different direction than the first direction, the fifth direction is a different direction than the second direction, the fifth direction is a different direction than the third direction, the fifth direction is a different direction than the fourth direction, the sixth tube extends or projects in a sixth direction from the center portion to the sixth tube end, the sixth direction is a different direction than the first direction, the sixth direction is a different direction than the second direction, the sixth direction is a different direction than the third direction, the sixth direction is a different direction than the fourth direction, and the sixth direction is a different direction than the fifth direction.

In at least one embodiment, the first tube extends or projects in the first direction along a first axis, the second tube extends or projects in the second direction along a second axis, the angle of extension or projection between the first axis and the second axis is between 0.0 degrees and 10.0 degrees, the angle of extension or projection between the third tube and the first tube is between 80 and 100 degrees, the angle of extension or projection between the third tube and the second tube is between 80 and 100 degrees, the angle of extension or projection between the fourth tube and the first tube is between 80 and 100 degrees, the angle of extension or projection between the fourth tube and the second tube is between 80 and 100 degrees, the angle of extension or projection between the fifth tube and the first tube is between 80 and 100 degrees, the angle of extension or projection between the fifth tube and the second tube is between 80 and 100 degrees, the angle of extension or projection between the sixth tube and the first tube is between 80 and 100 degrees, and the angle of extension or projection between the sixth tube and the second tube is between 80 and 100 degrees.

In at least one embodiment, the first tube extends or projects in the first direction along a first axis, the second tube extends or projects in the first direction along the first axis, the first tube and the second tube extend or project in opposite directions, the third tube extends or projects in the third direction along a third axis, the third axis is perpendicular to the first axis, the fourth tube extends or projects in the fourth direction along a fourth axis, the fourth axis is perpendicular to the first axis, the fifth tube extends or projects in the fifth direction along a fifth axis, the fifth axis is perpendicular to the first axis, the sixth tube extends or projects in the sixth direction along a sixth axis, and the sixth axis is perpendicular to the first axis.

In at least one embodiment, the first tube extends or projects in the first direction along a first axis, the second tube extends or projects in the first direction along the first axis, the first tube and the second tube extend or project in opposite directions, the third tube extends or projects along a first plane, the fourth tube extends or projects along a second plane, the fifth tube extends or projects along a third plane, the fifth tube extends or projects along a fourth plane, the angle of extension or projection between the first plane and the first axis is between 80 and 100 degrees, the angle of extension or projection between the second plane and the first axis is between 80 and 100 degrees, the angle of extension or projection between the third plane and the first axis is between 80 and 100 degrees, and the angle of extension or projection between the fourth plane and the first axis is between 80 and 100 degrees.

In at least one embodiment, the first tube and the second tube extend or project in opposite directions along a first axis, the third tube and the fourth tube extend or project in opposite directions along a second axis, and the fifth tube and the sixth tube extend or project in opposite directions along a third axis.

In at least one embodiment, the second tube is hollow from the center portion to the second tube end, the third tube is hollow from the center portion to the third tube end, the fourth tube is hollow from the center portion to the fourth tube end, the fifth tube is hollow from the center portion to the fifth tube end, and the sixth tube is hollow from the center portion to the sixth tube end.

In at least one embodiment, the first tube extends or projects substantially along a first axis, the second tube extends or projects substantially along the first axis, the first tube and the second tube extend or project in substantially two opposite directions, the third tube extends or projects in the third direction along a first plane, the fourth tube extends or projects in the fourth direction along the first plane, the fifth tube extends or projects in the fifth direction along the first plane, the sixth tube extends or projects in the fifth direction along the first plane, the first plane intersects the first axis, and the first plane is substantially perpendicular to the first axis.

In at least one embodiment, the treat dispensing apparatus may also include a first connecting tube directly connecting the first tube to the second tube; a second connecting tube directly connecting the first tube to the third tube, a third connecting tube directly connecting the first tube to the fourth tube, a fourth connecting tube directly connecting the first tube to the fifth tube, a fifth connecting tube directly connecting the second tube to the third tube, a sixth connecting tube directly connecting the second tube to the fifth tube, a seventh connecting tube directly connecting the second tube to the sixth tube, an eight connecting tube directly connecting the third tube to the fourth tube, a ninth connecting tube directly connecting the third tube to the sixth tube, a tenth connecting tube directly connecting the fourth tube to the fifth tube, an eleventh connecting tube directly connecting the fourth tube to the sixth tube, and a twelfth connecting tube directly connecting the fifth tube to the sixth tube. It should be noted that, according to one or more embodiments, one or more connecting tubes (hollow and/or solid) may also be a protruding wall member.

In at least one embodiment, one or more of the connecting tubes may connect from the tip of one main tube end to the tip of another main tube end.

In at least one embodiment, one or more of the connecting tubes may connect from the center of one main tube end to the center of another main tube end.

In at least one embodiment, one or more of the connecting tubes may extend from the one main tube end to another main tube end by three or more extending portions that extend in three or more different angles, either or both straight and/or curved.

In at least one embodiment, one or more of the connecting tubes may be straight, curved shaped, an obtuse U shape with straight members, an obtuse U shape with curved members, an obtuse U shape with curved and straight members, etc.

In at least one embodiment, the apparatus 100 that includes the connecting tube is in the shape of a squared cube, a rounded cube, a ball, a sphere, an octagonal shape, etc.

In at least one embodiment, the second tube is hollow from the center portion to the second tube end, the third tube is hollow from the center portion to the third tube end, and the fourth tube is hollow from the center portion to the fourth tube end.

In at least one embodiment, the second tube end is open to the ambient and/or the external environment, the third tube end is open to the ambient and/or the external environment, and the fourth tube end is open to the ambient and/or the external environment.

In at least one embodiment, the treat dispensing apparatus may also include a first closing and/or sealing member configured to close and/or seal the first tube end, a second closing and/or sealing member configured to close and/or seal the second tube end, a third closing and/or sealing member configured to close and/or seal the third tube end, and a fourth closing and/or sealing member configured to close and/or seal the fourth tube end.

In at least one embodiment, the second tube end is closed to the ambient and/or the external environment, the third tube end is closed to the ambient and/or the external environment, and the fourth tube end is closed to the ambient and/or the external environment.

In at least one embodiment, the treat dispensing apparatus may also include a closing and/or sealing member configured to close and/or seal the first tube end.

In at least one embodiment, the internal circumference of said hollow first tube is at least 0.875 inches, the internal circumference of the tube end is at least 0.875 inches, and the circumference of said at least one exit hole is at least 0.375 inches Aspects of the present invention provide a treat dispensing system wherein the treat dispensing system include the treat dispensing apparatus according to one or more embodiments and for example a container for encapsulating the treat dispensing apparatus, wherein the container includes a first structural piece; a second structural piece; and a first exit port hole, wherein the first structural piece is a structure that is separate from the second structural piece, the first structural piece is a structure that is separate from the treat dispensing apparatus, the second structural piece is a structure that is separate from the treat dispensing apparatus, the first exit port hole is located on either the first structural piece or the second structural piece, and the first exit port hole aligns with the first tube end creating an opening in the case that the container encapsulates the treat dispensing apparatus.

Aspects of the present invention provide a treat dispensing system wherein the treat dispensing system include the treat dispensing apparatus according to one or more embodiments and for example a container for encapsulating the treat dispensing apparatus, wherein the container includes a first structural piece; a second structural piece; a first exit port hole; a second exit port hole, wherein the first structural piece is a structure that is separate from the second structural piece, the first structural piece is a structure that is separate from the treat dispensing apparatus, the second structural piece is a structure that is separate from the treat dispensing apparatus, the first exit port hole is located on either the first structural piece or the second structural piece, the second exit port hole is located on either the first structural piece or the second structural piece, the first structural piece includes either the first exit port hole or the second exit port hole, the second structural piece includes either the first exit port hole or the second exit port hole, and the first exit port hole aligns with the first tube end creating an opening in the case that the container encapsulates the treat dispensing apparatus.

Aspects of the present invention provide a treat dispensing apparatus for dispensing treats and/or food to a pet, the treat dispensing apparatus includes a first structural piece in the shape of a first hemisphere or a first partial Platonic solid; a second structural piece in the shape of a second hemisphere or a second partial Platonic solid; and a first exit port hole; a second exit port hole, wherein the first structural piece is a structure that is separate from the second structural piece, the first exit port hole is located on the first structural piece, and the second exit port hole is located on the second structural piece.

In at least one embodiment, the treat dispensing apparatus may also include one or more first protrusions; and one or more second protrusions, wherein said one or more first protrusions is/are affixed to the inside of the first structural piece, said one or more second protrusions is/are affixed to the inside of the second structural piece, said one or more first protrusions extend or protrude from the inside surface of the first structural piece towards and extend or protrude away from the inside surface of the first structural piece, and said one or more second protrusions extend or protrude from the inside surface of the second structural piece towards and extend or protrude away from the inside surface of the second structural piece.

Aspects of the present invention provide a treat dispensing apparatus for dispensing treats and/or food to a pet, the treat dispensing apparatus including a container with an open area; a first exit port; a second exit port; a first tube; a first tube end; a second tube; a second tube end; a center portion; and at least one exit hole for allowing a treat for said pet to pass through said at least one exit hole, wherein the container is directly connected to the first exit port, the container is directly connected to the second exit port, the container is directly connected to the first tube, the first tube is directly connected to the first tube end, the center portion is directly connected to the first tube, the center portion is directly connected to the second tube, the second tube is directly connected to the second tube end, the container, the first exit port, the first tube end, the first tube, the center portion, the second tube, the second tube end and the second exit port are connected to each other to form a single unitary unit/piece, the first tube passing through the open area of the container, a first portion of the first tube is located in the inside area of the container, a second portion of the first tube is located outside the inside area of the container, and the first tube end is located outside of the container.

In at least one embodiment, the treat dispensing apparatus (100 and/or 200) may also include a first protruding wall (e.g., protruding wall member) between the first tube and the second tube and/or between the first exit port and the second exit port; a second protruding wall between the first tube and the third tube and/or between the first exit port and the third exit port, a third protruding wall between the first tube and the fourth tube and/or between the first exit port and the fourth exit port, a fourth protruding wall between the first tube and the fifth tube and/or between the first exit port and the fifth exit port, a fifth protruding wall between the second tube and the third tube and/or between the second exit port and the third exit port, a sixth protruding wall between the second tube and the fifth tube and/or between the second exit port and the fifth exit port, a seventh protruding wall between the second tube and the sixth tube and/or between the second exit port and the sixth exit port, an eight protruding wall between the third tube and the fourth tube and/or between the third exit port and the fourth exit port, a ninth protruding wall between the third tube and the sixth tube and/or between the third exit port and the sixth exit port, a tenth protruding wall between the fourth tube and the fifth tube and/or between the fourth exit port and the fifth exit port, an eleventh protruding wall between the fourth tube and the sixth tube, and/or between the fourth exit port and the sixth exit port, and/or a twelfth protruding wall between the fifth tube and the sixth tube and/or between the fifth exit port and the sixth exit port.

Further scope of applicability of the present invention will become apparent from the Detailed Description given below. However, it should be understood that the Detailed Description and specific examples, while indicating preferred embodiments of the invention, are given by way of illustration only, since various changes and modifications within the spirit and scope of the invention will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

FIGS. 3A and 3B are examples of a food/treat dispensing device/apparatus 100 for pets according to one or more embodiments described herein.

Figure 1:
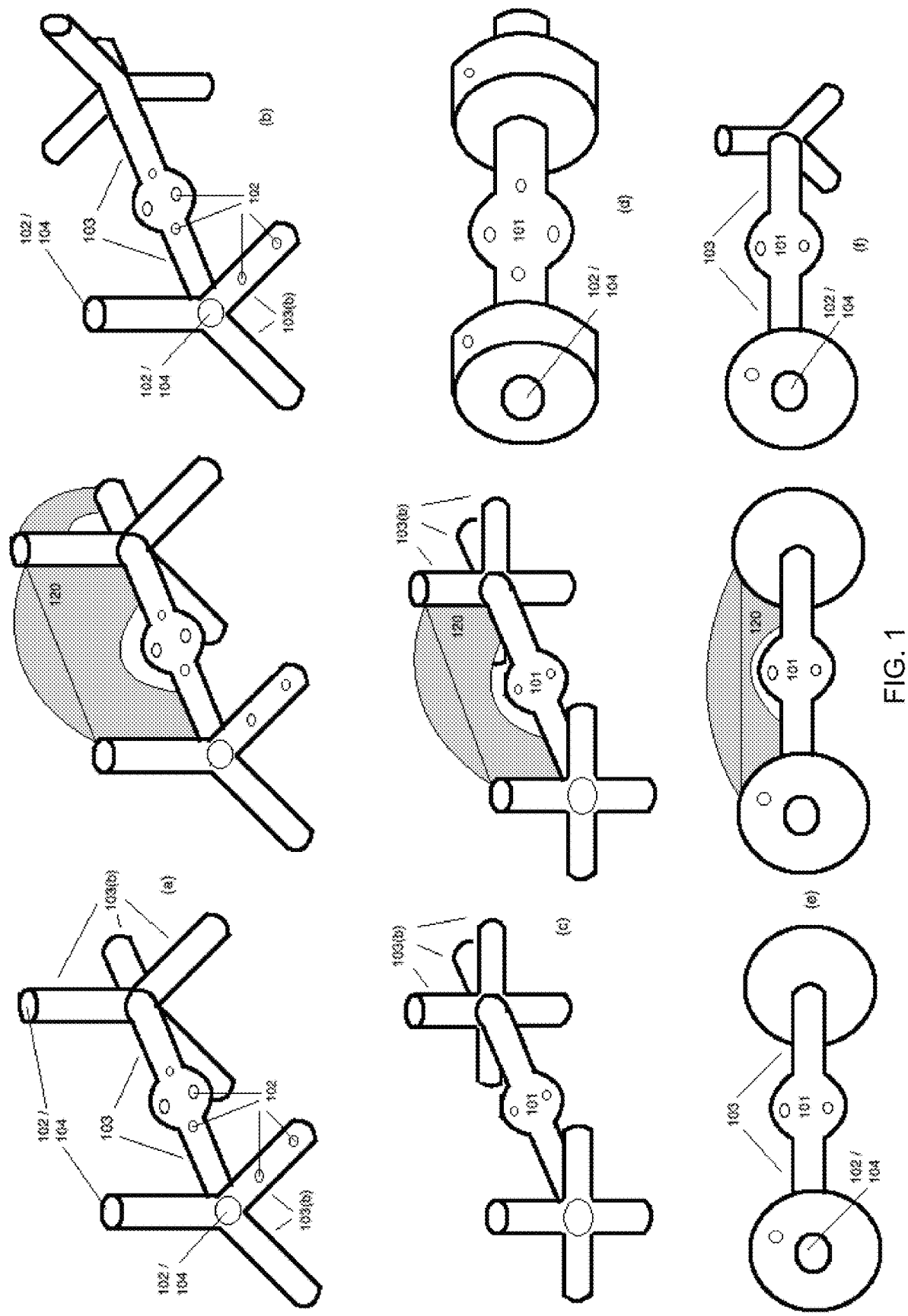
FIG. 1 is a food/treat dispensing device/apparatus 100 for pets according to one or more embodiments described herein.

The headings provided herein are for convenience only and do not necessarily affect the scope or meaning of the claimed invention.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

This disclosure is not limited to the particular apparatus/system as described, as these may vary. The terminology used in the description is for the purpose of describing the particular versions or embodiments only, and is not intended to limit the scope. Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other obvious features not described in detail herein. Additionally, some well-known structures or functions may not be shown or described in detail below, so as to avoid unnecessarily obscuring the relevant description.

Descriptions of well-known starting materials, processing techniques, components and equipment may be omitted so as not to unnecessarily obscure the invention in detail. It should be understood, however, that the detailed description and the specific examples, while indicating (e.g., preferred) embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

The following terms shall have, for the purposes of this application, the respective meanings set forth below.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "i.e.," " . . . one embodiment," " . . . an embodiment," " . . . one or more embodiments," and " . . . at least one embodiment" and the like.

It should be noted that each and every featured disclosed herein may be used interchangeably in any combination. More specifically, each and every feature disclosed in any one embodiment may be used with each and every feature disclosed in another embodiment. For example, one or more treat exiting holes may be located in the center portion and/or along one or more of the tubes.

At least FIGS. 1-21 illustrate a food/treat dispensing device/apparatus 100 (and/or device/apparatus/container/sphere 200) for pets according to one or more embodiments described herein. More specifically, at least FIGS. 1-21 illustrate some examples on how the food/treat dispensing device/apparatus 100 (and/or device/apparatus/container/sphere 200) may have one or more (hollow) center portion(s) 101 (e.g., an internal cavity 101, a main component 101, a central compartment 101), and/or have one or more (hollow) tubes 103 (e.g., auxiliary components 103, extending members 103) connecting to the one or more center portion(s) 101, have one or more exit holes (e.g., exit holes having a smaller circumference than the inner circumference of the tubes and/or the center portions), each tube end having either a tube end cap or being permanently sealed off, and/or etc. While at least FIGS. 1-21 illustrate some examples of one or more center portions 101 with at least one tube, two tubes, three tubes, four tubes, five tubes, six tubes, etc. 103, the food/treat dispensing device/apparatus 100 (and/or device/apparatus/container/sphere 200) that may have an intersection area/portion (center portion) 101 comprised of only the area where all (or some) of the tubes meet and/or intersect (e.g., FIG. 4, FIG. 15B(a), FIG. 15B(b), etc.), and/or an intersection area/portion 101 being more than just the area comprised of the area where the tubes meet e.g., a round/container/sphere/square/rectangular/etc. shape where tubes extend outward from the round/container/sphere/square/rectangular/etc. shape (e.g., FIG. 3(d), FIG. 3(e), FIG. 3(f), FIG. 15B(c), FIG. 15B(d), etc.), and/or at least two center portions connected to each via one or more (major and/or minor) tube(s), and/or three center portions connected via one or more (major and/or minor) tube(s), etc. and/or only one tube, seven tubes, eight tubes, nine tubes, etc. 103 with any configuration(s) of tube types, center portion configurations, etc. While at least FIGS. 1-21 may illustrate only one center portion 101, the food/treat dispensing device/apparatus 100 (and/or device/apparatus/container/sphere 200) may also have tubes being connected to more than one center portion 101 with any configuration(s) of tube types, center portion configuration(s), etc. For example, one center portion 101 may be replaced by two or more center portions that are (each) connected to one another by at least a (minor) tube (103b), and/or replaced by three center portions 101 that are each connected to one another by a (minor) tube (whereby each center portion may have at least one or more (major) tubes extending outward), etc. Accordingly, at least FIGS. 1-21 should not limit the invention (apparatus 100, and/or apparatus 200, and/or etc., and/or any combination thereof) in any manner, and each and every disclosed feature may be used interchangeably with other disclosed features.

According to one or more embodiments, the apparatus 100 and/or apparatus 200 may be circular, square/rectangular, and/or in the combination thereof. For example, if a feature is disclosed as circular, it may be replaced with being square/rectangular, or vice versa.

According to one or more embodiments, the internal and/or external circumference of one or more (or all tubes) may stay the same, decrease in its internal and/or external circumference as the tube extends outward and/or away from the center portion, etc. In addition, according to one or more embodiments, one or more (or all) tubes 103 may increase in its internal and/or external circumference as the tube extends outward and/or away from the center portion (e.g., in the shape of a cone). One of many benefits for tubes that increase in its internal and/or external circumference is that the holding capacity of the tubes and hence the apparatus 100 are increased.

According to one or more embodiments, tube(s) 103 may be connectable/disconnectable from the center portion(s) 101 (via male/female, female/male, fastening connection, plugs (ribbed or smooth), etc. at for example the area where the tube(s) 103 meet the center portion 101—similar to how the tube end caps 105 (also may be referred to as a closing and/or sealing mechanism/member) may be connected to the tube(s) 103 and vice versa) so that different shape and/or sizes of the center portion 101 may be used which may affect the speed of treat dispensing, storage capacity of treats, etc. Similarly, according to one or more embodiments, the minor tube(s) 103b and/or the end units with the plurality of minor tubes 103b may be connectable/disconnectable from the center portion 101 (via male/female, female/male, fastening connection, plugs (ribbed or smooth), etc.) and/or they may be permanently affixed to the main tube(s) 103. However, according to one or more embodiments, the (main 103 and/or minor 103b) tube(s) along with the center portion(s) 101 may also be one complete piece (e.g., unitary, forming a singular unit, forming a single entity, etc.) thereby dysconnectivity not being possible between the tube(s) and the center portion(s)—the (main and/or minor) tube(s) may be permanently affixed to the center portion(s) 101.

According to one or more embodiments, the external and/or internal circumference(s) of one or more of the tube(s) 103 may be uniform in its extension from the center portion 101 to the tube end 104, and/or the external and/or internal circumference(s) of one or more of the tube(s) 103 may be uniformly decreasing in its extension from the center portion 101 to the tube end 104, and/or the external and/or internal circumference(s) of one or more of the tube(s) 103 may be uniformly increasing in its extension from the center portion 101 to the tube end 104, and/or a combination thereof.

According to one or more embodiments, one and/or some and/or all of the tube ends may be permanently sealed off (closed) and opening port(s) 104 (being the same/similar as tube end 104) may be located along extension of the tube(s) 103 (and/or on the side of the tube end on the tip of the tube) and/or the center portion 101. According to one or more embodiments, one and/or some and/or all of the tube ends may be permanently sealed off (closed) and each tube may instead include one or more opening port(s) 104 (being the same/similar as tube end 104) may be used along extension of the tube 103 (and/or on the side of the tube end on the tip of the tube). According to one or more embodiments, one and/or some and/or all of the tube ends may be permanently sealed off (closed) and each tube may instead include one or more opening port(s) 104 (being the same/similar as tube end 104) may be used on the center portion 101. An example opening port(s) 104 along the tube 103 and the center portion 101 is illustrated in at least FIG. 3(*d*).

It should be noted that a treat dispensing apparatus with a certain number of main tubes 103 e.g., 6 tubes is used only for illustration purposes and a certain number of minor tube(s)), but it should also be noted that more and/or less tubes (103, 103*b*, etc.) may be used. For example, based on experimentation, the apparatus may be designed with only one tube 103 (and one hollowed center portion 101) which requires the pet to pick up the apparatus 100 to ensure the treats exit out of the exit hole(s) 102. Based on experimentation, the apparatus 100 may be designed with two tubes 103 (and one intersecting hollowed center portion 101) which requires the pet to pick up and/or roll the apparatus 100 to ensure the treats exit out of the exit hole(s) 102. However, based on experimentation, the apparatus 100 appears to have a great amount of bounciness with approximately 4-5 (evenly spaced, and/or evenly distanced, and/or etc.) tubes 103 but the roll is not as great as with more tubes. Also, based on experimentation, the apparatus 100 appears to have a great combination of bounciness and sufficient roll with approximately 6 (evenly spaced, evenly distanced, etc.) tubes 103. In addition, based on experimentation, the apparatus 100 appears to increase the smoother roll and decrease bounciness when the number of (evenly spaced) tubes 103 is increased from the 6 (evenly spaced, and/or evenly distanced, and/or etc.) tubes (7, 8, 9, 10, 11, 12, . . . ). Therefore, for illustration purposes a treat dispensing apparatus 100 will be illustrated with 6 (evenly spaced) tubes 103 along the X axis, the Y axis and the Z axis—e.g., first and second tubes 103 along the X axis, third and fourth tubes 103 along the Y axis and fifth and sixth tubes 103 along the Z axis. It should be note that by using 4 or more tubes 103 extending from the center portion 101, the center portion 101 is not in contact with the ground and hence (at least most of) the treats cannot sit in the center portion 101 and release too many treats as those treats quickly return back into the hollow tubes 103.

According to one or more embodiments, each tube 103 may allow for one or more exit holes 102 to exist anywhere on each tube 103. Each tube 103 may include at least a tube 103 beginning located at the intersection of where the tube 103 meets the center portion 101 and a tube end 104 (that is open, closed, partially open/closed, openable, closeable, sealed, sealable, and/or etc.). Each tube end 104 may be either completely open to the ambient and/or the external environment, completely closed to the ambient and/or the external environment, partially open/closed to the ambient and/or the external environment, configured to receive a tube end cap/cover 105 (to make the tube end) completely closed to the ambient and/or the external environment, partially open/closed to the ambient and/or the external environment, and/or etc.), and/or etc. One or more tube ends 104 (e.g., tube end tips) may be completely open to the ambient and/or the external environment, while one or more tube ends 104 may be completely closed to the ambient and/or the external environment, also while one or more tube ends 104 may be partially open/closed to the ambient and/or the external environment, and while one or more tube ends 104 may be open and able to receive a tube end cap 105 to be completely and/or partially closed to the ambient and/or the external environment, and/or etc.

According to one or more embodiments, each tube 103 may be used for being a receiving port for food/treats to be inserted into the apparatus 100 by the user and/or used to exit food/treats when the user uses the container/sphere's open area as a receiving port for food/treats to be inserted into the container/sphere's open area.

Figure 8:
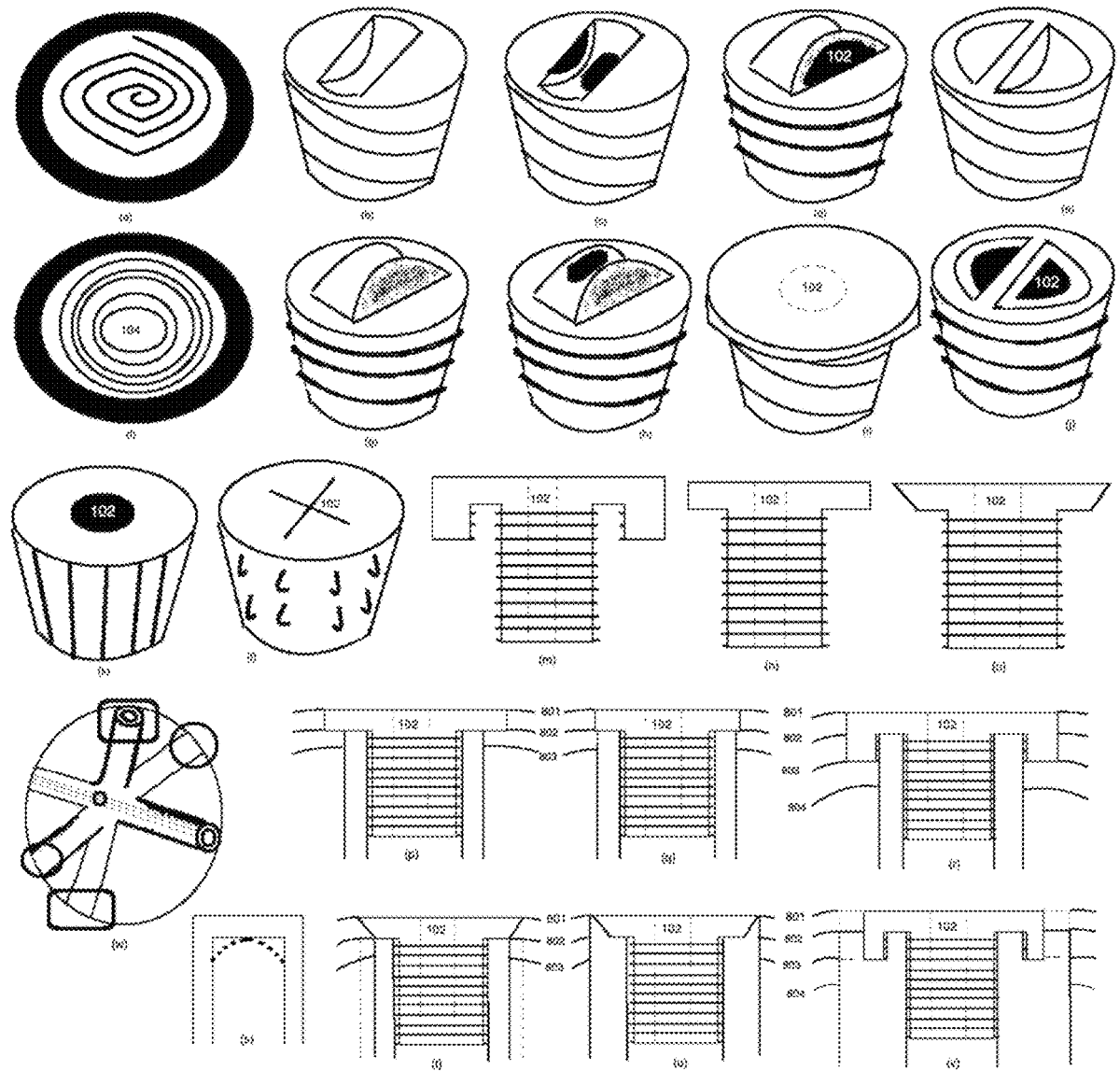
FIG. 8 is a diagram illustrating some of the possible tube end covers/caps/plugs/stoppers/inserts/closing mechanism/opening mechanism/opening and closing mechanism/adapter/closing and/or sealing mechanism/member/etc. 105 according to one or more embodiments described herein.

According to one or more embodiments, the treat dispensing apparatus 100 (and/or device/apparatus/container/sphere 200) is able to allow for food and/or treats to be inputted/inserted via the one or more tube end(s) 104 where the one or more tube end(s) 104 may then be sealed/sealable and/or partially sealed/sealable (e.g., partially sealed/sealable to make the tube end for pouring treats in the tube to be further restricted by a hole size that is able to only release one or more treats at a time) and/or completely sealed/sealable (e.g., completely closed/closeable) so that when the treat dispensing apparatus 100 (and/or device/apparatus/container/sphere 200) rolls, bounces, is thrown, and/or etc., the treat dispensing apparatus 100 (and/or device/apparatus/container/sphere 200) allows for treats to pass (e.g., back and forth) through the one or more tube(s) 103 and exit (only) out of the one or more exit hole(s) 102 and/or enter into another tube 103 so that the treat(s) will later exit (only) out one or more exit hole(s) 102. At least FIG. 8 illustrates some of the closure system(s) and/or caps/plugs for partially/completely sealing/closing the tube ends 104 to the ambient and/or the external environment. Accordingly, the treats will only exit out of the exit hole(s) 102 when all of the tube ends 104 of all of the tubes are completely capped/sealed off.

At least FIGS. 1-21 may include one or more center portions 101 whereby the center portion 101 (like the one or more tubes 103) may be completely hollow, completely solid, partially hollow/solid, and/or include partitions (to allow connections between certain tubes to one another while disconnecting some tube(s) from other tube(s)—e.g., a 4-6 tubed apparatus where first and second tubes 103 only being connected to one another while third and fourth tubes 103 only being connected to one another—e.g., a 4-6 tubed apparatus where first, second and third tubes 103 only being connected to one another while fourth, fifth and sixth tubes 103 only being connected to one another), etc. In one or more embodiments, the center portion 101 may be of different sizes (e.g., larger or smaller), and/or different shapes, and/or different dimensions, and/or etc. than what is illustrated in the Drawings in order to house more and/or less treats for dispensing, in order to reduce, increase the speed of dispensing, and/or etc.

In one or more embodiments, the center portion 101 may just be the (intersection) area where all the tubes 103 join (e.g., where all tubes 103 come to meet). One example of this intersection area may be illustrated in at least FIG. 3(*a*), FIG. 3(*b*), FIG. 3(*c*), FIG. 4, FIG. 10(*e*), FIG. 10(*f*), FIG. 15B(a), FIG. 15B(b), FIG. 20 and FIG. 21.

According to one or more embodiments, the center portion(s) 101 and the tube(s) 103 (the tube 103 inherently may include its respective tube end 104) together may be one singular structure/piece (not detachable from one another and formed as one solid structure/piece (e.g., unitary, forming a singular unit, forming a single entity, etc.)), and/or one or more (or all) of the center portions 101 may be detachable from some (1, 2, 3, 4, 5, 6, etc.) or all of the tubes 103, and/or one or more (or all) of the tubes 103 may be detachable from the center portion 101, and/or the center portion 101 may have a tube(s) 103 that are formed as one singular structure/piece (e.g., unitary, forming a singular unit, forming a single entity, etc.) while another tube(s) 103 is/are detachable from the center portion 101. Accordingly, if one or more detachable tube(s) 103 are used, the one or more detachable tube(s) 103 may be detachable (e.g., where the tube(s) 103 meet the center portion 101) by the same or similar means as the cap/tube ends 105, e.g., a screw type connector, a male/female connector, a female/male connector, a ribbed type connector, a snap in place connector, a plug type connector, wedge, etc.

According to one or more embodiments, the (hollow) center portion 101 may allow for one or more exit holes 102 to exist anywhere on and/or near and/or touching the center portion 101 (e.g., centrally located in the center portion 101, centrally located between at least two tubes 103, centrally located between all tubes 103, etc.). The center portion 101 may include one or more tubes 103 (1, 2, 3, 4, 5, 6, 7, 8, 9, 10, 11, 12, etc. tubes) extending away from the center portion 101 e.g., in different directions. Each tube 103 may be an (e.g., tubular) extending member/arm (e.g., an inner hollow tubular region) which extends away from the center portion 101 and continues to extend to its respective tube end 104. Tubes (103 and/or 103*b*) should not be limited to all having hollow centers as one or more (2, 3, 4, 5, 6, 7, 8, . . . ) tube(s) (103 and/or 103*b*) may not have a hollow center and/or are instead solid. The circumference of the inner (hollow) passageway inside the tube(s) (103 and/or 103*b*) may be less than and/or equal to the exiting holes 102 but preferably greater than the exiting holes 102. However, the circumference of the inner (hollow) passageway inside the tube(s) (103 and/or 103*b*) may be a combination of less than, equal to and/or greater than the exiting holes 102.

According to one or more embodiments, one, two, three, four, five, six, seven, eight, . . . and/or all the tubes 103 may not extend in a single straight direction away (e.g., straight along any axis) from the center portion 101 and/or may extend in a plurality of directions. For example, the tube(s) are not required to extend in a straight/linear fashion and any of the tube(s) may have a nonlinear extension and/or shape making one or more arms have a bend(s) and/or have a curve(s), and/or for example, being L shaped, V shaped, (elongated) U shaped, M/W shaped, S shaped, O shaped, elongated O shaped, X shaped, Z shaped, T/Y shaped (having one extension from the center portion 101 and branching out in two directions, curved shaped, spiral shaped, spring shaped, and/or etc.).

The center portion 101 may be made of the same material(s) and/or a different material(s) than the tube(s). For example, the center portion 101 may be made of the same material(s) and/or a different material(s) than the tube(s) whereby the center portion is more and/or less bouncier than the tube(s), the center portion is more and/or less harder and/or softer than the tube(s), center portion is more and/or less chewier than the tube(s), and/or etc.

At least FIG. 1 (and for example FIGS. 2-21) illustrates a food/treat dispensing device/apparatus 100 (and/or device/apparatus/container/sphere 200) with a (e.g., hollow) center portion 101 being (e.g., directly) connected to, for example, at least two (main) (e.g., hollow) tubes 103. It should be noted that a "main" tube may refer to at least the tubes that extend and are directly connected to the center portion 101 (while, for example, a "small," "short," "minor," or the like may refer to at least a (shorter) tube that extends and are directly connected to a "main" tube). However, another center portion may be included between a main tube 103 and one or more minor tubes (e.g., in at least FIG. 1). It should be noted that in any and/or all embodiments, any (main and/or minor) tube(s) may be directly and/or indirectly connected to other (main and/or minor) tube(s) (including other main/minor tubes). Accordingly, a main tube(s) may be used interchangeably with any minor tube(s). For example, in at least FIGS. 1(*a*), 1(*b*), 1(*c*), and 1(*f*), a (main) tube may extend from the center portion 101 and connect to two or more (e.g., shorter) (end) tubes 103(*b*).

In at least FIGS. 1(*a*), 1(*b*), 1(*c*) and 1(*f*), the (main) tubes 103 may extend from the center portion 101 and connect to three (e.g., shorter) (end) tubes 103(*b*) and/or four (e.g., shorter) (end) tubes 103(*b*) and/or five (e.g., shorter) (end) tubes 103(*b*) and/or etc. It should be noted that more and/or less (e.g., shorter) (end) tubes 103(*b*) may be used and may be used in extending in any direction.

The ends of the two main tube 103, for example in at least FIG. 1(*a*), may have the same number of minor tubes (e.g., three (e.g., shorter) (end) tubes) to be extending in approximately (and/or exactly) the same plane (and/or different plane) but in different directions (and/or the same direction). However, as apparatus 100 (and/or device/apparatus 200) may be designed with any aspect of other embodiments, the three (e.g., shorter) minor (end) or more tubes on one side may be staggered (evenly and/or unevenly) as compared to the other three (e.g., shorter) minor (end) tubes, for example as illustrated in FIG. 1(*b*).

In at least FIG. 1(*c*), there may be four or more (e.g., shorter (and/or equal and/or longer)) tubes (ends) with and/or without an additional (e.g., shorter (and/or equal and/or longer)) tube (end) extending outward from the (main) tube 103. Similarly, the additional outward extending tube (end) may also be used in any other tube (end).

As the apparatus 100 (and/or device/apparatus 200) may be designed in any combination of features disclosed, at least FIGS. 1(*d*), 1(*e*) and 1(*f*) illustrate that the ends of the tube(s) 103 may have a wheel configuration, a (e.g., round) ball configuration, and/or etc.

It should be noted that any features and/or combination of features as disclosed in FIGS. 1(*a*), 1(*b*), 1(*c*), 1(*d*), 1(*e*) and 1(*f*) may be used interchangeably with any other Figures disclosed herewith.

According to one or more embodiments, the arm/member/end that extends from the center portion may be used from any one Figure to another. For example, the four-way crossroad sign arm of FIG. 1(c) may be used in for example to replace any and/or all arms/tubes of FIGS. 3(a), 3(b), 3(c), etc. For example, the balled ended arm of FIG. 1(d) and/or FIG. 1(e) may be used in for example to replace any and/or all the arms/tubes of FIGS. 3(a), 3(b), 3(c), etc.

At least FIG. 1(a), FIG. 1(c), and FIG. 1(e) illustrate some possible fin 120 being used between tubes. It should be noted that any disclosed fin or features thereof may be used with the other Figures, and vice versa. It should also be noted that the terms "fin," "tab," "protrusion," "wall," "partition," "flap," "barrier," "guide," "guide member," and the like may be used interchangeably.

It should be noted that, according to one or more embodiments, any and/or all minor tubes and/or any and all main tube end(s) may have tube end(s) 104 (and/or exit holes 102). It should be noted that any and all features, individually and/or in any combination, as disclosed in at least FIG. 1 and/or any other Figure(s) may be used interchangeable with any other embodiment disclosed herein. For example, the shorter (minor) tubes extending from the longer (main) tubes may be used in any other embodiment.

Figure 2:
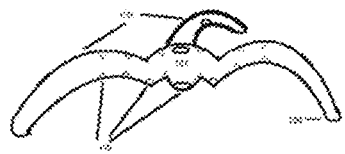
FIG. 2 is a food/treat dispensing device/apparatus 100 for pets according to one or more embodiments described herein.
Figure 2:
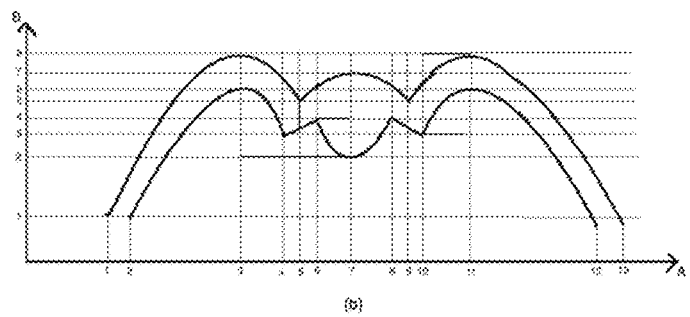
Figure 2:
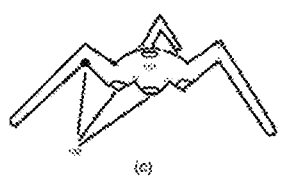
Figure 2:
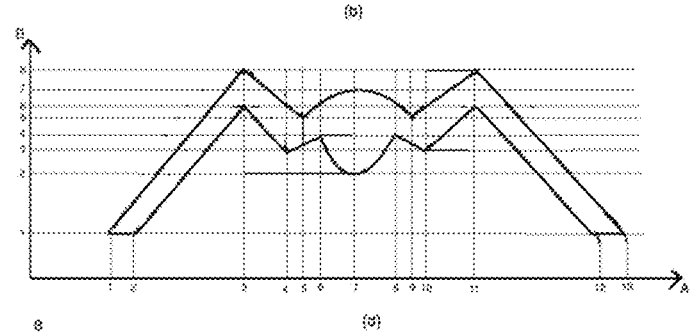
Figure 2:
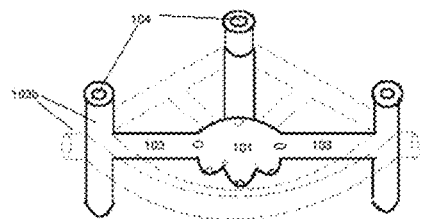
Figure 2:
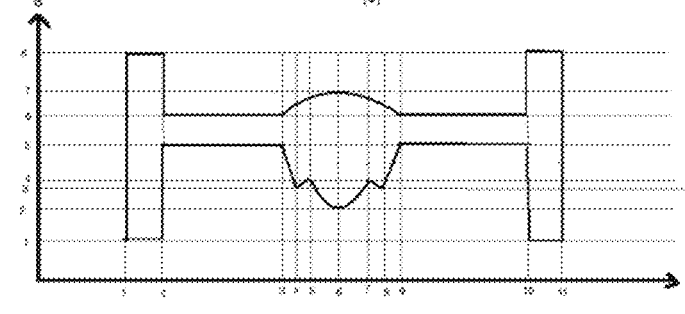
Figure 2:
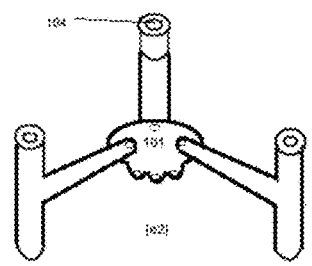
Figure 2:
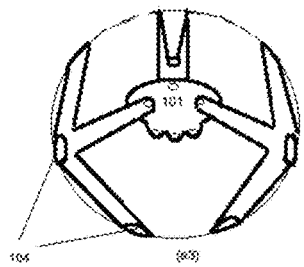

At least FIG. 2(a), FIG. 2(c) and FIG. 2(e) (and for example FIGS. 1 and 3-21) illustrate a food/treat dispensing device/apparatus 100 (and/or device/apparatus/container/sphere 200) with a (e.g., hollow) center portion 101 being connected to, for example, at least three (main) tubes 103. At least FIGS. 1-21 may include one or more exit hole(s) 102 anywhere on the apparatus 100 (and/or device/apparatus/container/sphere 200) as disclosed in one or more embodiments. For example, one or more exit hole(s) 102 may be included, not limited to, one or more exit hole(s) 102 at/on the top of the center portion 101, and/or one or more exit hole(s) 102 at/on the middle and/or bottom of the center portion 101, and/or one or more exit hole(s) 102 at/on each side of the center portion 101, and/or one or more exit hole(s) 102 at/on each arch/center portion of each tube 103, and/or one or more exit hole(s) 102 at/on the midway point between the center of the tube and the place when the tube meets the center portion, and/or one or more exit hole(s) 102 at/on an area where the tube meets the center portion, and/or etc.

It should be noted that, according to one or more embodiments, the exit hole 102 (e.g., on the center portion) may include an indentation portion around the exit hole 102 making the exit hole like a funnel (e.g., an indention portion followed by a hole). For example, even if a center portion has a flat surface and/or a curved (concave) surface (e.g., FIG. 3A(d)), an exit hole 102 on the surface of the center portion may have an indentation/concave portion surrounding the exit hole.

It should be note that the top of any center portion 101 should not limited to being an inverted arch/U shaped, as it may also be an inverted V shaped, M shaped, W shaped, etc. Similarly, the bottom of the center portion 101 is not limited to being W shaped, as it may also be U shaped, V shaped, W shaped, etc.

It should be noted that one or more of the tubes 103 may be curved/arch shaped, U shaped, V shaped, M shaped, W shaped, etc.

FIG. 2(a)/FIG. 2(b) illustrates one of many possible configurations of apparatus 100 (and/or device/apparatus/container/sphere 200). However, according to one or more embodiments, while B7/A7 is disclosed to be lower than B8/A3 (and/or B8/A11), B7/A7 may be equal to and/or higher than B8/A3 (and/or B8/A11).

In addition, according to one or more embodiments, while B6/A3 (and/or B6/A11) is disclosed to be lower than B7/A7, B6/A3 (and/or B6/A11) may be equal to or higher than B7/A7.

Furthermore, according to one or more embodiments, while B5/A5 (and/or B5/A9) is disclosed to be lower than B6/A3 (and/or B6/A11), B5/A5 (and/or B5/A9) may be equal to or higher than B6/A3 (and/or B6/A11).

In addition, according to one or more embodiments, while B4/A6 (and/or B4/A8) is disclosed to be lower than B5/A5 (and/or B5/A9), B4/A6 (and/or B4/A8) may be equal to or higher than B5/A5 (and/or B5/A9).

Furthermore, according to one or more embodiments, while B4/A6 (and/or B4/A8) is disclosed to be lower than B6/A3 (and/or B6/A11), B4/A6 (and/or B4/A8) may be equal to or higher than B6/A3 (and/or B6/A11).

In addition, according to one or more embodiments, while B3/A4 (and/or B3/A10) is disclosed to be lower than B5/A5 (and/or B5/A9), B3/A4 (and/or B3/A10) may be equal to or higher than B5/A5 (and/or B5/A9).

Furthermore, according to one or more embodiments, while B3/A4 (and/or B3/A10) is disclosed to be lower than B4/A6 (and/or B4/A8), B3/A4 (and/or B3/A10) may be equal to or higher than B4/A6 (and/or B4/A8).

In addition, according to one or more embodiments, while B2/A7 is disclosed to be lower than B3/A4 (and/or B3/A10), B2/A7 may be equal to or higher than B3/A4 (and/or B3/A10).

In addition, according to one or more embodiments, while A4/B3 is disclosed to be before A5/B5, A4/B3 may be equal to or after A5/B5.

Furthermore, according to one or more embodiments, while A5/B5 is disclosed to be before A6/B4, A5/B5 may be equal to or after A6/B4.

In addition, according to one or more embodiments, while A8/B4 is disclosed to be before A9/B5, A8/B4 may be equal to or after A9/B5.

Furthermore, according to one or more embodiments, while A9/B5 is disclosed to be before A10/B3, A9/B5 may be equal to or after A10/B3.

FIG. 2(c)/FIG. 2(d) illustrates one of many possible configurations of apparatus 100 (and/or device/apparatus/container/sphere 200). However, according to one or more embodiments, while B7/A7 is disclosed to be lower than B8/A3 (and/or B8/A11), B7/A7 may be equal to or higher than B8/A3 (and/or B8/A11).

In addition, according to one or more embodiments, while B6/A3 (and/or B6/A11) is disclosed to be lower than B7/A7, B6/A3 (and/or B6/A11) may be equal to or higher than B7/A7.

Furthermore, according to one or more embodiments, while B5/A5 (and/or B5/A9) is disclosed to be lower than B6/A3 (and/or B6/A11), B5/A5 (and/or B5/A9) may be equal to or higher than B6/A3 (and/or B6/A11).

In addition, according to one or more embodiments, while B4/A6 (and/or B4/A8) is disclosed to be lower than B5/A5 (and/or B5/A9), B4/A6 (and/or B4/A8) may be equal to or higher than B5/A5 (and/or B5/A9).

Furthermore, according to one or more embodiments, while B4/A6 (and/or B4/A8) is disclosed to be lower than B6/A3 (and/or B6/A11), B4/A6 (and/or B4/A8) may be equal to or higher than B6/A3 (and/or B6/A11).

In addition, according to one or more embodiments, while B3/A4 (and/or B3/A10) is disclosed to be lower than B5/A5 (and/or B5/A9), B3/A4 (and/or B3/A10) may be equal to or higher than B5/A5 (and/or B5/A9).

Furthermore, according to one or more embodiments, while B3/A4 (and/or B3/A10) is disclosed to be lower than B4/A6 (and/or B4/A8), B3/A4 (and/or B3/A10) may be equal to or higher than B4/A6 (and/or B4/A8).

In addition, according to one or more embodiments, while B2/A7 is disclosed to be lower than B3/A4 (and/or B3/A10), B2/A7 may be equal to or higher than B3/A4 (and/or B3/A10).

In addition, according to one or more embodiments, while A4/B3 is disclosed to be before A5/B5, A4/B3 may be equal to or after A5/B5.

Furthermore, according to one or more embodiments, while A5/B5 is disclosed to be before A6/B4, A5/B5 may be equal to or after A6/B4.

In addition, according to one or more embodiments, while A8/B4 is disclosed to be before A9/B5, A8/B4 may be equal to or after A9/B5.

Furthermore, according to one or more embodiments, while A9/B5 is disclosed to be before A10/B3, A9/B5 may be equal to or after A10/B3.

FIG. 2(e)/FIG. 2(f) illustrates one of many possible configurations of the apparatus 100 (and/or device/apparatus/container/sphere 200). However, according to one or more embodiments, while B7/A6 is disclosed to be lower than B8/A (and/or B8/A2, and/or B8/A10, and/or B8/A11), B7/A6 may be equal to or higher than B8/A (and/or B8/A2, and/or B8/A10, and/or B8/A11).

In addition, according to one or more embodiments, while B6/A2 (and/or B6/A3, and/or B6/A9, and/or B6/A10) is disclosed to be lower than B7/A6, B6/A2 (and/or B6/A3, and/or B6/A9, and/or B6/A10) may be equal to or higher than B7/A6.

Furthermore, according to one or more embodiments, while B4/A5 (and/or B4/A7) is disclosed to be lower than B5/A3 (and/or B5/A9), B4/A5 (and/or B4/A7) may be equal to or higher than B5/A3 (and/or B5/A9).

In addition, according to one or more embodiments, while B3/A4 (and/or B3/A8) is disclosed to be lower than B5/A5 (and/or B5/A7), B3/A4 (and/or B3/A8) may be equal to or higher than B5/A5 (and/or B5/A7).

Furthermore, according to one or more embodiments, while B2/A6 is disclosed to be lower than B3/A4 (and/or B3/A8), B2/A6 may be equal to or higher than B3/A4 (and/or B3/A8).

In addition, according to one or more embodiments, while B2/A6 is disclosed to be lower than B1/A1 (and/or B1/A2, and/or B1/A10, and/or B1/A11), B2/A6 may be equal to or higher than B1/A (and/or B1/A2, and/or B1/A10, and/or B1/A11).

In addition, according to one or more embodiments, while A2/B6 is disclosed to be equal to A2/B5, A2/B6 may be before or after A2/B5.

Furthermore, according to one or more embodiments, while A10/B6 is disclosed to be equal to A10/B5, A10/B6 may be before or after A10/B5.

In addition, according to one or more embodiments, while A3/B6 is disclosed to be equal to A3/B5, A3/B6 may be before or after A3/B5.

Furthermore, according to one or more embodiments, while A9/B6 is disclosed to be equal to A9/B5, A9/B6 may be before or after A9/B5.

In addition, according to one or more embodiments, while A4/B3 is disclosed to be after A3/B5, A4/B3 may be equal to or before A3/B5.

Furthermore, according to one or more embodiments, while A8/B3 is disclosed to be before A9/B5, A8/B3 may be equal to or after A9/B5.

It should be noted that any and all features, individually and/or in any combination, as disclosed in at least FIG. 2 and/or any other Figure(s) may be used interchangeable with any other embodiment disclosed herein. For example, the measurements/configurations of FIG. 2 may be used with any apparatus 100 (and/or container/sphere 200)

According to one or more embodiments, one, two and/or three tubes of at least FIGS. 2-21 may extend (at least start extending) outward along the same or similar plane.

According to one or more embodiments, the angle between two tubes may be (approximately) 90 degrees, (approximately) 105 degrees, (approximately) 120 degrees, (approximately) 135 degrees, (approximately) 150 degrees, (approximately) 165 degrees, (approximately) 180 degrees, and/or etc., and/or any combination thereof.

According to one or more embodiments, (e.g., the ends of (any), the center of (any), etc.) tubes 103 may be additionally connected to each other by additional tubes. According to one or more embodiments, for example, the placement of the illustrated dashed lines may be implemented in any other Figure(s). It should be noted that while only two dashed line tubes are illustrated in FIG. 2(e), a third dashed line tube from the center portion to the curved tube is omitted for ease of a simpler illustration. It should be noted that any or all of the solid and/or dashed lines tubes may be straight and/or curved. It should be noted that additional tubes may be added where the tube is diagonal, e.g., connecting from the top of one end to the bottom of another tube (and vise versa) thereby having diagonal tubes.

The additional dashed line tubes may be centrally located (as illustrated in at least FIG. 2(e)) in any apparatus but may also have additional tubes located higher and/or lower from the center of the apparatus (as illustrated in at least FIG. 2(e)). For example, the addition tubes may be located in any height as long as it does not severely impede the roll of the apparatus. It should be noted that the additional tubes may be of any configuration, straight, curved, bent, etc.

In addition, according to one or more embodiments, there may be an additional third shorter tube end (e.g., dashed line extension) on each tube end thereby having a third small tube end. According to one or more embodiments, the third tube end may protrude out enough so that if the apparatus is enclosed in a container/sphere, each tube end extending from the main tubes meets (approximately) flush with the container/sphere.

It should be note that while FIGS. 1-21 and any other Figure(s) disclosed herein illustrate some of the possible locations for the exit hole(s) 102, exit hole(s) 102 may be used anywhere on the apparatus 100 (and/or device/apparatus 200). It should be further noted that any location of an exit hole(s) 102 (or lack of an exit hole(s)) on one Figure can be used in a similar/same location as another Figure.

It should be noted that the tubes 103 according to any embodiment is not limited to being linear in its extension (e.g., FIGS. 1 and 2(e)), nor limited to curved in its extension (e.g., FIG. 2(a)), nor limited to a bent extension (e.g., FIG. 2(c)), any and all embodiments can be linear in extension, curved in extension, bent extension, wiggly shaped in extension, spiral in extension, W shaped in extension, M shaped in extension, U shaped in extension, V shaped in extension, S shaped in extension, any combination thereof, and/or etc.

According to one or more embodiments, in at least FIGS. 1, 2, 3, 4, 10, etc., the tubes may be designed to be angled and/or arched and/or bent had/or to have tube end extensions (e.g., shorter (hollow or solid) tubes connected to (main) tubes) so that the center portion 101 may have at least some clearance from touching a flat surface (so that the center portion 101 does not touch the flat surface).

According to one or more embodiments, at least two tubes (e.g., of at least FIG. 1) may extend outward from the center portion 101 along (approximately) the same axis and/or the same/similar plane. In other words, according to one or more embodiments, at least two tubes each extending in different directions from the center portion have, for example, an angle of approximately 180 in relation to one another.

According to one or more embodiments, at least three tubes (e.g., of at least FIGS. 2(a), 2(c) and/or 2(e)) may extend outward separated by (approximately) 120 degrees separation from one another and/or the tube ends 104 may terminate in locations (approximately) 120 degrees separation from one another (or 180 degree and 90 degrees, etc.). In addition, according to one or more embodiments, at least two of three tubes (e.g., of at least FIGS. 2(a), 2(c) and/or 2(e)) may extend outward separated by (approximately) 45 and/or (approximately) 67.5 and/or (approximately) 90 and/or (approximately) 135 and/or (approximately) 180 degrees separation from one another and/or the tube ends 104 may terminate in locations (approximately) 45 and/or (approximately) 67.5 and/or (approximately) 90 and/or (approximately) 135 and/or (approximately) 180 degrees (or the like) separation from one another. In other words, according to one or more embodiments, at least three tubes each extending in different directions from the center portion have, for example, an angle of approximately 45, 67.5, 90, 120, 135, 180, and/or etc. in relation to one another.

It should be noted that FIG. 2(e2) is one example of the angles of FIG. 2(e) being (approximately) 120 degrees between each of the three tubes. 103.

It should be noted that while the additional (e.g., minor) tubes (e.g., 103b) are illustrated as being 90 degrees from another (e.g., main) tube (e.g., 103), the additional (e.g., minor) tubes may extend at any angle. For example, they may extend inward at (approximately) a 45-degree angle (as illustrated in at least FIG. 2(e3))—but may also be 15°-20°, 20°-25°, 25°-30°, 30°-35°, 35°-40°, 40°-45°, 45°-50°, 50°-55°, 55°-60°, 60°-65°, 65°-70°, 70°-75°, 75°-80°, 80°-85°, etc.

It should be noted that any and all features, individually and/or in any combination, as disclosed in at least FIG. 2 and/or any other Figure(s) may be used interchangeable with any other embodiment disclosed herein.

FIG. 3 illustrates some examples a food/treat dispensing device/apparatus 100 (and/or device/apparatus/container/sphere 200) with a (e.g., hollow) center portion 101 being connected to, for example, at least four (main) tubes 103, at least five (main) tubes 103, and at least six (main) tubes 103 where the center portion may be only comprised of the intersection area between the tube and an increased center portion area (e.g., a ball shape, a container/sphere shape, etc.). In FIG. 3, the extending arms/members may be extended in a manner to keep the center portion from touching a flat surface, e.g., have an angle(s) between tubes so that the apparatus does not lay flat with the center portion touching a flat surface.

Figure 3A:
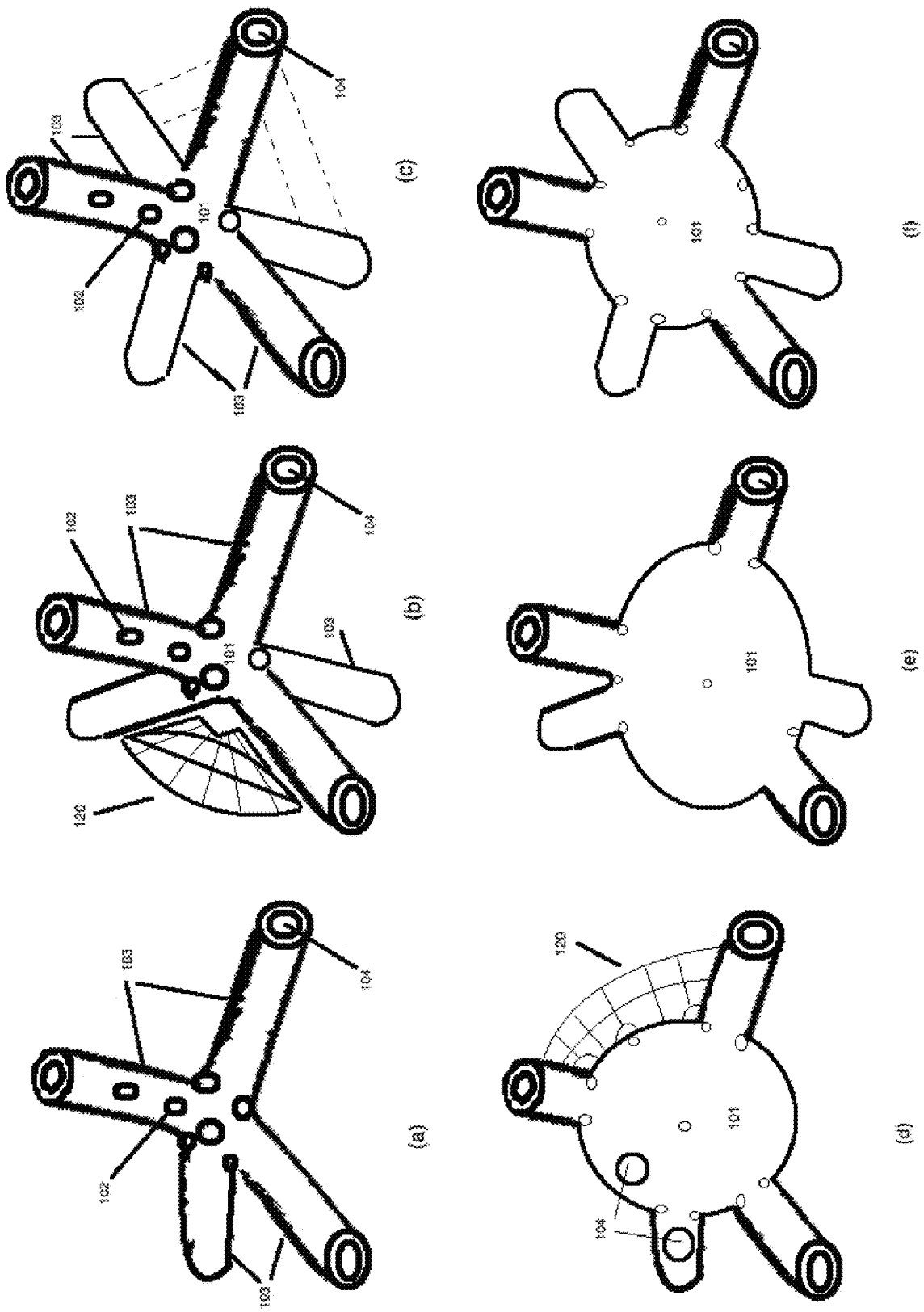

According to one or more embodiments, at least four tubes (e.g., of at least FIG. 3(a)) may extend in at least four outward and different directions. For example, according to one or more embodiments, no more than two tubes may exist on a single plane, e.g., of at least FIG. 3(a), and/or no tube may share the same axis, and/or include a portion and/or all of the tubes are in a hemi-container/hemisphere that encompasses/encloses the apparatus (e.g., three total tubes and a portion of the fourth tube), and/or only a portion of three tubes are in a hemi-container/hemisphere that encompasses/encloses the apparatus, and/or etc. In addition, according to one or more embodiments, an apparatus with at least four tubes (e.g., of at least FIG. 3(b)) may extend in at least four (approximately) evenly spaced/evenly angled outwardly directions. According to one or more embodiments, an apparatus with at least four tubes (e.g., of at least FIG. 3(b)) may have at least one or more extending in one direction (e.g., to one (e.g., left) side (e.g., towards a first hemi-container/hemisphere/partial sphere/partial container) of the while at least three other tubes are extending in three (approximately) evenly spaced/evenly angled outwardly directions (e.g., to another (e.g., right) side (e.g., towards a second hemi-container/hemisphere/partial sphere/partial container)). Also, according to one or more embodiments, no more than two tubes may exist on a single plane, e.g., of at least FIG. 3(a). In addition, according to one or more embodiments, one tube extends towards or in the direction of axis while three other tubes extending in an opposite direction of said axis. In other words, according to one or more embodiments, at least three tubes each extending in different directions from the center portion may have, for example, an angle of approximately 45, 67.5, 72, 90, 120, 135, 180, and/or etc. in relation to one another. Also, according to one or more embodiments, no more than three tubes may exist on a single plane, e.g., of at least FIG. 3(b). In addition, according to one or more embodiments, no more than four tubes may exist on a single plane, e.g., of at least FIG. 3(c).

According to one or more embodiments, an apparatus 100 with at least four total tubes (e.g., FIG. 3(a)) may have one tube located in a first half container/sphere while the remaining at least three other tubes are located in the second half container/sphere.

According to one or more embodiments, at least one exit port 102 may be located at the intersection area between where at least three tubes intersect each other. For example, in FIG. 3(a), FIG. 15B(b), at least one exit port 102 may be located at the intersection area between the three bottom tubes 103 and/or three side tubes 103.

According to one or more embodiments, at least one (or more) of at least four total tubes 103 (e.g., of at least FIG. 3(a))—a first tube—may extend along a first axis while each of the at least three remaining tubes may have at least an angle greater than 90 degrees but less than 180 degrees in relation to the first tube. In addition, at least two of the at least three remaining tubes have an angle between each of them to be approximately 120 degree but at least 45 degrees (preferably 90 degrees) but not greater than 180 degrees. In other words, according to one or more embodiments, at least four tubes 103 each extending in different directions from the center portion may have, for example, an angle of approximately 45, 67.5, 72, 90, 120, 135, 180, and/or etc. in relation to one another.

According to one or more embodiments, at least five tubes 103 (e.g., of at least FIG. 3(b)) may extend in at least five outward and different directions. For example, at least two (first) tubes of at least five tubes 103 may extend in two approximately opposite directions along approximately the same axis while at least three other tubes extending in three approximately opposite directions along approximately the same plane where the axis of the two (first) tubes intersects and is approximately perpendicular to the plane of the three other tubes. In addition, five tubes (e.g., of at least FIG. 3(b)) may extend in five (approximately) evenly spaced/evenly angled outwardly directions. In other words, according to one or more embodiments, at least five tubes each extending in different directions from the center portion may have, for example, an angle of approximately 45, 67.5, 72, 90, 120, 135, 180, and/or etc. in relation to one another.

According to one or more embodiments, at least six tubes 103 (e.g., of FIG. 3(c)) may extend in at least six outward and different directions. For example, a first pair of tubes may extend in two approximately opposite directions along approximately the same first axis while a second pair of tubes may extend in two approximately opposite directions along approximately the same second axis and while a third pair of tubes may extend in two approximately opposite directions along approximately the same third axis. In addition, at least six tubes (e.g., of FIG. 3(c)) may extend in at least six (approximately) evenly spaced/evenly angled outwardly directions. In other words, according to one or more embodiments, at least six tubes each extending in different directions from the center portion may have, for example, an angle of approximately 45, 67.5, 72, 90, 120, 135, 180, and/or etc. in relation to one another.

According to one or more embodiments, at least six tubes 103 (e.g., of FIG. 3(c)) may extend in at least six outward and different directions. For example, (at least) four of the (at least) six total tubes may exist along a first plane (T1, T2, T3, and T4) while (at least) four of the (at least) six total tubes may exist along a second plane (T1, T3, T5, and T6) and while (at least) four of the (at least) six total tubes may exist along a third plane (T2, T4, T5, and T6).

According to one or more embodiments, an apparatus with at least five total tubes 103 (e.g., FIG. 3(b) and FIG. 3(c)) may have one tube located in a first half container/sphere 200 (e.g., first hemi-container/hemisphere/top (half sphere) of container/sphere) and a second tube 103 located in the second half container/sphere 200 (e.g., second hemi-container/hemisphere/bottom (half sphere) of container/sphere) while the remaining tubes are located in the plane that intersects (or is between) the two half container/spheres.

According to one or more embodiments, one or more fins 120 may be included between at least two tubes (e.g., FIG. 1(a), FIG. 1(c), FIG. 1(e), FIG. 3(b), FIG. 3(d), FIGS. 15-18, etc.) where each fin 120 creates a divider/wall/protrusion that can (completely) connects most and/or all of a side wall of a first tube to most and/or all of a side wall of a second tube where the top of the wall may be straight and/or curved (concave and/or convex) and/or jagged, etc. One or more fins 120 may be included between one or more tubes, between two or more tubes, between any and all tubes, etc. For example, a first fin 120 may be used to connect a first tube 103 to a second tube 103 (or a first tube), and/or a second fin 120 may be used to connect a second tube 103 to a third tube 103 (or a first tube), and/or a third fin 120 may be used to connect a third tube 103 to a fourth tube 103 (or a first tube), and/or a fourth fin 120 may be used to connect a fourth tube 103 to a fifth tube 103 (or a first tube), and/or a fifth fin 120 may be used to connect a fifth tube 103 to a sixth tube 103 (or a first tube), and/or a sixth fin 120 may be used to connect a sixth tube 103 to a seventh tube 103 (or a first tube), and/or a seventh fin 120 may be used to connect a seventh tube 103 to an eighth tube 103 (or a first tube), and/or an eighth fin 120 may be used to connect an eighth tube 103 to a ninth tube 103 (or a first tube), and/or a ninth fin 120 may be used to connect a ninth tube 103 to a tenth tube 103 (or a first tube), and/or a tenth fin 120 may be used to connect a tenth tube 103 to an eleventh tube 103 (or a first tube), and/or an eleventh fin 120 may be used to connect an eleventh tube 103 to a twelfth tube 103 (or a first tube), and/or a twelfth fin 120 may be used to connect a twelfth tube 103 to a thirteen tube 103 (or a first tube), and/or etc.

In addition, a first fin 120 may be used to connect a first tube 103, a second tube 103, and a third tube 103 together, and/or a second fin 120 may be used to connect a first tube 103, a second tube 103, and a fourth tube 103 together, and/or a third fin 120 may be used to connect a first tube 103, a third tube 103, and a fourth tube 103 together, and/or a fourth fin 120 may be used to connect a second tube 103, a third tube 103, and a fourth tube 103 together, and/or etc.

According to one or more embodiments, an exit hole 102 may be located (in a corner area) where two or more tubes 103 meet each other, and/or an exit hole 102 may be located (in a corner area) where two or more tubes 103 meet one or more fin(s) 120, and/or an exit hole 102 may be located (in a corner area) where three or more tubes 103 meet each other, and/or an exit hole 102 may be located (in a corner area) where three or more tubes 103 meet one or more fin(s) 120 (e.g., two fins, three fins, etc.), and/or etc.

It should be noted that, according to one or more embodiments, a fin(s) 120 may be insertable (via a grove in the apparatus) and/or is included as the same structure of the apparatus (not removable) (e.g., apparatus 100 and/or apparatus 200).

A fin(s) 120 may provide many benefits, for example one benefit may be to help assist treats to enter the exit hole(s) 102 while the apparatus (100 and/or 200) is bouncing/rolling.

FIG. 3(g), FIG. 3(h) and FIG. 3(i) illustrate some possible configurations of apparatus 100.

For example, a first tube 103 may have an angle between it and all other tubes on apparatus 100 to be greater than 90 degrees (e.g., axis Y to axis/plane X in FIG. 3(g)). According to one or more embodiments, the angle between axis A, axis B and/or axis C may be equal to and/or between 5°-10°, 10°-15°, 15°-20°, 20°-25°, 25°-30°, 30°-35°, 35°-40°, 40°-45°, 45°-50°, 50°-55°, 55°-60°, 60°-65°, 65°-70°, 70°-75°, 75°-80°, 80°-85°, etc.

For example, the angle between A and B, B and C, and C and A may equal to a value less than 180 (not equal to 180). According to one or more embodiments, the angle between A and B, B and C, and C and A may equal to and/or between 15°-165°, 30°-150°, 45°-135°, 60°-120°, 75°-105°, 85°-95°, etc.

It should be noted that, according to one or more embodiments, A and Y may span a first plane, while B and Y may span on a second plane, while C and Y may span on a third plane, while A and B may span on a fourth place, while A and C may span on a fifth plane, while B and C may span on a sixth plane, etc.

According to one or more embodiments, two tubes may extend outwardly along same axis (e.g., Y in FIG. 3(h), A/C in FIG. 3(h), B/D in FIG. 3(h), Y in FIG. 3(i)).

It should be noted that, according to one or more embodiments, the plane Xp (which the entire tube 103 and/or the tube ends 104 may exist in) may be (substantially/approximately) perpendicular to the Y axis. It should be noted that, according to one or more embodiments, the Y axis may be (substantially/approximately) perpendicular to the plane Xp (which the entire tubes 103 and/or the tube ends 104 may exist in).

According to one or more embodiments, the angle between Y and the plane Xp may be equal to and/or between 5°-10°, 10°-15°, 15°-20°, 20°-25°, 25°-30°, 30°-35°, 35°-40°, 40°-45°, 45°-50°, 50°-55°, 55°-60°, 60°-65°, 65°-70°, 70°-75°, 75°-80°, 80°-85°, etc.

It should be noted that, according to one or more embodiments, while the entire tubes 103 and/or the tube ends 104 of A, B, C and/or D may exist in plane Xp, each tube and/or each tube end may have a slight deviation from Xp. For example, each tube and/or each tube end may deviate from Xp by (approximately) 0°-5°, 5°-10°, 10°-15°, 15°-20°, 20°-25°, 25°-30°, 30°-35°, 35°-40°, 40°-45°, etc.

It should be noted that, according to one or more embodiments, that while A, B, C and/or D may exit on one single plane Xp, It should be noted that, according to one or more embodiments, that A, B, C and/or D may have an angle between it/them to Y(top) of 0°-5°, 5°-10°, 10°-15°, 15°-20°, 20°-25°, 25°-30°, 30°-35°, 35°-40°, 40°-45°, 45°-50°, 50°-55°, 55°-60°, 60°-65°, 65°-70°, 70°-75°, 75°-80°, 80°-85°, etc. while A, B, C and/or D may have an angle between it/them to Y(bottom) of 0°-5°, 5°-10°, 10°-15°, 15°-20°, 20°-25°, 25°-30°, 30°-35°, 35°-40°, 40°-45°, 45°-50°, 50°-55°, 55°-60°, 60°-65°, 65°-70°, 70°-75°, 75°-80°, 80°-85°, etc.

According to one or more embodiments, partitions may be included in apparatus 100 to partially and/or completely seal off one tube(s) to another tube(s). For example, one or more partitions may be included separating Y and A/B/C, one or more partitions may be included separating Y and A/B/C/D, one or more partitions may be included separating Y and A and B and C, one or more partitions may be included separating Y and A and B and C and D, one or more partitions may be included separating Y and B/D and A/C, one or more partitions may be included separating Y and A/B and C/D, one or more partitions may be included separating A/B and top of Y/C and bottom of Y/D, one or more partitions may be included separating A/B/top of Y and C/D/bottom of Y, one or more partitions may be included separating A/B/C and Y/D, etc.

It should be noted that, according to one or more embodiments, each partitioned tube set may have one or more exit holes 102 per partitioned tube set.

It should be noted that while a first tube and a second tube are shown/disclosed to be along the same axis, they may still be along the same axis but the angle between the two tubes may not be exactly 180 degrees as they may still exist along the same axis while there is a small deviation (e.g., 0.0° to 5.0°, 5.0° to 10.0°, ±10.0° to 15.0°, ±15.0° to 20.0°, ±20.0° to 25.0°, 25.0° to 30.0°, etc.).

It should be noted that any and all features, individually and/or in any combination, as disclosed in at least FIG. 3 and/or any other Figure(s) may be used interchangeable with any other embodiment disclosed herein.

For example, in at least FIG. 4, a first pair of tubes may extend in two approximately opposite directions along approximately the x axis while a second pair of tubes may extend in two approximately opposite directions along approximately the y axis and while a third pair of tubes may extend in two approximately opposite directions along approximately the z axis.

It should be noted that, according to one or more embodiments, one or more tubes 103 may extend outward from the center portion 101 in any fashion, for example, one or more tubes may extend in a linear fashion (e.g., as illustrated in at least FIG. 1), in a curved fashion (e.g., as illustrated in at least FIG. 2(a)), in a bent fashion (e.g., as illustrated in at least FIG. 2(c)), in any combination, and/or etc.

According to one or more embodiments, at least FIGS. 1, 2, 3, 4, 8, 10, 15, 16, 17, 18, 20 and 21 the angles between at least two tubes 103 may vary. For example, the angles between at least two tubes 103 may be, for example, 180 degrees, approximately 180 degrees, 135 degrees, approximately 135 degrees, 120 degrees, approximately 120 degrees, 90 degrees, approximately 90 degrees, 72 degrees, approximately 72 degrees, 67.5 degrees, approximately 67.5 degrees, 60 degrees, approximately 60 degrees, 45 degrees, approximately 45 degrees, 40 degrees, approximately 40 degrees, 36 degrees, approximately 36 degrees, 30 degrees, approximately 30 degrees, and/or etc. In addition, according to one or more embodiments, the angle(s) between at least one tube to at least another tube may be (approximately) equal to, less than, and/or greater than the numbers of tubes divided by 360.

According to one or more embodiments, the center portion 101 may be just the intersection area between tubes and/or may be of any shape/size. For example, the center portion 101 may be a spherical (and/or cubed) shape as illustrated in at least FIGS. 1, 2, 3(d), 3(e), 3(f), 9, 10 and 15. It should be noted that a cubed shaped may be substituted a spherical shape, and vice versa. In addition, it should be noted that any disclosed shape of the center portion (and/or tube(s) 103, tube end(s) 104, end covers, etc.) may be used interchangeably with any and all Figures.

Figure 4A:
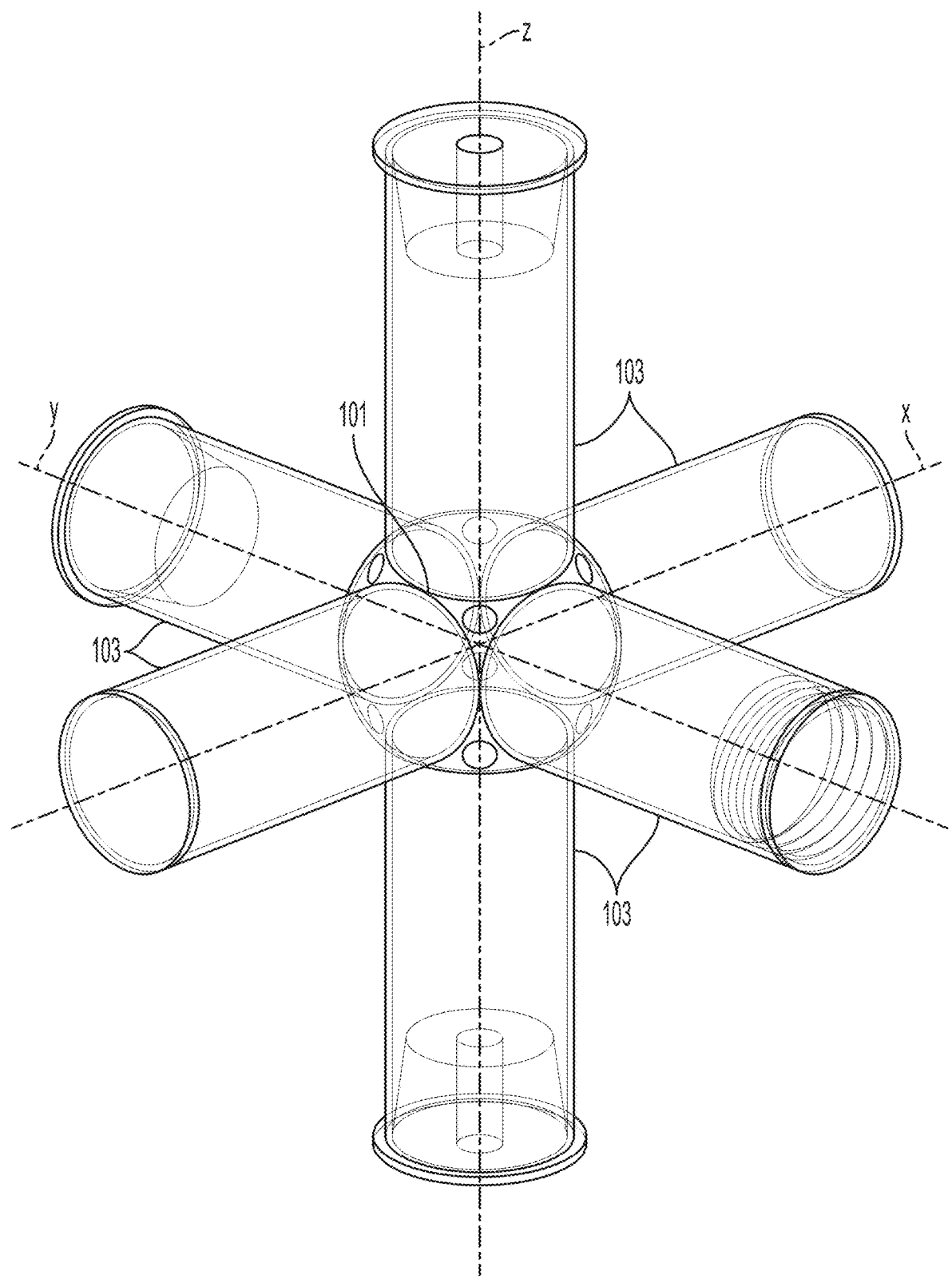
FIGS. 4A and 4B are examples of a food/treat dispensing device/apparatus 100 for pets according to one or more embodiments described herein.
Figure 4B:
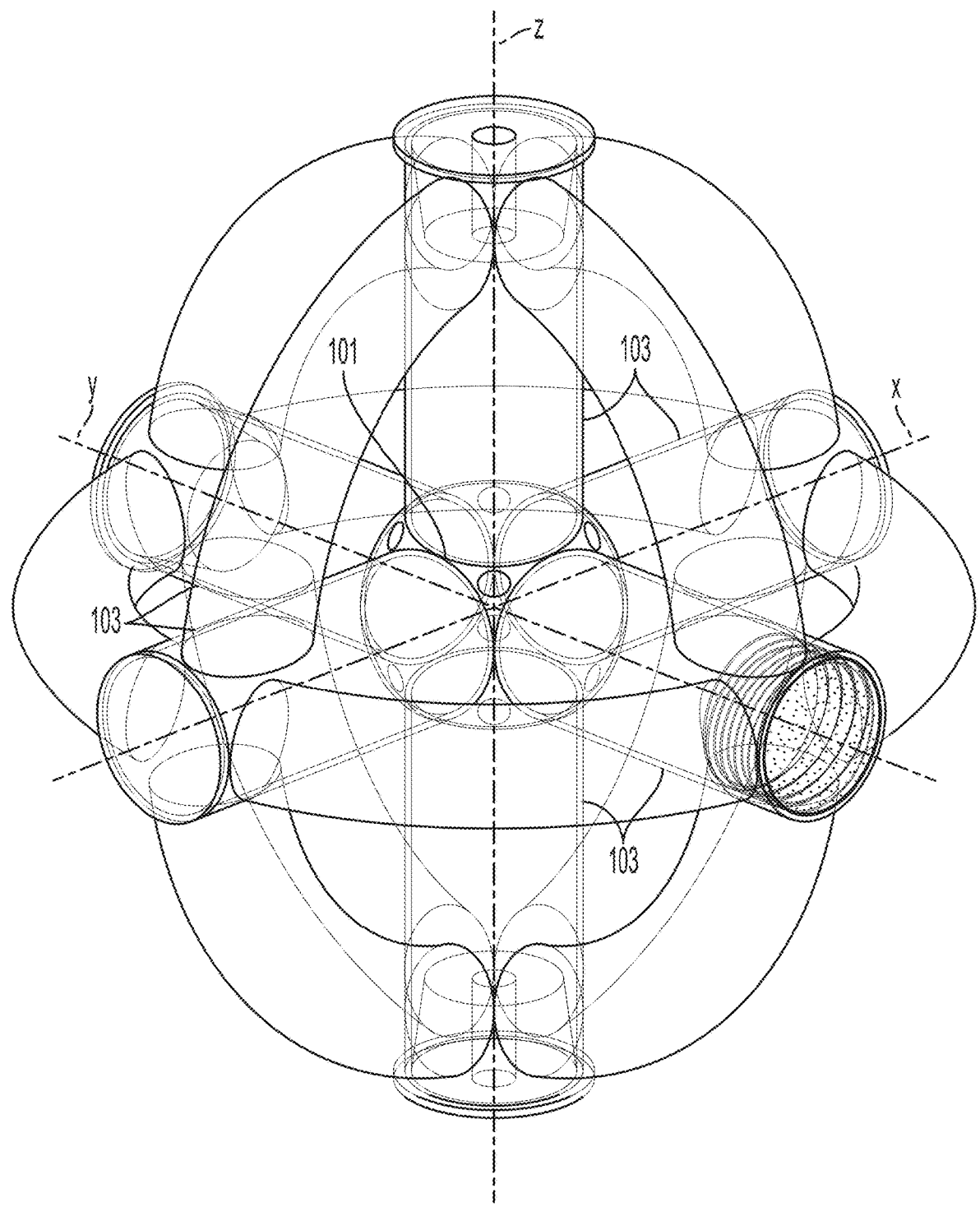

FIG. 4 (e.g., FIGS. 4A and 4B) illustrates that the 6 (hollow) tubes 103 may directly correspond to the X/Y/Z coordinate system according to one or more embodiments. FIG. 4, according to one or more embodiments, also illustrated that exit holes 102 can be placed anywhere on the apparatus 100 (and/or device/apparatus 200), e.g., the center of the center portion 101, the crease/centralized area between two adjacent/adjoining tubes, the crease/centralized area between three adjacent/adjoining tubes, in the center of each tube, on the tub(s) but in close proximity of center portion, and/or etc.

It should be noted that, according to one or more embodiments, the exit holes 102 may also be the entire intersecting area e.g., the triangular section encompassing the exit holes 102 and being the (e.g., entire) area of the intersection area.

In one or more embodiments, FIGS. 4A (and 4B) may have one, two, three, four, five, and/or six that are open (open to the ambient and/or the external environment) and/or closed (permanently sealed) as illustrated along the X axis.

In one or more embodiments, FIGS. 4A (and 4B) may have one, two, three, four, five, and/or six that are open (open to the ambient and/or the external environment) and may be sealed via a cap as illustrated along the Y axis. It should be noted that any type of cap may be used (e.g., the female threading of the tube on the Y axis with a cap that has matching male threading).

In one or more embodiments, FIGS. 4A (and 4B) may have one or more exit holes 102 located at each intersection area between the area where two, three, four, etc. tubes come to meet. It should be noted that the entire triangular area between the tubes may be the exit hole 102.

In one or more embodiments, as illustrated in at least FIG. 4B, one or more (connecting) tubes 103 may be used in any one or more embodiments between two tubes 103 whereby one or more of the (connecting) tubes 103 can be hollow and/or solid. In addition, any tube 103 (e.g., main, minor, connecting, etc.) may be straight and/or curved. More specifically, in at least FIG. 4, while only (e.g., main) tubes in the X, Y and Z directions may be used in one or more embodiments, one or more straight and/or curved connecting tubes 103 may be used to connecting the main tubes.

For example, in FIG. 4B, a first straight and/or curved connecting tube 103 connecting a first tube to a second tube, a second straight and/or curved connecting tube 103 connecting a first tube to a third tube, a third straight and/or curved connecting tube 103 connecting a first tube to a fourth tube, a fourth straight and/or curved connecting tube 103 connecting a first tube to a fourth tube, a fifth straight and/or curved connecting tube 103 connecting a second tube to a third tube, a sixth straight and/or curved connecting tube 103 connecting a second tube to a fifth tube, a seventh straight and/or curved connecting tube 103 connecting a second tube to a sixth tube, an eight straight and/or curved connecting tube 103 connecting a third tube to a fourth tube, a ninth straight and/or curved connecting tube 103 connecting a third tube to a fifth tube, a tenth straight and/or curved connecting tube 103 connecting a third tube to a sixth tube, an eleventh straight and/or curved connecting tube 103 connecting a fourth tube to a fifth tube, a twelfth straight and/or curved connecting tube 103 connecting a fourth tube to a sixth tube, etc. This structure provides numerous benefits, for example, the apparatus may provide a more of a roll like apparatus 200 provides.

In addition, in FIG. 4B, center portions 101 are now created where for example the two or more straight and/or curved connecting tube 103 meet the main tubes 103 thereby providing at least 7 center portions 101. Accordingly, each of the 7 center portions 101 may have one or more exit holes 102. Furthermore, the one or more exit holes 102 located in the middle center portion 101 may have a bigger exiting circumference hole than compared to the exit holes 102 on the outside 6 center portions 101.

It should be noted that any type of cap(s) 105 may be used with any apparatus 100 and/or apparatus 200. For example, a plug type cap with protruding lip may be used (e.g., the plug may be parallel and/or substantially parallel with the internal circumference of the tube 103), a threaded cap 105 that is flush with the tip of the tube end 104 (e.g., the second cap on the Y axis of FIG. 4B)

It should be noted that, according to one or more embodiments, one, two, three, four, five, six, etc. tubes and/or tube ends may each have (e.g., female) threading, and/or may have an associated cap, and/or may be permanently closed off, etc.

It should be noted that any and all features, individually and/or in any combination, as disclosed in at least FIG. 4 and/or any other Figure(s) may be used interchangeable with any other embodiment disclosed herein.

Figure 5:
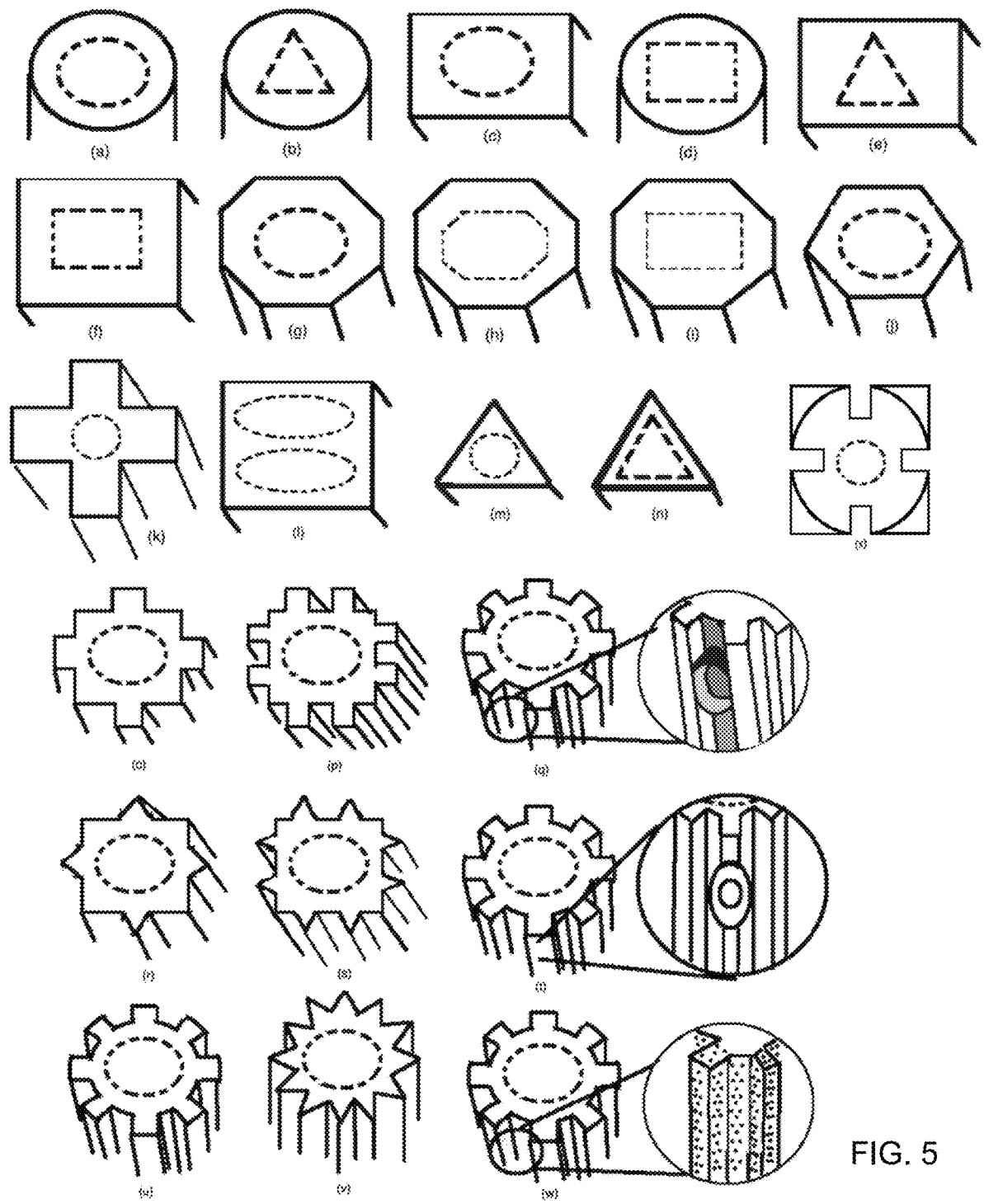
FIG. 5 is a diagram illustrating some of the possible (e.g., hollow) tube structures, etc. according to one or more embodiments described herein.

The tube(s) of one or more embodiments may be all uniform in style and/or shape, may be a combination of one or more styles, textures and/or shapes, etc. At least FIG. 5 illustrates some of the possible tube ends/tips 104 that can be used with any or all embodiments, some of the possible hollow tube structures, etc., and/or any combinations may be used. For example, the two oval holes of FIG. 5(*l*) (e.g., a square tube) may be used in another illustration e.g., the round tube of FIG. 5(*a*) (e.g., providing a concentric tube). Similarly, the rectangular hole of FIG. 5(*d*) may be used in another illustration e.g., the squared ridged tube of FIG. 5(0). Therefore, one or more disclosed aspects may be used interchangeably with one or more other disclosed aspects.

It should be noted that, according to one or more embodiments, any and all combination of tube hole types, styles, shapes, etc. may be used; in addition to any combination of two holes (e.g., FIG. 5(*l*)), three holes, four holes, etc. In addition, any of these tube ends may be used without a hole making them completely sealed off.

According to one or more embodiments, the center portion 101 and/or each tube 103 may include one or more circular and/or square crevasses built between two (or more) ridges where a treat may be placed (as illustrated in at least FIGS. 5(*q*) and 5(*t*)). Similarly, according to one or more embodiments, the center portion 101 and/or each tube 103 may include one or more circular and/or square crevasses built into one (or more) ridges where a treat may be placed—a gap(s) in the ridges may also be present for insertion of a treat(s).

According to one or more embodiments, the apparatus 100 (and/or 200) may be smooth in its external (and/or internal) surfaces (as illustrated in at least FIGS. 5(*q*) and 5(*t*)). However, according to one or more embodiments, the apparatus may also have a plurality of bumps all over the surfaces (e.g., FIG. 5(*w*)). For example, external bumps may allow for teeth cleaning purposes. Also, for example, internal bumps may allow for the treat to be slowed down in the transfer inside the apparatus slowing down the exit of the treats.

It should be noted that the disclosed structures of at least FIGS. 5(*q*) and 5(*t*) are intended to, for example, illustrate the tube structures from at least the center portion 101 extending to the tube end(s) 104. However, according to one or more embodiments, the structure(s), shape(s), texture(s), etc. as disclosed for the tubes may be extended to include the center portion 101 as well.

According to one or more embodiments, as illustrated in at least FIG. 5(*x*), any of the tubes 103 may have notches (square, rectangular, circular or the like) to for example insert a fin (e.g., a removable fin, a fin that is structurally connected to the container/sphere, etc.). It should be noted that the circular and square structure as illustrated in FIG. 5(*x*) together is to show that any type of tube used may be used to include notches (a square tube, a circular tube, any tube illustrated herewith, etc.). For example, a fin 120 may be used/inserted/placed between two tubes 103 along the plane/axis which the two tubes share.

It should be noted that any and all features, individually and/or in any combination, as disclosed in at least FIG. 5 and/or any other Figure(s) may be used interchangeable with any other embodiment disclosed herein. For example, any internal (tubes hole(s) being circular, rectangular, etc.), any external (arm structure being circular, rectangular, octagonal, etc.), and/or etc. of FIG. 5 may be used in any other embodiment.

Figure 6:
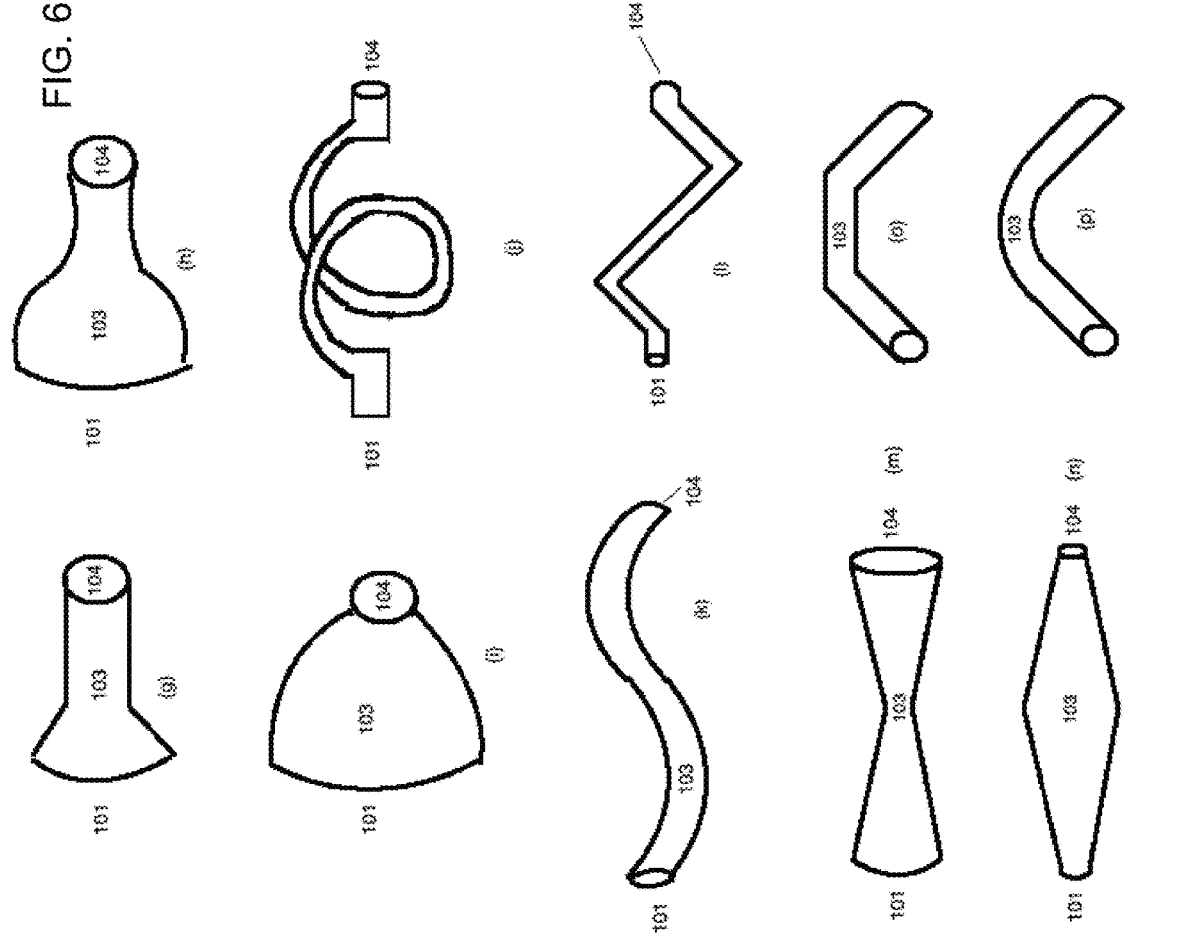
FIG. 6 is a diagram illustrating some of the possible (main) tube (extending arm/member) shapes, etc. according to one or more embodiments described herein.
Figure 6:
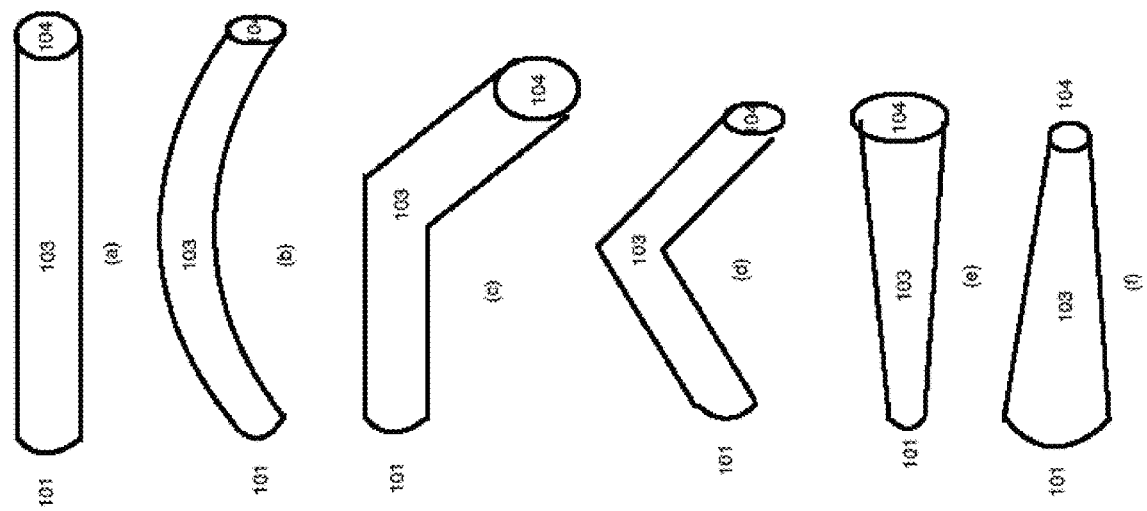

FIG. 6 illustrates some possible (main) tube (extending arm/member) shapes which can be used with any or all embodiments.

According to one or more embodiments, one, two, three, four, five, six . . . or all tube(s) 103 may be detachable from the center portion 101, thereby making the apparatus 100 and its pieces interchangeable. For example, replacing a center portion 101 with only one exit hole 102 to a center portion 101 with two or more exit holes 102, and/or a center portion 101 with hole(s) that are bigger and/or smaller than another center portion 101. Also, tubes 103 can be replaced with different types of tubes, different length of tubes, different shape of tubes, etc. In addition, the Figures including FIG. 6 illustrates some examples of the tubes used with the apparatus, whether it be interchangeable and/or formed to be one single piece with the center portion 101, the tube(s) 103, the apparatus 100 (and/or 200), etc.

As stated above, some possible (main) tube (extending arm/member) shapes which can be used with any or all embodiments are disclosed in, for example, FIG. 6. For example, a tube 103 may of any shape in an extending form like circular (e.g., FIG. 6(*a*)), oval, rectangular, square, triangular, and/or etc. In addition, the tube shapes may also extend in certain patterns, like a liner extension (e.g., FIG. 6(*a*)), a curved extension (e.g., FIG. 6(*b*)), a bent extension (FIG. 6(*c*), FIG. 6(*d*), etc.), an increasing extension (e.g., FIG. 6(*e*))—increasing linearly, in a convex manner, in a concave manner, and/or etc., a decreasing extension (e.g., FIG. 6(*f*))—decreasing linearly, in a convex manner, in a concave manner, and/or etc., an increasing then decreasing extension (e.g., FIG. 6(*e*) connected to FIG. 6(*f*))—increasing and/or decreasing linearly, in a convex manner, in a concave manner, and/or etc., a decreasing then increasing extension (e.g., FIG. 6(*f*) connected to FIG. 6(*e*))—increasing and/or decreasing linearly, in a convex manner, in a concave manner, and/or etc., a decreasing then linear extension (e.g., FIG. 6(*g*)) or vice versa—decreasing linearly, in a convex manner, in a concave manner, and/or etc., a spiral manner (e.g., FIG. 6(*j*)—spiral in an increasing, decreasing, in a linear fashion, and/or etc., and/or any combination thereof, etc.

In addition, the extensions may have the same style of extension but start and/or finish in different ways. For example, in at least FIG. 6(*c*), the tube 103 initially starts out in a straight extension from the center portion then bends at a 45, 90, etc. degree angle while in at least FIG. 6(*d*), the tube 103 starts out on an angled projection then bends. The same may be applied to any of the disclosed shapes, styles, patterns, etc.

It should be noted that any and all features, individually and/or in any combination, as disclosed in at least FIG. 6 and/or any other Figure(s) may be used interchangeable with any other embodiment disclosed herein.

According to one or more embodiments, one or more tubes 103 may have the same and/or different: width(s), length(s), height(s), internal circumference(s), external circumference(s), and/or etc. as compared to another tube 103.

It should be noted that, according to one or more embodiments, the tubes 103 as illustrated in at least FIG. 6 may also be examples of the connecting tubes (e.g., as illustrated in at least FIG. 4B). In addition, the illustrated tubes 103 as illustrated in at least FIG. 6 may be adapted to conform to be connecting tubes, for example, by curving the tubes like 6(*m*), 6(*n*), etc. to connect two tubes 103.

It should be noted that, according to one or more embodiments, the tubes 103 as illustrated in at least FIG. 6 may be used in reverse (the end connected to 101 may be instead the tube end, and vice versa). For example, the tube 103 in at least FIG. 6(*g*), FIG. 6(*h*), FIG. 6*i*), etc. may be used in reverse whereby the large end may be used at the tube end while the short end may be used to be connected directly to the center portion 101.

Figure 7:
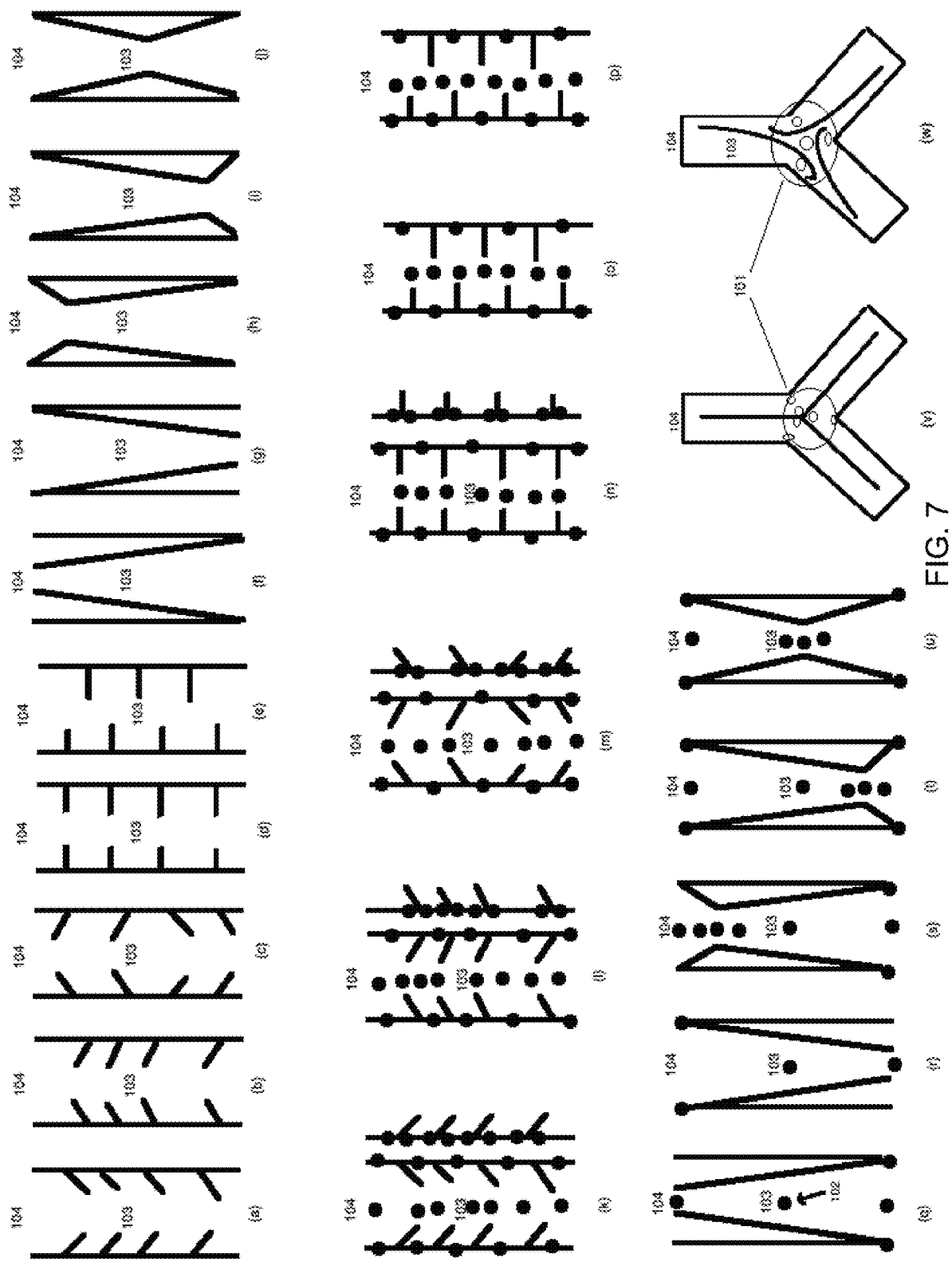
FIG. 7 is a diagram illustrating some of the possible locations, orientations, etc. of the projectiles (or the like), some of the internal structure, orientations, etc. of the inner walls, some of the possible locations of the exit holes, etc. 102 according to one or more embodiments described herein.

According to one or more embodiments, one or more tubes 103 may include a smooth tubular inside wall and/or may have a non-smooth tubular inside wall (e.g., FIG. 7). For example, non-smooth interiors may include a plurality of bumps, projectiles, flaps and/or leaflets, protrusions, limbs, leaves, rims, and/or a combination thereof, etc. which may be completely and/or partially circulating around the internal circumference. In addition, in one or more embodiments, the tips of one or more tubes may have a circular and paralleled ribbed pattern and/or (female/male) screw ribs for tube caps to be attached while the remainder of the tube and the apparatus is smooth in texture (e.g., similar/same and/or opposite to the tube end caps).

According to one or more embodiments, one or more tubes 103 may include a smooth tubular inside wall that has a (substantially) equal circumference from the opening (and/or from the area directly under the where the tube end starts/ends) to the base of the tube where the center portion exists.

According to one or more embodiments, one or more tubes 103 may include a smooth tubular inside wall that has a greater circumference from the opening (and/or from the area directly under the where the tube end starts/ends) as compared to the base of the tube where the center portion exists.

According to one or more embodiments, one or more tubes 103 may include a smooth tubular inside wall that has a smaller circumference from the opening (and/or from the area directly under the where the tube end starts/ends) as compared to the base of the tube where the center portion exists.

According to one or more embodiments and regardless of the circumference of the inner wall, the inner wall may include one or more bumps, projectiles, flaps and/or leaflets, protrusions, limbs, leaves, rims, and/or a combination thereof, etc.

These, projected, etc. may can assist with keeping treats closer to the holes and/or help keep the treats from exiting too easy.

According to one or more embodiments, the internal protrusions, limbs, leaves, rims, etc. of the tube(s) may be of a different width, a different shape, a different size, a different circumference, and/or etc.

According to one or more embodiments, the projectiles (or the like) may extend at an angle(s) substantially perpendicular to the axis that each tube extends, and/or that extends at an angle substantially obtuse to the axis that each tube extends, and/or that extends at an angle substantially acute to the axis that each tube extends, and/or a combination thereof to provide obstructions for the food to be slowed down in the toy from exiting too fast by holding some treats in place or for the treats to be speed up in the toy for faster exiting by not allowing treats to be held in place, etc.

FIG. 7, according to one or more embodiments, illustrate some of the possible locations, orientations, etc. of the projectiles (or the like), some of the internal structure, orientations, etc. of the inner walls, some of the possible locations of the exit holes 102, etc. It should be noted that the illustrated tube pieces in FIG. 7 may be an illustration of the entire tube and/or portion(s) of the tube—in other words, each disclosed tube piece may be stacked in any fashion with one or more other tube pieces (including duplication of the same piece).

According to one or more embodiments, one or more of the tubes may have protrusions/partitions that extend (substantially) perpendicular (approximately 90 degrees) to the wall of the tube (e.g., FIG. 7(*d*), FIG. 7(*e*), etc.), at an angle (approximately 45 degrees) in relation to the wall of the tube, etc. In addition, according to one or more embodiments, one or more of the tubes may have protrusions/partitions that extend parallel and/or substantially parallel to the wall of the tube 103 (e.g., FIG. 7(*v*), FIG. 7(*w*), etc.).

According to one or more embodiments, the center portion 101 (and/or the area where the tube(s) meet the center portion 101) may include partitions to connect certain tubes to each other while disconnecting some tube(s) from other tube(s)).

For example, a first tube 103 having at least one (or more) exit hole 102 along the tube (e.g., near the center portion 101) may have an opening to the ambient and/or the external environment via 104 but when the first tube's extension reaches the center portion 101, it is completely portioned off from any other tubes. Accordingly, a first type of treat may be housed in the first tube 103.

In addition, at least a second tube 103 and at least a third tube 103 may be connected to each other via the center portion 101, while at least these tubes are partitioned off from other tubes. Accordingly, a first type of treat may be housed in the first tube 103 while a second type of treat may be housed in the second/third tube set. This may be beneficial because the owner can put the lesser quantity of more expensive treats in the first tube while putting a greater quantity of less expensive treats in the second/third tubes which can accommodate more treats. Here, the second/third tube set may share at least one (or more) exit hole(s) in the center portion 101 and/or at least one (or more) exit hole(s) in one or more of the tube(s). This may also be beneficial because the owner can put treats in one compartment and use a plug (or other type of closing mechanism) that will not release treats so the pet will continue to play with the device thinking that more treats are available.

Accordingly, this may also work in any combination, single tubes with one, two or more exit hole(s) 102, and/or two tube sets with one, two or more exit hole(s) 102, and/or three tube sets with one, two, three or more exit hole(s) 102, and/or four tube sets with one, two, three, four or more exit hole(s) 102, and/or etc.

According to one or more embodiments, the treat dispensing apparatus 100 (and/or 200) may include one or more exit hole(s) 102 anywhere on the center portion 101 and/or one or more exit holes 102 anywhere on the tube(s) 103.

When center portion 101 is merely the intersection where all tubes meet, then exit hole(s) may be where at least two tubes 103 meet each other, where at least three tubes 103 meet each other, where at least four tubes 103 meet each other, where at least five tubes 103 meet each other, where at least six tubes 103 meet each other, etc.

In one or more embodiments, the exit holes 102 can be located only on the center portion 101 and not on the tubes 103.

It should be noted that any and all features, individually and/or in any combination, as disclosed in at least FIG. 7 and/or any other Figure(s) may be used interchangeable with any other embodiment disclosed herein.

In one or more embodiments, the circumference of the exit hole(s) 102 may be smaller than the circumference of the internal (hollow) circumference of the one or more of the tubes 103. If the circumferences of each tube 103 differ then the circumference of the exit hole 102 may be smaller than all of the circumferences of the internal (hollow) circumferences of all of the hollow tubes. In addition, if the circumferences of each tube 103 differ then the circumference of the exit hole 102 on a certain tube may be smaller than the circumference of the internal (hollow) circumference of that specific tube. For example, the circumference of the internal (hollow) circumference of the one or more of the tubes may be at least 25% (or 33.3%, or 50%, or etc.) larger than the circumference of an exit hole 102. For example, the circumference of the internal (hollow) circumference of the one or more of the center portion(s) 101 may be at least 25% (or 33.3%, or 50%, or 75%, or double, or triple, or etc.) larger than the circumference of an exit hole 102.

FIG. 8 illustrates some of the possible tube end covers/caps/plugs/stoppers/inserts/closing mechanism/opening mechanism/opening and closing mechanism/adapter/etc. 105 105 (also may be referred to as a closing and/or sealing mechanism/member) that may be used with one or more embodiments herein. More specifically, one or more tube end covers/caps/plugs/stoppers/inserts/closing mechanism/opening mechanism/opening and closing mechanism/adapter/etc. may be used interchangeably with any tube end 104. For example, the one or more tube end(s) 104 may be sealed via a tube end covers/caps/plugs/stoppers/etc. 105.

It should be noted that, according to one or more embodiments, covers/caps/plugs/stoppers/etc. may also be used with one or more exit hole(s) 102.

It should be noted that, according to one or more embodiments, one or more tube ends 104 may be completely sealed off (e.g., FIG. 8(*s*)), partially sealed/completely sealed off except for a single and/or plural slit (e.g., the double slit of FIG. 8(*i*) used with the sealed end of FIG. 8(*s*)), having a small round (and/or similar shape, e.g., square, rectangle, triangle, octogen, etc.) (e.g., FIG. 8(*i*), FIG. 8(*k*), FIG. 8(*c*), FIG. 8(*h*), etc.).

It should be noted that according to one or more embodiments, one, or two, or three, or four, or five, or six, or etc. tube ends 104 may be open to the ambient and/or the external environment, and/or one, or two, or three, or four, or five, or six, or etc. tube ends 104 may be completed sealed off (e.g., FIG. 8(*s*)), and/or may be structured in any combination as disclosed herewith.

For example, while each and/or some and/or all tube end(s) 104 (one, or two, or three, or four, or five, or six, or etc. tube ends) may be open to the ambient and/or the external environment and each open tube end(s) 104 may each have a cover/cap/etc. 105, in one or more embodiments, the treat dispensing apparatus 100 (and/or device/apparatus/container/sphere 200) may be designed with only one tube end 104 open to the ambient and/or the external environment with its one corresponding cover/cap 105 (and/or its corresponding closing mechanism (slit, male/female, female/male, etc.). Similarly, while there may be one or more exit hole 102 in each tube and/or one or more exit hole in the center portion 101, in one or more embodiments, the treat dispensing apparatus 100 (and/or device/apparatus/container/sphere 200) may be designed with only one exit hole 102 located at or near the center portion 101 (e.g., located only on one tube).

Accordingly to one or more embodiments, the apparatus 100 (and/or device/apparatus/container/sphere 200) may have one tube 103 with a sealable/closeable tube end 105 that is open to ambient and/or the external environment with the remaining tubes 103 completely closed off to the ambient and/or the external environment (not able to be opened), two tubes 103 with sealable/closeable tube ends 105 that are open to ambient and/or the external environment with the remaining tubes 103 completely closed off to the ambient and/or the external environment (not able to be opened), three tubes 103 with sealable/closeable tube ends 105 that are open to ambient and/or the external environment with the remaining tubes completely closed off to the ambient and/or the external environment (not able to be opened), four tubes 103 with sealable/closeable tube ends 105 that are open to ambient and/or the external environment with the remaining tubes completely closed off to the ambient and/or the external environment (not able to be opened), five tubes 103 with sealable/closeable tube ends 105 that are open to ambient and/or the external environment with the remaining tubes completely closed off to the ambient and/or the external environment (not able to be opened), six tubes 103 with sealable/closeable tube ends 105 that are open to ambient and/or the external environment with the remaining tubes 103 completely closed off to the ambient and/or the external environment (not able to be opened), seven tubes 103 with sealable/closeable tube ends 105 that are open to ambient and/or the external environment with the remaining tubes 103 completely closed off to the ambient and/or the external environment (not able to be opened), eight tubes 103 with sealable/closeable tube ends 105 that are open to ambient and/or the external environment with the remaining tubes 103 completely closed off to the ambient and/or the external environment (not able to be opened), nine tubes 103 with sealable/closeable tube ends 105 that are open to ambient and/or the external environment with the remaining tubes 103 completely closed off to the ambient and/or the external environment (not able to be opened), ten tubes with sealable/closeable tube ends 105 that are open to ambient and/or the external environment with the remaining tubes 103 completely closed off to the ambient and/or the external environment (not able to be opened), eleven tubes 103 with sealable/closeable tube ends 105 that are open to ambient and/or the external environment with the remaining tubes completely closed off to the ambient and/or the external environment (not able to be opened), twelves tubes 103 with sealable/closeable tube ends 105 that are open to ambient and/or the external environment with the remaining tubes 103 completely closed off to the ambient and/or the external environment (not able to be opened), etc.

Covers/caps 105 may be used interchangeably. According to one or more embodiments, a first cover/cap 105 that completely closes off the tube end 105 may be used when the treat dispensing apparatus 100 is used for example without the container/sphere 200 and a second over that partially closes off (minimizing the tube end to decrease the size to allow a slow flow rate of treats to exit) the tube end 105 may be used when the treat dispensing apparatus 100 is used for example with the container/sphere 200 in order for the treats to exit via the tube ends 105.

The inside tip of each tube end 104 may be smooth or have some type of (ridged) pattern to accept a tube end cover/cap 105. For example, a pattern for the inside tip of a tube end 104 may be a clockwise or counterclockwise screw pattern (e.g., FIG. 8(a)) to accept a male and/or female screw type cap (e.g., FIG. 8(b), FIG. 8(c), FIG. 8(e), etc.). Another example may be that the inside tip of each tube end 104 may have internal (e.g., parallel) ridges that protrude into the tube 103 (e.g., FIG. 8(f)) to accept for example, a cap 105 with external (e.g., parallel) ridges that protrude towards the tube 103 (e.g., FIG. 8(d), FIG. 8(g), FIG. 8(h), etc.). In addition, a cap 105 may be designed with protruding, internal rides and/or a combination of alternating protrusions/internal rides that are (substantially) parallel with the axis of the tube (tip) extension (e.g., FIG. 8(k)). Furthermore, a cap 105 may be designed with uniformed (e.g., FIG. 8(l)) and/or staggered bumps—whereby the internal tip of the tube tip may be designed to have indentions matching the bump pattern of the cap 105 to allow for better stayed (placed) connection.

For example, FIG. 8(b) and FIG. 8(c) illustrate a cap 105 that may be designed with for example an internal groove with and/or without exit hole(s) 102. In addition, FIG. 8(d), FIG. 8(g) and FIG. 8(h) illustrate a cap 105 that may be designed with for example a protruding member with and/or without exit hole(s). Furthermore, FIG. 8(e) and FIG. 8(j) illustrate a cap 105 that may be designed with for example with two internal groves, allowing for a pitch turn and/or pull, with and/or without exit hole(s) 102. Also, FIG. 8(i) and FIG. 8(k) illustrate a cap 105 that may be designed with for example with a circular exit hole(s) 102.

According to one or more embodiments, one or more of the caps 105 may have a lip/extension on at least the top of the cap 105. For example, FIG. 8(i) illustrates an outward lip/extension on at least the top of the cap 105.

In one or more embodiments, a 2-piece container/sphere 200 may be used (e.g., FIG. 8(w)) where the 2-piece container/sphere 200 may meet each other (e.g., snap in place) along the same axis/plane of the two tubes 103 existing on the same axis. For example, caps 105 without a lip may be used in the circle highlighted tube ends 104 while caps 105 with a lip may be used in the rectangular highlighted tube ends so that the lipped caps can better hold the container/sphere together as the pressure of the two lipped caps are approximately perpendicular to the meeting plane of the 2-piece container/sphere 200. However, it should be noted that any tube end 104 may be adapted to accept any type of cap 105 (e.g., with and without a lip). It should also be noted that a cap 105 with a lip may also have any type of surface on its body, like a smooth surface, a screw pattern surface (e.g., FIG. 8(b)), a parallelly ridged surface (e.g., FIG. 8(d), FIG. 8(k), etc.), a bumped surface (e.g., FIG. 8(l)), etc.

According to one or more embodiments, one or more caps 105 may have a square lip (e.g., FIG. 8(n)), a rounded lip, a decreasing slanted lip (e.g., FIG. 8(o)), an increasing slanted lip, a straight and folded over lip (e.g., FIG. 8(m)), a rounded and folded over lip (e.g., FIG. 8(m) with rounded edges instead of 90 degree angles), etc.

It should be noted that, according to one or more embodiments, caps 105 with folded over lips may have a parallelly ridged surface, and/or screwed patterns, and/or be smooth, and/or bumped pattern, etc. on the inside lip to provide for better holding.

According to one or more embodiments, FIGS. 8(p) through 8(r) and 8(t) through 8(v) illustrate some ways the one or more caps 105 may connect to the container/sphere 200.

For example, according to one or more embodiments, in FIGS. 8(p) through 8(r) and 8(t) through 8(v), the top surface of the container/sphere 200 may be represented by the first top lines 801 extending away from tube end 104 while the bottom surface of the container/sphere 200 may be represented by the second top lines 802 extending away from tube end. It should be noted that other caps 105 with lips (e.g., rounded edges, etc.) may be structured in a similar way with the container/sphere placement.

For example, according to one or more embodiments, in FIGS. 8(p) through 8(r) and 8(t) through 8(v), the top surface of the container/sphere 200 may be represented by the first top lines 801 extending away from tube end 104 while the bottom surface of the container/sphere 200 may be represented by the second top lines 803 extending away from tube end 104. It should be noted that other caps 105 with lips (e.g., rounded edges, etc.) may be structured in a similar way with the container/sphere placement.

For example, according to one or more embodiments, in FIGS. 8(p) through 8(r) and 8(t) through 8(v), the top surface of the container/sphere 200 may be represented by the first top lines 801 extending away from tube end 104 while the bottom surface of the container/sphere 200 may be represented by the second top lines 804 extending away from tube end 104. It should be noted that other caps 105 with lips (e.g., rounded edges, etc.) may be structured in a similar way with the container/sphere placement.

For example, according to one or more embodiments, in FIGS. 8(p) through 8(r) and 8(t) through 8(v), the top surface of the container/sphere 200 may be represented by the first top lines 802 extending away from tube end 104 while the bottom surface of the container/sphere 200 may be represented by the second top lines 803 extending away from tube end 104. It should be noted that other caps 105 with lips (e.g., rounded edges, etc.) may be structured in a similar way with the container/sphere placement.

For example, according to one or more embodiments, in FIGS. 8(p) through 8(r) and 8(t) through 8(v), the top surface of the container/sphere 200 may be represented by the first top lines 802 extending away from tube end 104 while the bottom surface of the container/sphere 200 may be represented by the second top lines 804 extending away from tube end 104. It should be noted that other caps 105 with lips (e.g., rounded edges, etc.) may be structured in a similar way with the container/sphere placement.

For example, according to one or more embodiments, in FIGS. 8(*p*) through 8(*r*) and 8(*t*) through 8(*v*), the top surface of the container/sphere may be represented by the first top lines 803 extending away from tube end 104 while the bottom surface of the container/sphere 200 may be represented by the second top lines 804 extending away from tube end 104. It should be noted that other caps 105 with lips (e.g., rounded edges, etc.) may be structured in a similar way with the container/sphere placement.

In addition, according to one or more embodiments, FIGS. 8(*p*) through 8(*r*) and 8(*t*) through 8(*v*) may be structured like FIG. 8(*v*) where the container/sphere may reach the tube end 104 (dashed lines) and/or there may be a space between the part of the top of the container/sphere 200 to the tube end tip in order for better grasping by a user. In addition, a tube end 104 may be structured where it has a (e.g., squared) U shape in order to completely house the (e.g., rounded, squared, etc.) T caps in place.

In addition, according to one or more embodiments, the thickness of the tubes 103 (including but not limited to the tube ends 104) may be less and/or more than illustrated. For example, the dashes lines of the tube 103 of at least FIG. 8(*t*) illustrate that the external surface is extended whereby creating a gap for easier grip on the cap end—this would also be applicable to for example FIG. 8(*u*) where the flat surface is extended thereby pushing out the start of the inclined portion thus creating a gap for easier grip on the end cap by the user.

It should be noted that while the parallel ridged caps are illustrated in at least FIGS. 8(*p*) through 8(*r*) and 8(*t*) through 8(*v*), the surfaces may be smooth, screw fashioned, bumps, a combination thereof, etc. Similarly, the top of the tube end tips may also be parallel ridged, smooth, screw fashioned, bumps, a combination thereof, etc.

It should be noted that, according to one or more embodiments, one or more (2, 3, 4, 5, 6, 7, 8, etc.) tube ends 104 may be completely sealed off (e.g., FIG. 8(*s*)). For example, while FIG. 8(*s*) illustrates a square/rectangular closure tip, the closed tip may be rounded, triangular, etc. as long as it is sealed off. It should also be noted, in at least FIG. 8(*s*), etc., that either the interior of the tube end, the exterior of the tube end, and/or both the interior and exterior of the tube end may be structed in a square, rectangular, rounded, etc. shape.

Each feature, and/or two or more features, and/or three or more features, four or more features, . . . and/or all features of FIG. 8 (and/or FIGS. 1-7 and 9-21) may be used in any combination with one another. In addition, while the cover(s) 105 may be illustrated in a slimming fashion, the cover(s) 105 may be symmetric to the interior of the tube end wall, and/or a (slightly) increasing size to require an increased pull to remove the inserted cap, and/or any shape to allow for insertion and/or connectivety. For example, the lip structure of at least FIG. 8(*i*) which may be one or more combinations of FIG. 8(*m*), FIG. 8(*n*), FIG. 8(*o*), and/or etc. may be used along with one or more combinations of for example FIG. 8(*c*), FIG. 8(*d*), FIG. 8(*h*), FIG. 8(*j*), FIG. 8(*k*), FIG. 8(*l*), and/or etc.

It should be noted that while FIG. 8(*o*) illustrates the cap 105 having an inclining angled top cap, the cap 105 may instead have a declining angled top cap. While one benefit of an inclining angled top is that a user can more easily grasp the top cap to pull it off, one benefit of a declined top cap is the declined top cap become flush with the container/sphere surface so there is less the pet can more easily grasp with their teeth.

It should be noted that while tube covers/caps 105 are illustrated as cylindrical, etc., tube covers/caps 105 may be oval, triangular, circular, square/rectangular, polygonal, hexagonal, heptagonal, octagonal, star shaped, etc. More specifically, the tube covers/caps 105 may be shaped to fit the tube end 104.

It should be noted that while the Figures (e.g., FIG. 8 and all other Figures) may illustrate the apparatus parts as two dimensional, the apparatus part may be viewed as three dimensional, e.g., cylindrical in shape.

In other words, any and all features, individually and/or in any combination, as disclosed in FIG. 8 (and FIGS. 1-7 and FIGS. 9-11) may be used interchangeable with any other embodiment disclosed herein.

According to one or more embodiments, at least one (or more) of the exit hole(s) 102 (and up to all of the exist holes) may have a tip similar to any of the tube ends 104 so that an exit hole(s) 102 may be plug completely shut if the user desire to have less exit holes exist, and/or so that an exit hole(s) may be capped with cap/plug 105 that has a (smaller) hole so that the apparatus can be used with treats that are smaller, and/or etc. For example, an exit hole(s) 102 may have a tip like FIG. 8(*a*), FIG. 8(*f*), etc. and may have a plug with a hole like FIG. 8(*k*) in order to reduce the exit hole size so that small treats don't just rush out too quickly. Accordingly, the holes in any or all caps 105 may come in a plurality of sizes (e.g., small, medium and large) and/or shapes (e.g., circular, triangular, square/rectangular, polygonal, hexagonal, heptagonal, octagonal, star shaped, etc.), and/or etc. According to one or more embodiments, an adapter (e.g., another cap) may also be inserted in the caps 105 to further limit the size of the exit hole in a cap 105.

Figure 9:
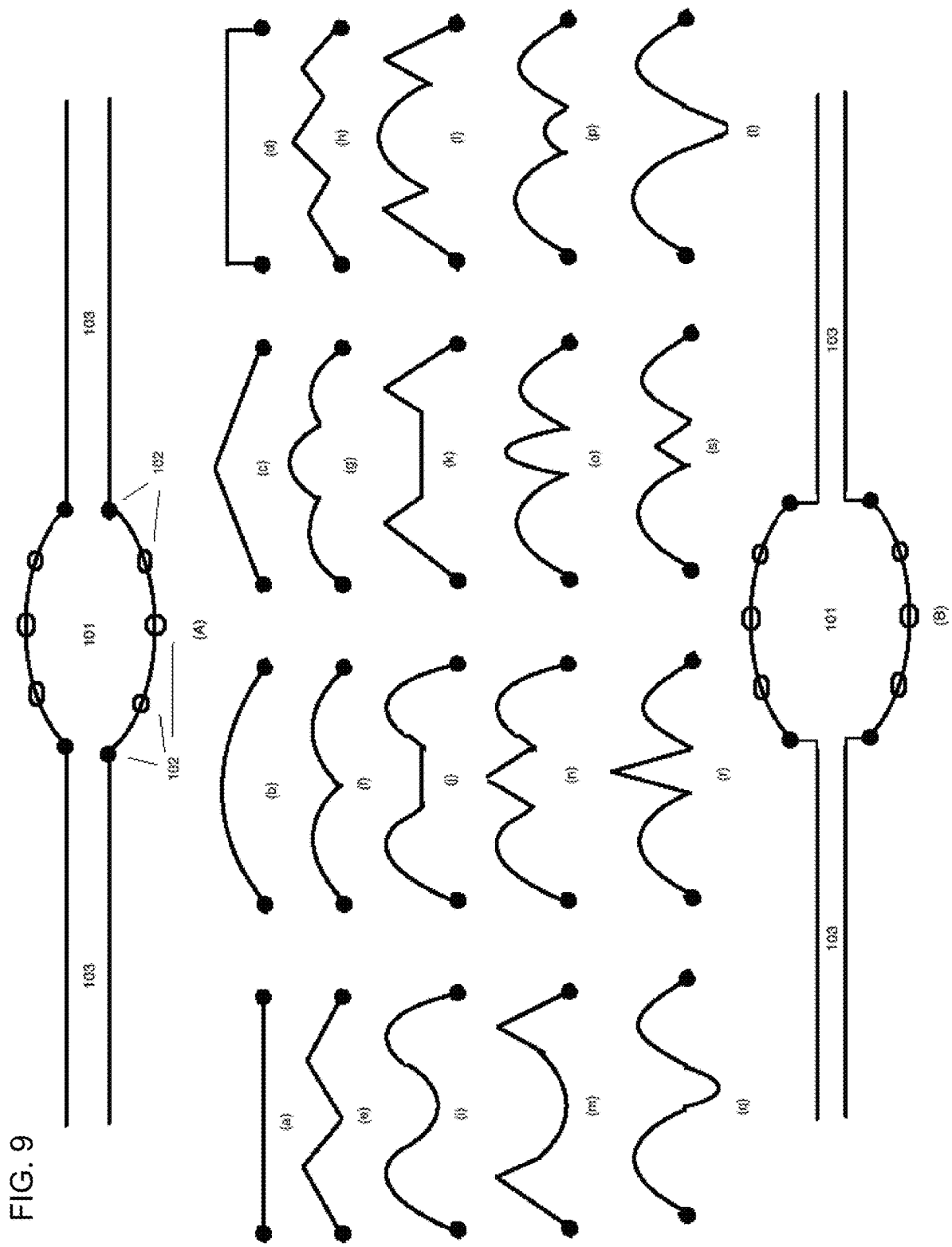
FIG. 9 is a diagram illustrating some of the possible center portions 101 according to one or more embodiments described herein.

FIG. 9 illustrates some possible center portions 101 according to one or more embodiments.

The center portion 101 may be of any shape and/or size, etc. For example, it can be round, football shaped, tennis ball shaped, soccer ball shaped, etc. It may also have the look and color of certain desirable toys, like a green fabric/white rubber tennis ball (it may even be an actual tennis ball), brown leather white stitched football, a black and white soccer ball, etc.

While the center portion 101 is not limited to any shape, size, color, etc., as it may be the shape/color of a tennis ball, soccer ball, football, baseball, etc., it may also have other shape/structures. For example, a center portion 101 may have a spherical shape, a square/rectangular shape, triangular shape, polygonal shape, hexagonal shape, heptagonal shape, octagonal shape, star shaped, etc.

FIG. 9 illustrates some possible center portion shape/structures, for example, FIGS. 9A (and 9(*b*)) illustrates a curvature from the intersection of at least two tubes 103. However, the connection between two tubes 103 may be a direct connection (e.g., FIG. 8(*a*)), and/or a direction connection with one bend (e.g., FIG. 9(*c*)), a raised connection (e.g., FIG. 9(*d*)), a multi-bended structure (e.g., FIG. 9(*e*)), etc. The examples set forth in FIG. 9 are only samples as there are many more possibilities.

It should be noted that exit holes 102 may be located anywhere on the center portions 101, e.g., in the center of the two illustrates exit holes 102, the center between two change of angles (e.g., between two bends, etc.), at the change of an angle, etc.

It should be noted that, according to one or more embodiments, at least the locations of the exit holes 102 on FIG. 9A may be similarly located on any center portions 101 as disclosed herein.

According to one or more embodiments, a grooved pattern(s) may be used on the internal and/or external tubes which the groove(s) would continue straight to the exit hole(s) in order to help assist the treats to exit (and/or enter an exit hole(s)). For example, the external grooves as illustrated in at least FIG. 5(k), 5(p), 5(q), 5(s), 5(t), 5(u), 5(v), 5(w), etc. would extend along the entire tube(s) and to the center portion 101 and to the center of the center portion 101 where an exit hole 102 exist. In regard to FIG. 5(k), for example, the V created between two of the protrusions would extend directly to at least the exit hole 102 on the center portion so that the treat slides right into the exit hole 102. In regard to FIG. 5(p), for example, the squared U created between two of the protrusions on a side wall would extend directly to at least the exit hole 102 on the center portion 101 so that the treat slides right into the exit hole 102. In regard to FIG. 5(q), for example, the widened squared U created between two of the protrusions would extend directly to at least the exit hole 102 on the center portion so that the treat slides right into the exit hole 102. In regard to FIG. 5(s), for example, the widened V created between two of the protrusions on a side wall would extend directly to at least the exit hole on the center portion 101 so that the treat slides right into the exit hole 102. In regard to FIG. 5(v), for example, the V created between two of the protrusions would extend directly to at least the exit hole 102 on the center portion 101 so that the treat slides right into the exit hole 102.

It should be noted that the illustrated protrusions on FIGS. 5(q) and 5(t) may also be exit holes 102.

It should be noted that any and all features, individually and/or in any combination, as disclosed in at least FIG. 9 and/or any other Figure(s) may be used interchangeable with any other embodiment disclosed herein.

Figure 10:
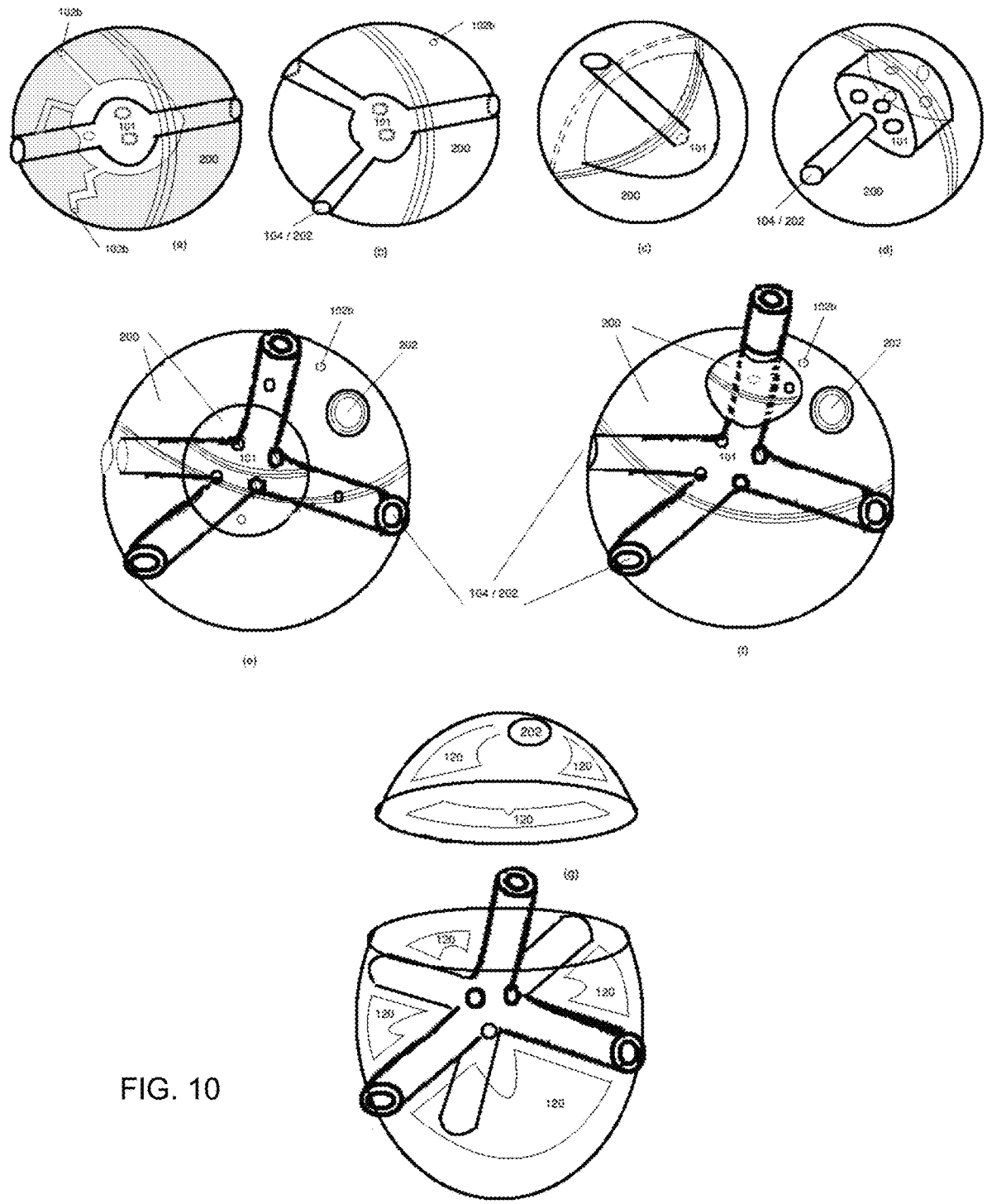
FIG. 10 is a diagram illustrating some of the possible configurations of the container/sphere 200 (and/or apparatus 100) according to one or more embodiments described herein.

FIG. 10 illustrates some of the possible configurations of the container/sphere 200 (and apparatus 100) that may be used in one or more embodiments. While FIGS. 1-21 separately and/or in combination illustrate that at least any of the features of FIGS. 1-21 may be used individually and/or in any combination with any other feature(s) of FIGS. 1-21 to provide an apparatus (100 and/or 200) with one or more tubes 103, one or more center portions 101, etc.; the container/sphere 200 is made to enclose that apparatus 100 (e.g., to have a structure that encloses the apparatus 100 whereby the tube ends line up/match with (one or more or all) container/sphere exit ports 202.

According to one or more embodiments, the treat dispensing apparatus 100 may be used with a second (same one-piece structure and/or separate) apparatus (container/sphere) 200. It should be noted that the container/sphere 200 may be a circular structure, an oval structure, an octagonal structure, a hexagonal structure, a cube structure, etc. The second apparatus 200 is for example a container/sphere type shape that encloses over the treat dispensing apparatus 100 allowing to treat dispensing work for example in reverse (treats start in the empty space of the container/sphere 200, enter the apparatus 100 via exit holes 102 and exit the entire structure (100 and 200) via the tube ends 104). For example, the container/sphere 200 is like two half food bowls that seal around the treat dispensing apparatus 100 (and/or device/apparatus 200) to take food from the bowl and by means of rolling, bouncing, etc. feed treats (and/or food) through the exit holes 102 of the treat dispensing apparatus 100 (and/or device/apparatus 200) and provide the treats (and/or food) exiting the tube end(s) 104.

According to one or more embodiments, the container/sphere 200 may be comprised of a plurality of pieces (e.g., two bowl shapes that connect to one another and/or connect to the treat dispensing apparatus) to enclose most or all of the treat dispensing apparatus 100 (and/or device/apparatus 200) (e.g., to enclose most or all of the exist hole(s) 102) and/or the container/sphere 200 is made as part of the apparatus 100. The container/sphere 200 may enclose the treat dispensing apparatus 100 (and/or one or more other devices/apparatuses/container/spheres 200) where the short portions of (some or all of) the tube ends 104 protrude out of the container/sphere (e.g., like the ball of a morning start or spiked balled), and/or (some or all of) the tube ends 104 are flush with the container/sphere's surface, and/or (some or all of) the tube ends 104 terminate inside the casing of the container/sphere but leave some distance from the termination of the tube ends 104 to the outer surface of the container/sphere 200 creating an inner lip.

The shape of container/sphere 200 is not limited to a smooth rounded container/sphere/ball and/or a (rounded) cubed shape surface. For example, in one or more embodiments, the container/sphere 200 may be a container, an encapsulating member/apparatus, a platonic solid, a rounded cubic structure, a round shape, a spherical shape, an apparatus with the shape of a Platonic solid where segments are shaped convexly, even and/or uneven, a truncated icosahedron shape, a truncated icosahedron shape, a rectified truncated icosahedron shape, an expanded truncated icosahedron shape, a truncated rectified truncated icosahedron shape, a snub rectified truncated icosahedron shape, and/or the like.

It should be noted that the truncated icosahedron shape is limited to having a number of solid faces (pentagonal faces, hexagonal faces, etc.) of the same/similar size. For example, in one or more embodiments, the truncated icosahedron shape may have a number of solid faces with at least one different solid face sizes/shape (one different solid face sizes/shape, two different solid face sizes/shapes, three different solid face sizes/shapes, four different solid face sizes/shapes, five different solid face sizes/shapes, six different solid face sizes/shapes, seven different solid face sizes/shapes, eight different solid face sizes/shapes, nine different solid face sizes/shapes, ten different solid face sizes/shapes, eleven different solid face sizes/shapes, twelve different solid face sizes/shapes, thirteen different solid face sizes/shapes, etc.). For example, the container/sphere may look like a soccer ball with flat faces with the same/similar surface areas for each flat face, and/or the container/sphere may look like a soccer ball with flat faces with the different surface areas for each flat face (thereby making the roll of the container/sphere erratic), etc.

It should be noted that, according to one or more embodiments, the faces of the container/sphere 200 may be of any shape(s), like three sided shapes (e.g., triangular), four sided shapes (e.g., square/rectangular), five sided shapes (e.g., pentagon), six sided shapes (e.g., hexagon), seven sided shapes (e.g., heptagon), eight sided shapes (e.g., octagon), etc. and/or any combination thereof. It should also be noted that, according to one or more embodiments, the faces can be of and/or any mix of size, shape, etc.

It should be noted that in one or more embodiments, the container/sphere 200 may be formed as the same single piece as the apparatus 100 and/or as one or more separate piece(s). In addition, it should be noted that in one or more embodiments, the container/sphere 200 may be formed as one or more separate pieces, like two substantially equal semi-container/half spheres (e.g., hemicontainer/sphere), etc.

It should be noted that while the container/sphere 200 is illustrated/disclosed to be used with one specific type of tubed apparatus 100 (e.g., 6 tubes), the container/sphere 200 can be adapted to have corresponding (more and/or less) port exit holes 202 to be used with other tubes apparatuses 100 (e.g., 2 tubes, 3 tubes, 4 tubes, 5 tubes, 7 tubes, etc.). Accordingly, the illustrated/disclosed features of the container/sphere(s) 200 may be used interchangeable with any or all embodiments disclosed/illustrated herein.

According to one or more embodiments, the thickness of the container/sphere 200 may be equal to, less than or greater than either the thickness of a wall of the apparatus 200 (e.g., tube wall, center portion wall, etc.), the diameter of the hallow tube center, the diameter of the tube 103, etc. In addition, according to one or more embodiments, the thickness of the container/sphere 200 may be very thick (e.g., FIG. 10(*a*)) where there is enough room for a pet's dinner amount. For example, the space between the inner surface of the container/sphere 200 to the outer surface of the apparatus 100 may be at least 5 cubic inches of space, at least 10 cubic inches of space, at least 20 cubic inches of space, at least 35 cubic inches of space, at least 50 cubic inches of space, at least 75 cubic inches of space, at least 100 cubic inches of space, at least 125 cubic inches of space, at least 150 cubic inches of space, at least 200 cubic inches of space, at least 250 cubic inches of space, at most 20 cubic inches of space, at most 35 cubic inches of space, at most 50 cubic inches of space, at most 75 cubic inches of space, at most 100 cubic inches of space, at most 125 cubic inches of space, at most 150 cubic inches of space, at most 200 cubic inches of space, at most 250 cubic inches of space, at most 300 cubic inches of space, at most 400 cubic inches of space, and/or etc. which for example is dependent on at least a dog size, whether eating meal, whether eating snacks, and/or etc.

The container/sphere 200 (and/or apparatus 100) may be made of any material, hard and/or soft materials. For example, the container/sphere 200 (and/or apparatus 100) may be made of substantially all flexible (naturally bendable) material that makes the apparatus bouncier (and/or chewable), for example, materials like rubber, synthetic rubber, polymer, silicone, plastic, composite materials, durable natural rubber, nylon, combinations thereof, and/or etc. The container/sphere 200 (and/or apparatus 100) may be made of hard plastic or the like. The container/sphere 200 (and/or apparatus 100) may be made of a non-metal material, e.g., at least the majority (or all) of the apparatus 100 is made of non-metal (non-metallic) material—accordingly, it may substantially be metal free. In other words, the container/sphere 200 (and/or apparatus 100) may be made of (substantially) only material that comprise one and/or more and/or a combination of rubber, synthetic rubber, polymer, silicone, plastic, composite materials, durable natural rubber, nylon, combinations thereof, and/or etc. The container/sphere 200 (and/or apparatus 100) may also be made of non-flexible materials, hard plastic/rubber, etc.

The container/sphere 200 and/or apparatus 100 may have any hardness and/or softness. For example, the container/sphere 200 and/or apparatus 100 may have a Shore 00 hardness (0, 10, 20, 30, 40, 50, 60, 70, 80, 90, 100), a Shore A hardness (0, 10, 20, 30, 40, 50, 60, 70, 80, 90, 100), a Shore D hardness (0, 10, 20, 30, 40, 50, 60, 70, 80, 90, 100), etc.

According to one or more embodiments, a first (half) part of the container/sphere 200 may connect to a second (half) part via a Joining member. For example, a joining member may be a lipped member on each end of the parts to allow for a snapping and/or clipping and/or locking and/or clicking and/or sliding, and/or etc. into place with one another to provide a (substantially) smooth inner and/or outer surface of the container/sphere 200.

According to one or more embodiments, the joining member may located (substantially) perpendicular (e.g., 90 degrees) to one or more tube(s) of the apparatus 100, and/or may be located (substantially) parallel (e.g., 0, 180 and/or 360 degrees) to one or more tube(s) of the apparatus 100, and/or may be located at an angle that is (substantially) acute and/or (substantially) obtuse (e.g., 45, 135, 225, and/or 270 degrees) in relation to one or more tube(s) 103 of the apparatus 100, and/or may be located along the same plane as one or more tube(s) 103 of the apparatus 100, and/or etc.

According to one or more embodiments, a container/sphere 200 may be split into two pieces (of a symmetric container/sphere) in approximately 50/50 measurements, approximately 49/51 measurements, approximately 48/52 measurements, approximately 47/53 measurements, approximately 46/54 measurements, approximately 45/55 measurements, approximately 44/56 measurements, approximately 43/57 measurements, approximately 42/58 measurements, approximately 41/59 measurements, approximately 40/60 measurements, approximately 39/61 measurements, approximately 38/62 measurements, approximately 37/63 measurements, approximately 36/64 measurements, approximately 35/65 measurements, approximately 34/66 measurements, approximately 33/67 measurements, approximately 32/68 measurements, approximately 31/69 measurements, approximately 30/70 measurements, approximately 29/71 measurements, approximately 28/72 measurements, approximately 27/73 measurements, approximately 26/74 measurements, approximately 25/75 measurements, approximately 24/76 measurements, approximately 23/77 measurements, approximately 22/78 measurements, approximately 21/79 measurements, approximately 20/80 measurements, approximately 19/81 measurements, approximately 18/82 measurements, approximately 17/83 measurements, approximately 16/84 measurements, approximately 15/85 measurements, approximately 14/86 measurements, approximately 13/87 measurements, approximately 12/88 measurements, approximately 11/89 measurements, approximately 10/90 measurements, approximately 9/91 measurements, approximately 8/92 measurements, approximately 7/93 measurements, approximately 6/94 measurements, approximately 5/95 measurements, approximately 4/96 measurements, approximately 3/97 measurements, approximately 2/98 measurements, approximately 1/99 measurements, etc.

According to one or more embodiments, the container/sphere 200 may have a number of (main) exit ports 202 (which may correspond to the tube ends 104) to be equal to, less than and/or greater than the number of tubes 103 (and/or the number of tube ends 104). In addition, according to one or more embodiments, the container/sphere 200 may have its own one or more (minor) exit holes (e.g., 102*b*). The (minor) exit holes 102*b* may go from the inside surface of the container/sphere 200 to the outside surface of the container/sphere 200 in a direct/linear/straight manner or it may have a non-direct/non-linear/non-straight route (e.g., curved route, jagged route, zigzagged route, etc.). In addition, the exit holes 102*b* may go from the inside surface of the container/sphere 200 into one or more of the tubes 103.

According to one or more embodiments, FIG. 10(a) illustrates how the container/sphere 200 has at least two exit ports 202 that correspond to the two tube ends 104. In addition, it should be note that (e.g., two) caps 105 may be used to better hold the container/sphere in place.

According to one or more embodiments, the joining member of at least FIG. 10(a) may be located in, for example, a location (substantially) that perpendicular intersects the axis of the tubes 103.

According to one or more embodiments, the container/sphere 200 itself may have an additional exit port(s) 202 and/or exit holes 102b to allow for faster releasing of treats. For example, at least FIG. 10(a) and FIG. 10(b) illustrate that any container/sphere 200 may include one or more additional exit port(s) 202 and/or exit holes 102b for treats to merely exit out on their own. In addition, at least FIG. 10(a) illustrates that any container/sphere 200 may include one or more additional exit port(s) 202 and/or exit holes 102b to exit the container/sphere's open cavity and each enter one or more exit holes that enter directly back into one or more tubes—and the path from the container/sphere's open cavity to the tube may be straight, bent (as illustrated), curved, etc.

According to one or more embodiments, the container/sphere 200 may have a symmetrical outer and/or inner surface (e.g., FIG. 10(a)), and/or the container/sphere 200 may have protruding portions on the inner surface to allow for treats to be more easily exited into the tubes from the center of the container/sphere, and/or etc. For example, in inner surface may have a (curved, sharp, or combination thereof) jagged surface.

If the container/sphere has a symmetrical outer and inner surface, then the container/sphere may also be designed with inserts to similar to the protruding portions so that they may or may not be added to the inside of the container/sphere.

According to one or more embodiments, a one-piece (and/or multi-piece) container/sphere 200 may be used and slide over the apparatus 100 (and/or device/apparatus 200) whereby two end caps 105 are used to secure the container/sphere to the apparatus 100.

According to one or more embodiments, FIG. 10(b) illustrates how the container/sphere 200 has at least three (main) exit ports 202 that correspond to the three tube ends 104. In addition, it should be note that (e.g., three) cap end 105 may be used to better hold the container/sphere 200 in place.

According to one or more embodiments, the joining member of at least FIG. 10(b) may be located in, for example, a location (substantially) that perpendicular intersects the axis of one of the tubes 103.

According to one or more embodiments, FIG. 10(c) and FIG. 10(d) illustrates how for example the container/sphere 200 may be used with only one tube 103 and one center portion 101. For example, a single tube 103 may extend from the container/sphere 200 to a center portion 101 in the shape of, for example, a cup, a bowl, a cone, a semi/half container/sphere, a ball, a tire, an umbrella, etc. where the tube 103 may extend so that the center portion 101 may be located in the center of the container/sphere 200 and/or the tube 103 may extend to and/or past the center so that the center portion 101 is located close to and/or almost abutting the other side of the container/sphere 200. It should be noted that exit holes 102 may be located anywhere on the center portion 101.

It should be noted that, according to one or more embodiments, the tube(s) 103, the center portion(s) 101 and/or the container/sphere portion(s) may be one single structural piece which may be desirable for at least the apparatuses with only one tube 103 but may also be applied to other combinations of more than one tube 103, more than one center portion 101, etc.

According to one or more embodiments, the apparatus 100 may include one or more tubes 103 that extend from the epi-center of the apparatus 100 (and/or container/sphere 200) by a first length a, one or more tubes 103 that extend from the epi-center of the apparatus 100 (and/or container/sphere 200) by a second length b, one or more tubes 103 that extend from the epi-center of the apparatus 100 (and/or container/sphere 200) by a third length c, one or more tubes 103 that extend from the epi-center of the apparatus 100 (and/or container/sphere 200 and/or the center portion 101) by a fourth length d, one or more tubes 103 that extend from the epi-center of the apparatus 100 (and/or container/sphere 200) by a fifth length e, one or more tubes 103 that extend from the epi-center of the apparatus 100 (and/or container/sphere 200) by a sixth length f, one or more tubes 103 that extend from the epi-center of the apparatus 100 (and/or container/sphere 200) by a seventh length g, etc. where $a \le b \le c \le d \le e \le f \le g \le$ . . . etc.

According to one or more embodiments, the apparatus 100 may include one or more tubes 103 that are of a first length a, one or more tubes 103 that are of a second length b, one or more tubes 103 that are of a third length c, one or more tubes 103 that are of a fourth length d, one or more tubes 103 that are of a fifth length e, one or more tubes 103 that are of a sixth length f, one or more tubes 103 that are of a seventh length g, etc. where $a \le b \le c \le d \le e \le f \le g \le$ . . . etc.

According to one or more embodiments, the apparatus 100 and/or the container/sphere 200 may include, for example, at least one (or more) tube 103 that extends from the center portion 101 and extends to and meets the container/sphere surface, and where at least one (or more) tube 103 extends from the center portion 101 and extends to and surpasses the container/sphere surface, and where at least one (or more) tube 103 extends from the center portion 101 and extends to and comes short of the container/sphere surface, and/or etc. It should be noted that if one or more tube(s) 103 come short of the container/sphere surface, it may extend short such that treats can just surpass the gap and/or easily surpass the gap for ease of release out of the container/sphere 200 (e.g., FIG. 10(e)). It should be noted that size of the gap between the short tube and the sphere may be the size of an exit port 102.

According to one or more embodiments, (the apparatus 100 and/or) the container/sphere 200 may include one or more exit ports (e.g., 202 of FIG. 10(e)) that does not correspond to a tube end 104 (e.g., FIG. 10(e)). There are many benefits to design the container/sphere 200 to have more and/or less exit port(s) than the number of tubes because one container/sphere 200 may work with more than one apparatus 100 where a first apparatus may have x number of tubes 103 and a second apparatus that may have y number of tubes 103 (x does not equal to y).

According to one or more embodiments, the apparatus 100 may include one or more larger major container/spheres 200 (e.g., the bigger container/sphere of FIG. 10(f)) that may encompass/encapsulate at least one (or more) center portion 101 and one or more tubes 103, and/or one or more smaller major container/spheres 200 (e.g., the smaller container/sphere of FIG. 10(e)) that may encompass/encapsulate at least one (or more) center portion 101 and one or more tubes 103, and/or one or more minor container/spheres 200 (e.g., the smaller container/sphere of FIG. 10(f)) that may encompass/encapsulate a portion (or all) of a tube 103, and/or one or more minor container/spheres 200 (e.g., the smaller container/sphere of FIG. 10(f)) that may encompass/encapsulate a portion (or all) of more than one tube 103 (2, 3, 4, 5, 6, etc. tubes), and/or etc. Therefore, one or more smaller container/spheres 200 may be included in one larger container/sphere 200 as illustrated in FIG. 10(e) and FIG. 10(f). Accordingly, one, two or more concentric container/spheres may be provided, and/or one, two or more tangent container/spheres may be used, and/or etc.

According to one or more embodiments, the smaller container/sphere 200 of FIG. 10(f) may extend from where the main tube 103 meets the center portion 101 to the inner surface of the container/sphere 200, and/or it may extend from where the main tube 103 meets the center portion 101 to a certain distance away from the inner surface of the container/sphere 200, and/or it may extend from a certain distance away from where the main tube 103 meets the center portion 101 to the inner surface of the container/sphere 200, and/or it may extend from a certain distance away from where the main tube 103 meets the center portion 101 to a certain distance away from the inner surface of the container/sphere 200, and/or etc.

According to one or more embodiments, (the apparatus 100 and/or) the container/sphere 200 may include one or more tube(s) 103 that extend and/or protrude past the sphere structure (e.g., FIG. 10(f)). For example, the extended tube 103 may extend and/or protrude past the sphere structure for 5%, 10%, 15%, 20%, 25%, etc. past the surface of the sphere. For example, the extended tube 103 may extend and/or protrude for an additional tube length of 5%, 10%, 15%, 20%, 25%, etc.

According to one or more embodiments, one, two or more smaller major container/spheres 200 may encompass/encapsulate at least one (or more) center portion 101 and one or more tubes 103 as illustrated in at least FIG. 10(e).

According to one or more embodiments, tube end covers/caps/plugs/stoppers/inserts/closing mechanism/opening mechanism/opening and closing mechanism/adapter/etc. 105 may be used with the apparatus 100 and/or the container/sphere 200.

For example, tube end caps 105 may be used to completely and/or partially close off a tube end 104, reduce the exit size of a tube end 104, assist the placement of the container/sphere 200 to the apparatus 100 (and/or device/apparatus/container/sphere 200), completely and/or partially close off a container/sphere exit port(s), reduce the exit size of a container/sphere exit port(s) 202, etc.

Figure 20:
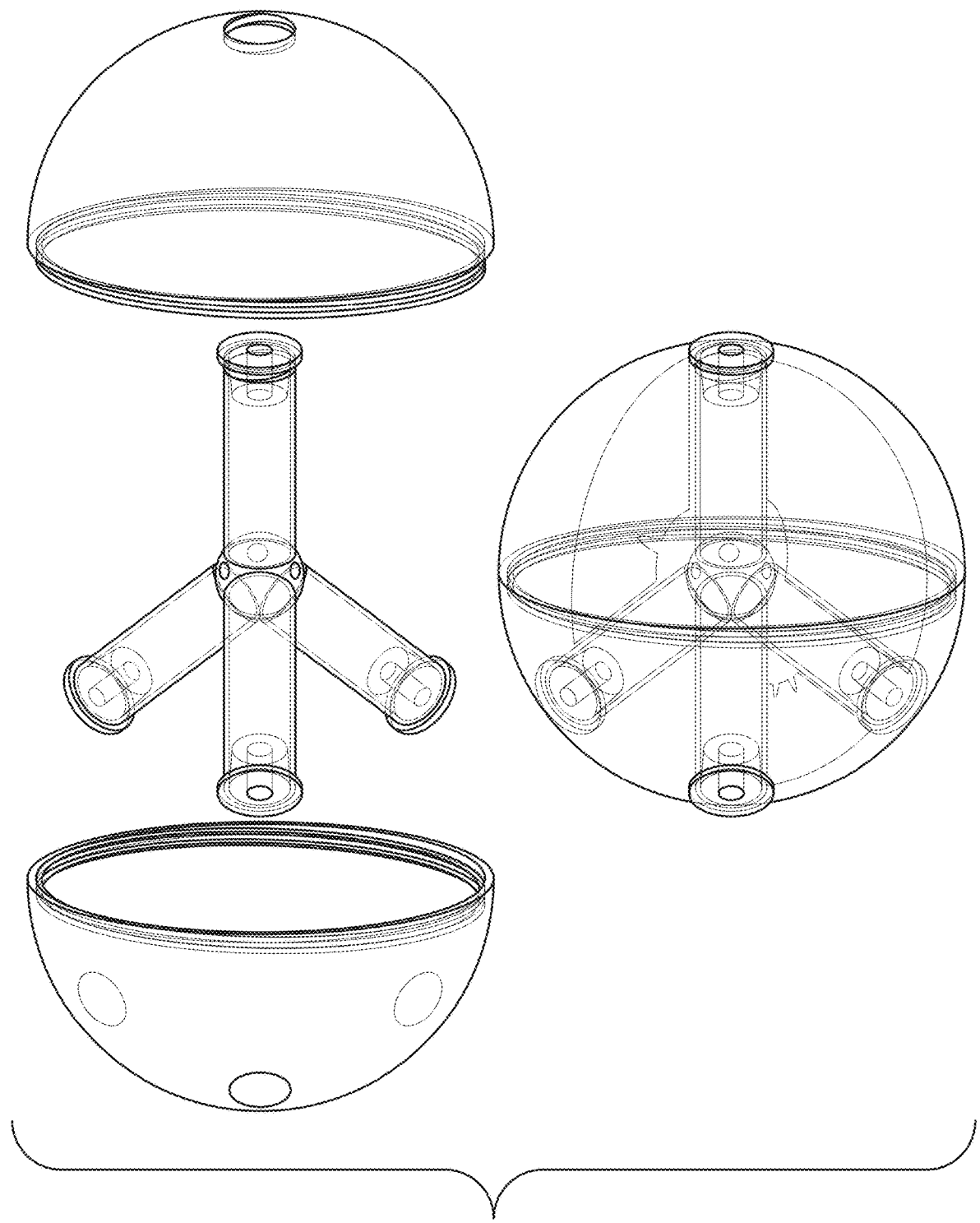
FIG. 20 is a diagram illustrating a food/treat dispensing device/apparatus 100 and/or a food/treat dispensing device/apparatus 200 for pets according to one or more embodiments described herein.
Figure 21:
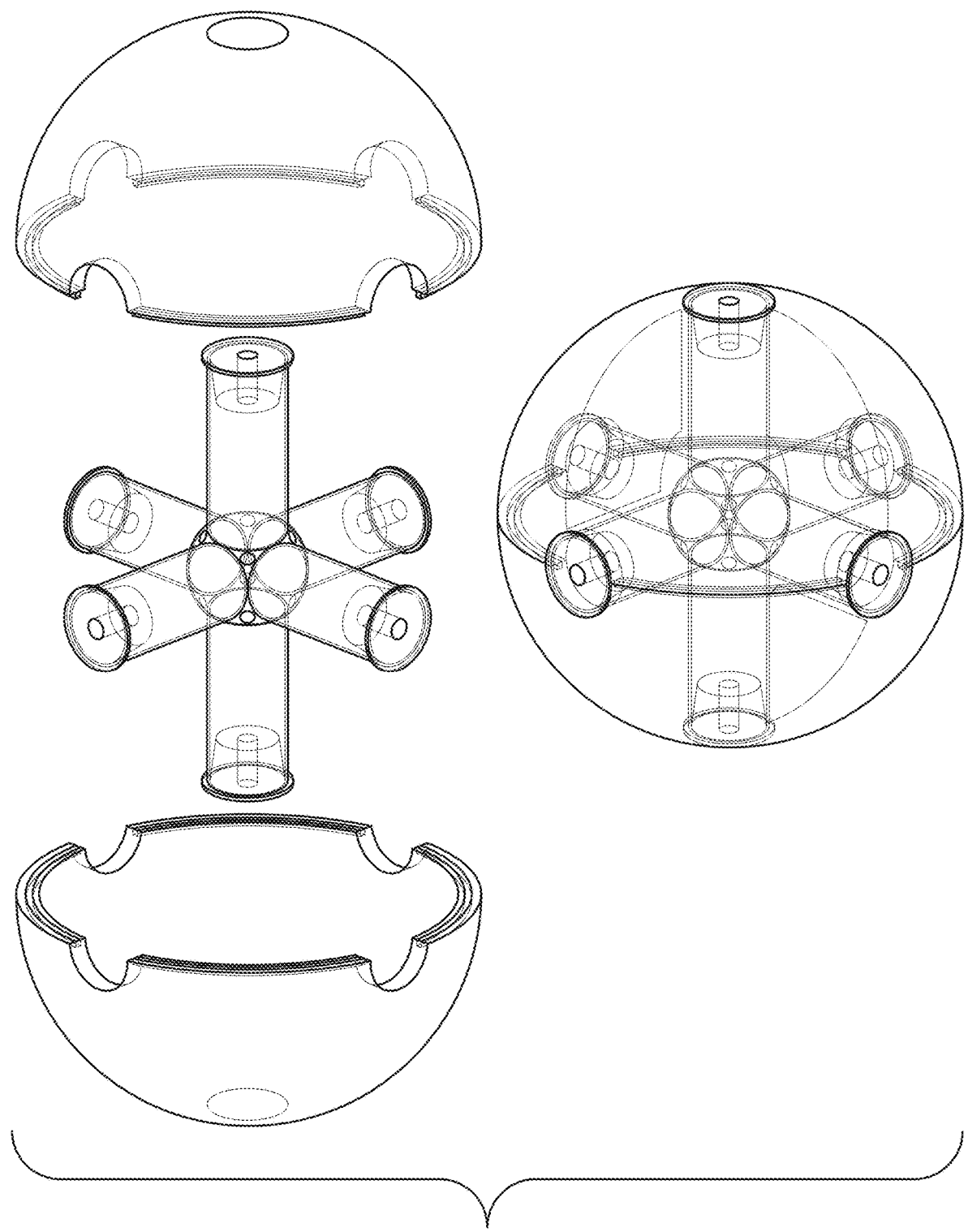
FIG. 21 is a diagram illustrating a food/treat dispensing device/apparatus 100 and/or a food/treat dispensing device/apparatus 200 for pets according to one or more embodiments described herein.

At least FIG. 20 and FIG. 21 illustrate examples of how tube end caps 105 may be used with the apparatus 100 and/or container/sphere 200. For example, FIG. 20 illustrates for example how two or more tube end caps 105 are used whereby each tube end cap 105 connects a tube 103 with the container/sphere 200 by fitting the tube end cap 105 into the tube end 105. The connection may be that the container/sphere 200 is compressed/sandwiched between the (e.g., outer surface of the) tube end 104 and the (e.g., inside surface of tip/overhang of the) cap 105, and/or that the sidewalls of the container/sphere 200 inside surface of the container/sphere exit port 202 is abutted to the outer surface of the tip of the tube end 202 and held in place by the tube end cap 105 being inserted into the tube end 104 so that the (e.g., inside surface of tip/overhang of the) cap 105 abuts the (e.g., outer surface of the) tube end 104 and the (e.g., outer surface of the) container/sphere 200, etc.

It should be noted that an apparatus 100 having two or more tubes 103 (e.g., 2, 3, 4, 5, 6, . . . tubes), the container/sphere 200 may be portioned such that (at least one tube and/or) at least one tube end 104 corresponds with a first piece of the container/sphere while (at least one tube 103 and/or) at least one tube end 104 corresponds with a second piece of the container/sphere (e.g., FIG. 20, FIG. 21, etc.).

It should be noted that an apparatus 100 having two or more tubes 103 (e.g., 2, 3, 4, 5, 6, . . . tubes), the container/sphere 200 may be portioned such that (at least one tube and/or) at least one tube end 104 corresponds with a first piece of the container/sphere 200 while (at least one tube and/or) at least one tube end 104 corresponds with a second piece of the container/sphere 200 (e.g., FIG. 20, FIG. 21, etc.) while one, two, three, four, etc. tubes 103 may reside along and/or in the plane of where the container/sphere 200 is partitioned.

It should be noted that an apparatus 100 having two or more tubes 103 (e.g., 2, 3, 4, 5, 6, . . . tubes), the container/sphere 200 may be portioned such that (at least one tube and/or) at least one tube end 104 corresponds with a first piece of the container/sphere 200 while (at least two tubes and/or) at least two tube ends 104 correspond with a second piece of the container/sphere 200 (e.g., FIG. 21).

It should be noted that an apparatus 100 having two or more tubes 103 (e.g., 2, 3, 4, 5, 6, . . . tubes), the container/sphere 200 may be portioned such that (at least one tube and/or) at least one tube end 104 corresponds with a first piece of the container/sphere 200 while (at least two tubes and/or) at least two tube ends 104 correspond with a second piece of the container/sphere 200 (e.g., FIG. 21) while one, two, three, etc. tubes 103 may reside along and/or in the plane of where the container/sphere 200 is partitioned.

It should be noted that an apparatus 100 having two or more tubes 103 (e.g., 2, 3, 4, 5, 6, . . . tubes), the container/sphere 200 may be portioned such that (at least one tube and/or) at least one tube end 104 corresponds with a first piece of the container/sphere 200 while (at least three tubes and/or) at least three tube ends 104 correspond with a second piece of the container/sphere 200 (e.g., FIG. 21).

It should be noted that an apparatus having two or more tubes 103 (e.g., 2, 3, 4, 5, 6, . . . tubes), the container/sphere 200 may be portioned such that (at least one tube and/or) at least one tube end 104 corresponds with a first piece of the container/sphere 200 while (at least three tubes and/or) at least three tube ends 104 correspond with a second piece of the container/sphere 200 (e.g., FIG. 21) while one, two, etc. tubes 103 may reside along and/or in the plane of where the container/sphere 200 is partitioned.

It should be noted that one or more tube ends 104 rest in a container/sphere ring with a protruding lip inside the surface of the container/sphere 200 to hold a tube end 104 securely in place (which for example acts like a (short) lipped cup holder for a cup to fits securely inside the cup holder) without the need for an exit port(s) 202 on the container/sphere 200. For example, in at least FIG. 21, one or more or all of the three tube ends 104 that exist in the lower container/sphere 200 may include lipped holders instead of exit ports 202.

It should be noted that an apparatus 100 having two or more tubes 103 (e.g., 2, 3, 4, 5, 6, . . . tubes), the container/sphere 200 may be portioned such that (at least one tube and/or) at least one tube end 104 corresponds with a first piece of the container/sphere 200 while (at least four tubes and/or) at least four tube ends 104 correspond with a second piece of the container/sphere 200.

It should be noted that an apparatus 100 having two or more tubes 103 (e.g., 2, 3, 4, 5, 6, . . . tubes), the container/sphere 200 may be portioned such that (at least one tube and/or) at least one tube end 104 corresponds with a first piece of the container/sphere 200 while (at least four tubes and/or) at least four tube ends 104 correspond with a second piece of the container/sphere 200 while one, etc. tubes 103 may reside along and/or in the plane of where the container/sphere 200 is partitioned.

It should be noted that an apparatus 100 having two or more tubes 103 (e.g., 2, 3, 4, 5, 6, . . . tubes), the container/sphere 200 may be portioned such that (at least one tube and/or) at least one tube end 104 corresponds with a first piece of the container/sphere 200 while (at least five tubes and/or) at least five tube ends 104 correspond with a second piece of the container/sphere 200.

It should be noted that the term joining member may be used interchangeably with the where the container/sphere 200 is partitioned. Accordingly, the joining member may be located in, for example, a location where the container/sphere 200 may be portioned.

In one or more embodiments, the number of container/sphere pieces may be less than the number of (main) tubes, equal to the number of (main) tubes and/or greater than the number of (main) tubes.

In one or more embodiments, the container/sphere 200 (either being one piece, two pieces, three pieces, etc.) may be partially or completely separate from the apparatus 100 and/or partially and/or completely as one single piece as the apparatus 100. For example, the illustrated container/spheres 200 may wholly and/or in part be either the same piece as the apparatus 100 and/or may be a completely separate structure as the apparatus 100.

According to one or more embodiments, each half of the full container/sphere 200 structure may be a spherical cube (a dice shape where each side has a curved surface approximately between a flat surface and the surface of a full container/sphere), a spherical cap, and/or spherical dome, and/or spherical segment of each base is a portion of a container/sphere cut off by a plane, and/or if the plane passes through the center of the container/sphere, so that the height of the cap is equal to the radius of the container/sphere, the spherical cap may be for example a hemi-container/half container/hemisphere, and/or etc.

It should be noted that, according to one or more embodiments, one or more tube(s) may be added and/or omitted from one embodiment and replace to another. For example, one main tube of FIG. 10(b) may be omitted to have two tubes like FIG. 10(a) but instead of the two tubes being along one axis, the two tubes would be projected along two different axes. As another example, the center portion of FIG. 10(c) may replace the center portion of FIG. 10(a) thereby having a second tube extending away from the (umbrella type) center portion but along the same axis as the first tube.

According to one or more embodiments, one or more of the container/sphere 200 pieces may be separate from the apparatus 100 and/or one or more of the container/sphere 200 pieces may be joined to the apparatus 100 as one piece.

For example, in FIG. 10(g), any apparatus may be formed as one solid piece (e.g., unitary, forming a singular unit, forming a single entity, etc.) with apparatus 100. One top container/sphere may be included with at least one exit port 202 centrally located in the container/sphere top, at the apex of the container/sphere top, at the center of the hemi-container/half container/hemisphere, or the like. According to one or more embodiments, by having only one exit port 202 at the very top of the top container/sphere, the top piece may be able to screw into place the bottom container/sphere (and/or the tube end 104). Accordingly, the connecting and/or locking mechanisms 299 may be a screwing type mechanism (and/or the like). In addition, and/or in alternative, the outer surface of the tube end 104 may be a screwing type (and/or the like) connection with the inner lip of the container/sphere exit port.

For example, in FIG. 10(g), the apparatus 100 may be used with at least one center portion along with one, two, three, four, five, six, etc. tubes being formed as one piece as the container/sphere bottom. In addition, one tube may extend from inside the bottom container/sphere and extend outward and extend beyond the opening of the bottom container/sphere. For example, the only tube extending out of the bottom container/sphere may extend (approximately) perpendicular to the plane of the opening (of the bottom container/sphere and/or top container/sphere).

It should be noted that each container/sphere piece of FIG. 10(g) may include one or more fins.

It should be noted that any and all features, individually and/or in any combination, as disclosed in at least FIG. 10 and/or any other Figure(s) may be used interchangeable with any other embodiment disclosed herein.

Figure 11:
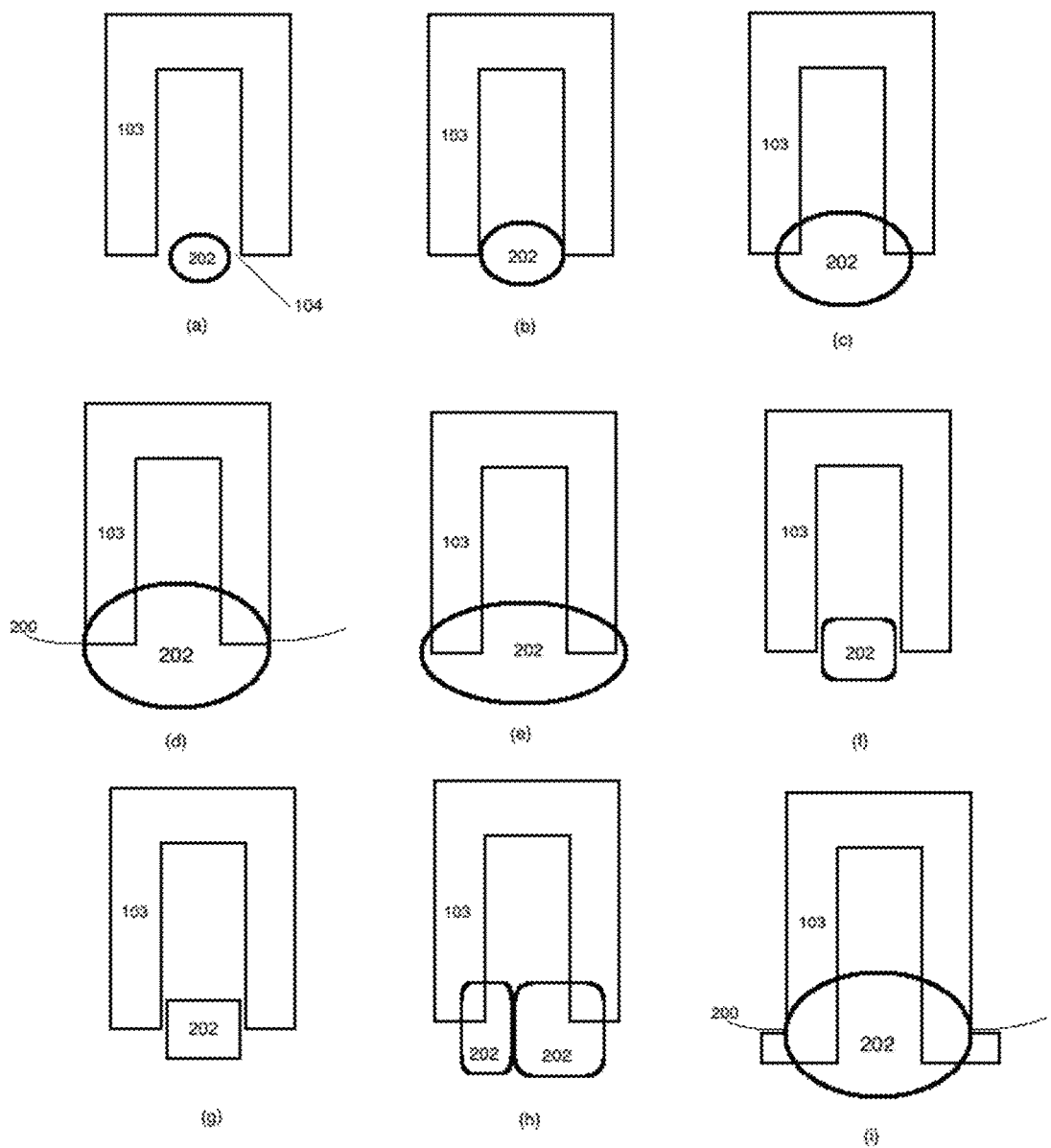
FIG. 11 is a diagram illustrating some of the possible configurations of how the container/sphere exit ports 202 can align with the tube end 104 according to one or more embodiments described herein.

FIG. 11 illustrates some of the possible configurations of how the container/sphere exit ports 202 can align with the tube end 104 according to one or more embodiments.

According to one or more embodiments, the circumference of the container/sphere's exit port 202 may be less than the circumference of the inner circumference of the tube end 104 whereby the circumference of the container/sphere's exit port 202 may exist entirely in the circumference of the inner circumference of the tube end 104 (e.g., FIG. 11(a)).

According to one or more embodiments, the circumference of the container/sphere's exit port 202 may be (approximately) equal to the circumference of the inner circumference of the tube end 104 whereby the circumference of the container/sphere's exit port 202 may (approximately) overlap with the circumference of the inner circumference of the tube end 104 (e.g., FIG. 11(b)).

According to one or more embodiments, the circumference of the container/sphere's exit port 202 may be greater than the circumference of the inner circumference of the tube end 104 and/or less than the circumference of the outer circumference of the tube end 104 whereby the circumference of the container/sphere's exit port 202 may exist entirely between the circumference of the outer circumference of the tube end 104 and the circumference of the inner circumference of the tube end 104 (e.g., FIG. 11(c)).

According to one or more embodiments, the circumference of the container/sphere's exit port 202 may be (approximately) equal to the circumference of the outer circumference of the tube end 104 whereby the circumference of the container/sphere's exit port 202 may (approximately) overlap with the circumference of the outer circumference of the tube end 104 (e.g., FIG. 11(d)).

According to one or more embodiments, the circumference of the container/sphere's exit port 202 may be greater than the circumference of the outer circumference of the tube end 104 whereby the circumference of the outer circumference of the tube end 104 may exist entirely inside the circumference of the container/sphere's exit port 202 (e.g., FIG. 11(e)).

It should be noted that, according to one or more embodiments, the container/sphere exit ports 202 (like the tube ends 104) may be round/circular/oval in shape (e.g., FIGS. 11(a), 11(b), 11(c), 11(d), 11(e), etc.), square/rectangular (e.g., FIG. 11(g), etc.), square/rectangular with curved/rounded corners (e.g., FIG. 11(f), etc.), triangular, polygonal, hexagonal, heptagonal, octagonal, star shaped, etc.

In addition, according to one or more embodiments, two or more (any shaped) exit ports 202 (2, 3, 4, . . . exit ports) may exit in the same area of exit ports 202 illustrated in at least FIGS. 11(*a*) through 11(*h*).

It should be noted that if more than one exit port 202 for one tube end 104 exit is used, one, two, three or more exit ports 202 may be the same and/or different sizes and/or shapes. This may be beneficial to, for example, having three different size treats and having two holes that correspond to only the two smallest treats. Accordingly, according to one or more embodiments, one, two, three, four, five, six, or more tube end 104 exits and/or container/sphere exit ports 202 may have one, two, three or more different size and/or shapes in order to at least accommodate one type of treats exiting out certain exits and other treats exiting out of different exits.

In one or more embodiments, all tube ends 104 may be open, or one tube end 104 may be open while all others are completed and permanently sealed off (or have a single slit or cross sectional slit to allow treats to be inserted into the tube but not allow for exiting), or two tube ends 104 may be open while all others tube ends 104 are completed and permanently sealed off, or three tube ends 104 may be open while all others tube ends 104 are completed and permanently sealed off, or four tube ends 104 may be open while all others tube ends 104 are completed and permanently sealed off, or five tube ends 104 may be open while all others tube ends 104 are completed and permanently sealed off, or six tube ends 104 may be open while all others tube ends 104 are completed and permanently sealed off, etc. and open tube ends 104 may be (temporarily) sealed via a cap 105.

In one or more embodiments, one tube end 104 may be completed and permanently sealed off while all other tube ends 104 are open, or two tube ends 104 may be completed and permanently sealed off while all other tube ends 104 are open, or three tube ends 104 may be completed and permanently sealed off while all other tube ends 104 are open, or four tube ends 104 may be completed and permanently sealed off while all other tube ends 104 are open, or five tube ends 104 may be completed and permanently sealed off while all other tube ends 104 are open, or six tube ends 104 may be completed and permanently sealed off while all other tube ends 104 are open, or etc. and open tube ends 104 may be (temporarily) sealed via a cap 105.

In one or more embodiments, all of the tubes 103 except one may be sealed off (permanently and/or via cap 105) and the last tube 103 is sealable with one or more exit hole(s) 102 in the center portion 101 and/or one or more exit holes 102 in one or more tubes 103 (e.g., in the an area where the tube meets the center portion 101). In one or more embodiments, all the tubes 103 except one (or more) tube ends 104 may be sealed off (permanently and/or via cap 105) and the tube(s) 103 that is/are open and sealable with no exit hole 102 in the center portion 101 nor in the tubes 103, and instead the tube cap 105 has a built-in exit hole 102. In addition, according to one or more embodiments, the center portion 101 may have one or more exit port(s) 102 instead of an exit hole 102 so that a cap 105 can be used in order to provide more interchangeability of uses.

In one or more embodiments, one or more spacer(s) may be used/added whereby the holes on the spacer align with the holes of the center portion 101 but decrease the internal cavity between the tube(s) 103 and the center portion 101 allowing it to be easier for the treats to find their way through the tubes 103 and out the apparatus 100.

According to one or more embodiments, any tube end 104 may have the same outer (and/or inner) circumference to be the same/similar but the tube end 104 may have a lip that has a little bump out at the very bottom as illustrated in FIG. 11(*i*). One of many benefits of the little bump out at the end of the tube's tip is to hold the container/sphere in place without the need of an additional cap end 105.

It should be noted that any and all features, individually and/or in any combination, as disclosed in at least FIG. 11 and/or any other Figure(s) may be used interchangeable with any other embodiment disclosed here.

Figure 12:
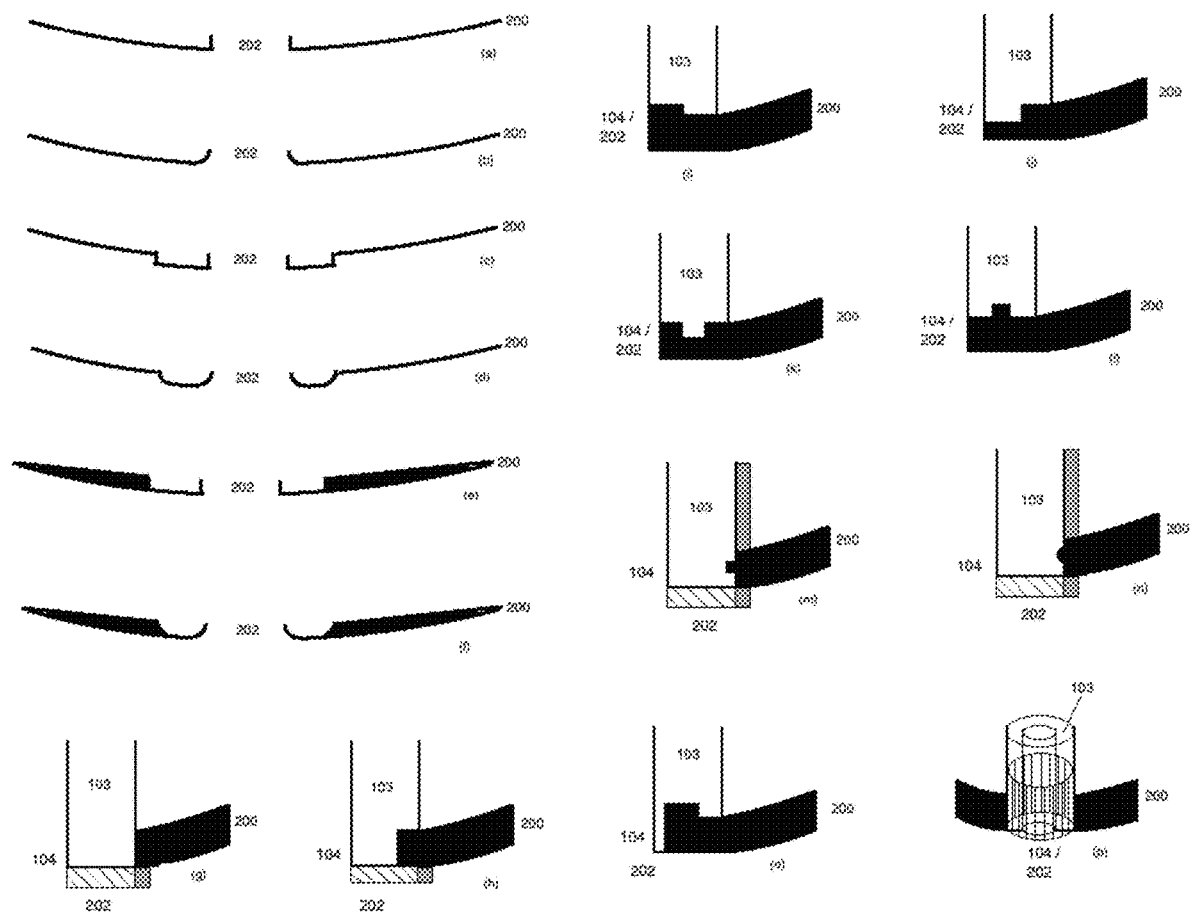
FIG. 12 is a diagram illustrating some of the possible configurations of how the tube end(s) 104 may connect with, align with, be held by, etc. to the container/sphere 200 (and/or the container/sphere exit port 202) according to one or more embodiments described herein.

FIG. 12 illustrates some of the possible configurations of how the tube end 104 may connect with, align with, be held by, etc. to the container/sphere 200 (and/or the container/sphere exit port 202) according to one or more embodiments. Accordingly, the container/sphere 200 and/or the tube ends 104 may have grooves, notches, etc. to better allow for the tube ends 104 to be held in place with the container/sphere so that rolling/bouncing assist in the structural integrity of the product.

According to one or more embodiments, the container/sphere exit ports 202 may have a raised inner lip in order to hold the tube end 104 in place. For example, the raised inner lip holder may be straight/square (e.g., FIG. 12(*a*), FIG. 12(*c*), FIG. 12(*e*)), curved (FIG. 12(*b*), FIG. 12(*d*), FIG. 12(*f*)), etc. and does not have to affect the outer surface of the container/sphere 200. Furthermore, the holder may be a square/rectangular holder and/or curved holder that extends and/or bumps out of the container/sphere 200 (e.g., FIG. 12(*c*), FIG. 12(*d*)) and does not have to affect the inner surface of the container/sphere 200. In addition, the holder may be a square/rectangular holder and/or curved holder that is housed inside but has an inner ramp (e.g., FIG. 12(*e*), FIG. 12(*f*)) as to not affect the outer surface of the container/sphere 200 while making the inner surface smooth.

It should be noted that the striped and striped along with the gray extensions in at least FIG. 12 are not required but illustrate additional available embodiments.

According to one or more embodiments, an edge of the exit port 202 of the container/sphere 200 may abut to the tube end 104 as illustrated in FIG. 12(*g*). In addition, the striped and striped along with the gray extensions may provide a small enough holder edge to allow the tube 103 to snap into place due to the flexibility of the tube material and be better held in place while rolling/bouncing.

According to one or more embodiments, an edge of the exit port 202 of the container/sphere 200 may abut and enter into the tube end 104 as illustrated in FIG. 12(*h*). In addition, the striped (and striped along with the gray) extension may provide a small enough holder edge to allow the tube 103 to snap into place due to the flexibility of the tube material and be better held in place while rolling/bouncing.

According to one or more embodiments, the tube end 104 may have a two or more levels in its outwardly extension (e.g., FIG. 12(*i*), FIG. 12(*j*), FIG. 12(*k*), FIG. 12(*l*)). For example, the tube end 104 may have two (and/or three and/or more) parts where the inner tube end wall could extend more than the outer tube end wall or vice versa, and/or the tube end may have three parts where the inner tube end wall may extend more than the inner and outer tube end walls or vice versa to allow for better hold between the apparatus 100 and the container/sphere 200.

According to one or more embodiments, an edge of the exit port 202 of the container/sphere 200 may abut to the tube end 104 as illustrated in FIG. 12(*m*) and FIG. 12(*n*). However, the container/sphere exit port 202 may have a notch extending into the tube end. The notch may be of any shape, e.g., square/rectangular (e.g., FIG. 12(*m*)), circular/curved (e.g., FIG. 12(*n*)), triangular, etc. In addition, the striped and striped along with the gray extensions may provide a small enough holder edge to allow the tube 103 to snap into place due to the flexibility of the tube material and be better held in place while rolling/bouncing. Similarly, the reverse may also be used where the tube end 104 has the protrusion into the container/sphere exit port 202.

According to one or more embodiments, an edge of the exit port 202 of the container/sphere 200 may abut and enter partially into and partially upward in the tube end 104 as illustrated in FIG. 12(*o*).

It should be noted that the connection structures disclosed in FIG. 12 may also be used as the connection mechanism to connect a first (half) container/sphere 200 to a second (half) container/sphere 200. Similarly, the connection mechanisms disclosed in FIG. 20 may also be used as the connection structure to connect the tube end 104 to the container/sphere 200.

Figure 13:
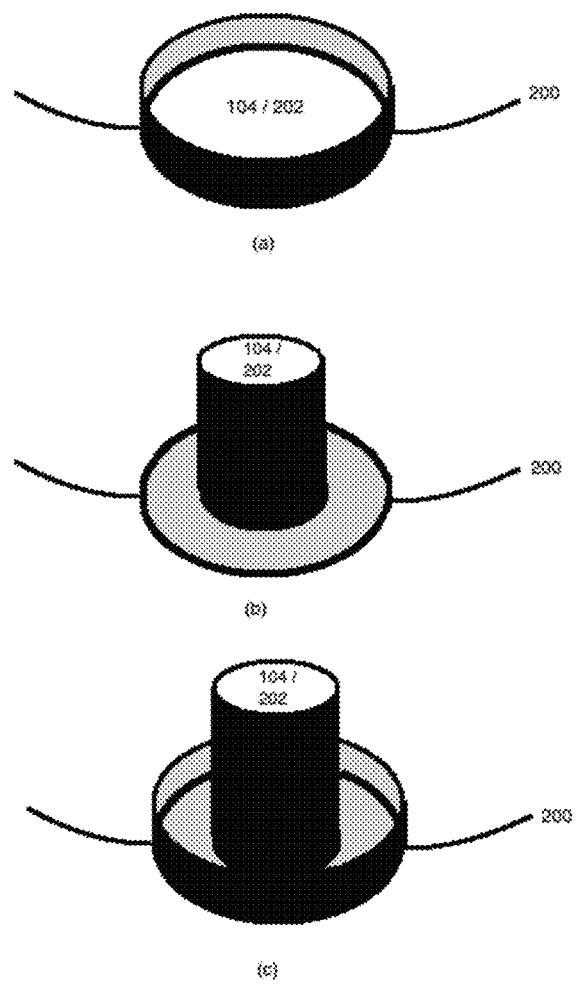
FIG. 13 is a diagram illustrating some of the possible configurations of how the tube end(s) 104 may connect with, align with, be held by, etc. to the container/sphere 200 (and/or the container/sphere exit port 202) according to one or more embodiments described herein.

According to one or more embodiments, one or more (2, 3, 4, 5, 6, . . . ) exit ports 202 of the container/sphere 200 may have a lip which is located to be flushed with the outside surface of the tube end (tip) 104 (as illustrated in at least FIG. 13(*a*) and FIG. 12(*p*)), and/or have a lip which is located to be flushed with the inside surface of the tube end (tip) 104 (as illustrated in at least FIG. 13(*b*) and FIG. 12(*p*)), and/or have a first lip which is located to be flushed with the outside surface of the tube end (tip) 104 and a second lip which is located to be flushed with the inside surface of the tube end (tip) 104 (as illustrated in at least FIG. 13(*c*) and FIG. 12(*p*)), etc. It should be noted that the inner and/or outer lips may extend from the outer surface of the container/sphere 200 to a distance less than the inner surface of the container/sphere 200, and/or to the inner surface of the surface, and/or past the inner surface of the container/sphere 200, etc. It should be noted that the inner lip may extend for the same distance as the outer lip, and/or the inner lip may extend for lesser distance as the outer lip, and/or the inner lip may extend for a greater distance as the outer lip, etc. Lastly, it should also be noted the by providing an inner lip and/or an outer lip, it will provide the system (100 and 200) with at least the benefit of a better grasp of holding the apparatus 100 to the container/sphere 200.

It should be noted that, according to one or more embodiments, any or all surfaces illustrated in at least FIGS. 12-13 may have grooved patterns like male and/or female threading in order to screw in and/or lock in place the pieces of apparatus 100 and/or 200.

It should be noted that any and all features, individually and/or in any combination, as disclosed in at least FIGS. 12 and 13 and/or any other Figure(s) may be used interchangeable with any other embodiment disclosed here.

FIG. 14 illustrates some of the possible configurations of the tube ends/caps 105 according to one or more embodiments. As illustrated in at least FIG. 8, there are many possible tubes ends 105 that may be used with either or both the apparatus 100 and/or the container/sphere 200, however, FIG. 14 illustrates some additional possibilities of tube caps 105. It should be noted that while the tube ends 104 of FIG. 14 illustrate an outside lip that overlaps the tube end 104 and/or the container/sphere ports 202, the tube ends 104 may be structured according to any other tube end 105 (e.g., FIG. 8). For example, the tube ends 104 may have a lip that only covers some and/or all of the circumference of the tube end tips, and/or the tube ends 104 may not have a lip that overlaps either or both the inner and outer circumference of the tube end tips, and/or etc. (e.g., as illustrated by at least the black dashed lines).

According to one or more embodiments, at least the inside of the end (tip) of the tube end 104 may have outward protrusions (e.g., increasing triangles (e.g., FIG. 14(*a*), decreasing triangles, constant triangles, constant, increasing and/or decreasing semicircles like bumps, constant, increasing and/or decreasing rectangular/squares (e.g., FIG. 14(*d*)), and/or etc.).

According to one or more embodiments, at least the outside of the tube end 104 may have inward protrusions (e.g., increasing triangles (e.g., FIG. 14(*a*), constant triangles, decreasing triangles, constant, increasing and/or decreasing semicircles like bumps, constant, increasing and/or decreasing rectangular/squares (e.g., FIG. 14(*d*)), and/or etc.).

According to one or more embodiments, at least the inside of the end (tip) of the tube end 104 may have inward protrusions (e.g., increasing triangles (e.g., FIG. 14(*b*), constant triangles, decreasing triangles, constant, increasing and/or decreasing semicircles like bumps, constant, increasing and/or decreasing rectangular/squares (e.g., FIG. 14(*c*)), etc.).

According to one or more embodiments, at least the outside of the tube end 104 may have outward protrusions (e.g., increasing triangles (e.g., FIG. 14(*b*), constant triangles, decreasing triangles, constant, increasing and/or decreasing semicircles like bumps, constant, increasing and/or decreasing rectangular/squares (e.g., FIG. 14(*c*)), and/or etc.).

According to one or more embodiments, the connection of the inside of the lip of the tube cap 105 to the outside surface of the end of the tube 103 may also have one or more outward and/or inward protrusions (e.g., constant, increasing and/or decreasing triangles, semicircles, rectangular/squares, and/or etc.)

According to one or more embodiments, the connection of the inside of the lip of the tube cap 105 to the outside surface of the container/sphere 200 may also have one or more outward and/or inward protrusions (e.g., constant, increasing and/or decreasing triangles, semicircles, rectangular/squares, and/or etc.)

According to one or more embodiments, the tube cap 105 and the tip of the tube 103 may be connectable via a male/female connection, female/male connection, etc. (e.g., FIG. 14(*e*)). For example, the cap 105 may have outward groves that align with internal grooves on the inside of the tube 103 or vice versa.

According to one or more embodiments, one or more sleeve end caps (e.g., 105*c*) may be used with an insertable/graspable/connectable end cap (e.g., 105*b*). A sleeve end cap 105*c* (e.g., connecting cap member 105*c*) may be used in for example FIGS. 1, 2, 3, 4, 8, 10, 14-18 and 20-21 where two tube 103 extend along the same/similar axis. As can be seen in at least FIG. 14(*f*), sleeve end cap 105*c* may duplicate the internal hollow structure of the apparatus 100, tubes 103, center portion 101, etc. where the sleeve end cap 105*c* may have openings corresponding to the other tubes (the other internal tube patterns) so that the internal mechanism of passing treats from one tube 103 to another tube 103 via the center portion 101 is not compromised. It should be noted that the container/sphere 200 is securely held in place when the end cap 105*b* in connected to the sleeve end cap 105*c* by any disclosed means (e.g., male/female connection, plug, etc.)

It should be noted that, according to one or more embodiments, any end cap 105 may be adapted to use the sleeve end cap 105*c*. In addition, it should be noted that, according to one or more embodiments, any sleeve end cap 105c may be adapted to use the end cap 105.

It should be noted that one of many benefits that end cap 105b provides is that end cap 105b can be used just as end cap 105 but reduces the manufacturing of the product to less cap molds.

Figure 14A:
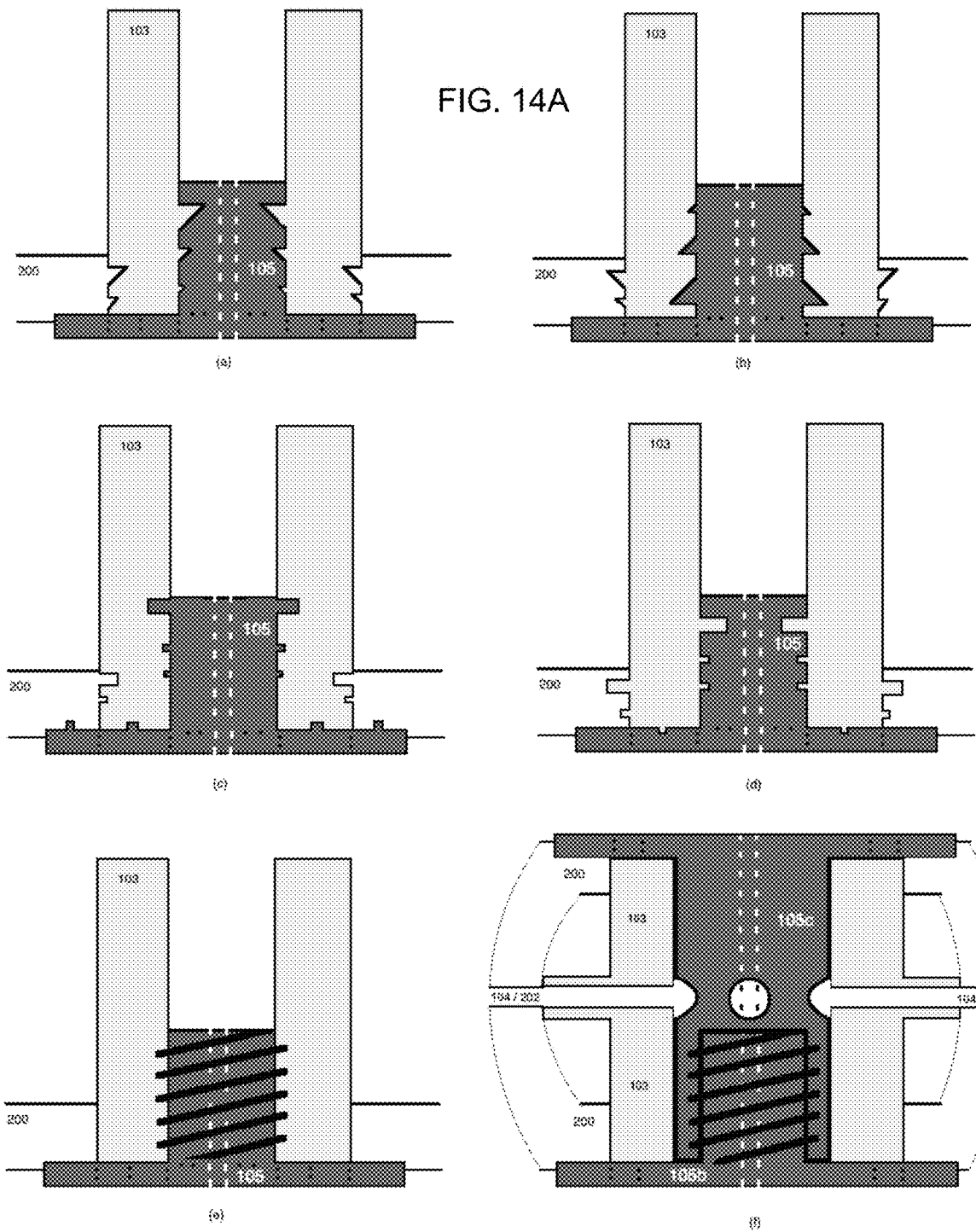
FIGS. 14A and 14B are diagrams illustrating some of the possible configurations of the tube ends/caps/closing and/or sealing mechanism/member/etc. 105 according to one or more embodiments described herein.
Figure 14B:
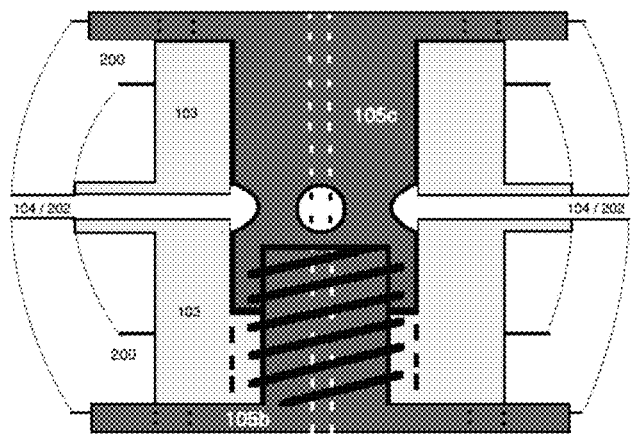
Figure 14B:
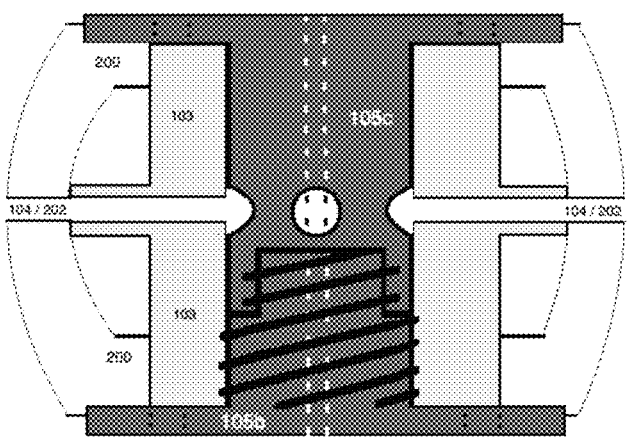
Figure 14B:
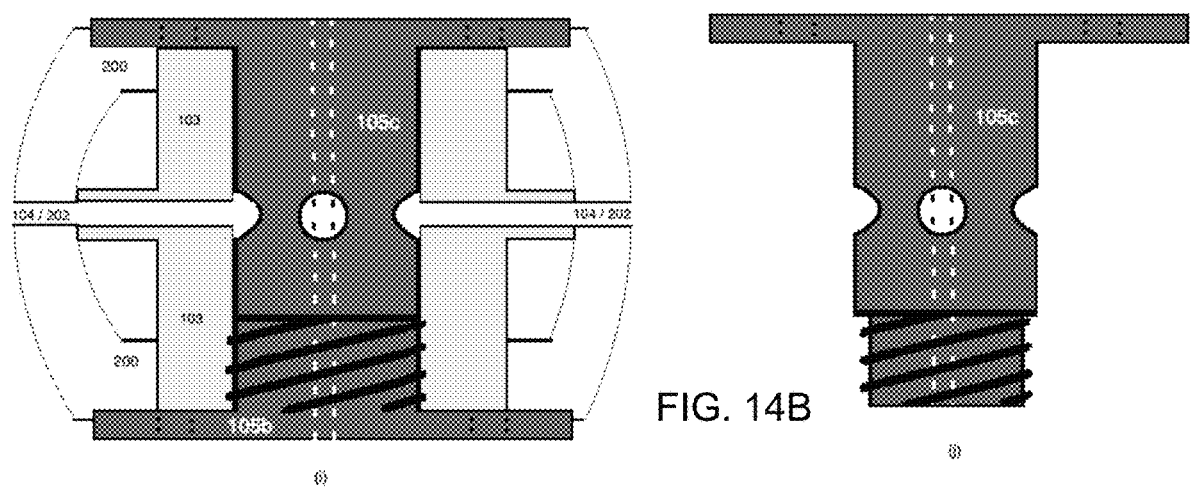

Accordingly, end cap 105b can be used with any structure of the end cap 105 but the end cap 105 may have an additional connector/connecting mechanism that has a smaller circumference (e.g., smaller stacked exterior as in FIG. 14(h), smaller interior as in FIG. 14(i), etc.). It should also be noted that the larger circumference connector part of 105b and the smaller circumference connector part of 105b is not limited to be a screw type connector, it can be any disclosed connector type, it may be a different type for the larger circumference connector part as compared to the smaller circumference connector part, and/or etc.

In addition, the end cap 105b of at least FIG. 14(g) may also be divided up into two different connecting parts whereby the first part of the connecting mechanism type is from for example the start/base of the mechanism to where the sleeve starts/ends (e.g., the open gap area illustrated by the dotted lines, the area where the end cap 105b connects to the tube 103) while the second part of the connecting mechanism type is from for example the tip of the end cap 105b to where the sleeve starts/ends (e.g., where the sleeve meets the open gap area illustrated by the dotted lines, where the sleeve meets the area where the end cap 105b connects to the tube 103)). According the each or both parts may have a different type of connecting mechanism.

It should be noted that a first sleeve end cap 105c may be used along a first axis (e.g., x axis), where a second sleeve end cap 105c may be used along a second axis (e.g., y axis) whereby the second sleeve inserts through the first sleeve in the center portion, where a third sleeve end cap 105c may be used along a third axis (e.g., z axis) whereby the second sleeve inserts through the first sleeve and the second sleeve in the center portion 101, etc.

According to one or more embodiments, the tube sleeve end cap 105c may extend to the tube end (e.g., FIG. 14(f)) and/or they may come short (e.g., FIG. 14(g)). For example, if the tube sleeve end cap 105c extends short of the tube 103 may either continue with and have a bump in portion and/or the tube sleeve end cap 105c may continue straight leaving a space between the tube 103 and the end cap 105b (as illustrated by the dashed line). As another example, if the tube sleeve end cap 105c extends short of the tube end (e.g., FIG. 14(h)), the end cap 105b may be used that has a first (larger) circumference that can connect (e.g., screw, etc.— including other connection methods as disclosed) to the tube 103 and a second (smaller) circumference that can connect (e.g., screw, etc.—including other connection methods as disclosed) to the tube sleeve end cap 105c.

According to one or more embodiments, one or more exit port(s) 202 of the container/sphere 200 may a different size than one or more other exit port(s) 202 of the container/sphere 200.

According to one or more embodiments, the tube sleeve end cap 105c may extend to the tube end 104 (e.g., FIG. 14(i)) and/or they may come short (e.g., a shorten version of FIG. 14(i)). For example, the tube sleeve end cap 105c of FIG. 14(j) connects (e.g., screw, etc.—including other connection methods as disclosed) to the inside of the tube end cap 105b.

According to one or more embodiments, the tube sleeve end cap 105c may be straight in its extension even though the center portion 101 may not be straight (e.g., the center portion may be bubble out). Therefore, in one or more embodiments where internal area/circumference of the center portion 101 is larger than (each of) the tubes' circumference and the sleeve end cap 105c is straight, the area/surface of the tube sleeve end cap 105c which is exposed to the empty internal cavity of the center portion 101 may include one or more exit holes 102 in order to allow for treats to enter from the inside of one or more of tube sleeves to the center portion 101 so that the treat may then exit out of the center portion.

It should be noted that any and all features, individually and/or in any combination, as disclosed in at least FIG. 14 and/or any other Figure(s) may be used interchangeable with any other embodiment disclosed here.

At least FIGS. 15-18 illustrate some example of fins 120. According to one or more embodiments, one or more fins 120 may be used with the apparatus 100 e.g., one or more tubes 103 (either permanently and/or connectably) and/or one or more container/spheres 200 (either permanently and/or connectably). It should be noted that any fin 120 disclosed to be used with a tube 103 may be used with the internal structure of the container/sphere 200. It should be noted that any fin 120 disclosed to be used with a container/sphere 200 may be used with the external structure of the apparatus 100 (e.g., tube 103).

According to one or more embodiments, a fin 200 may be used so that when the container/sphere 200 rolls the treats are not all (or mostly all) gathered at the bottom where they cannot enter into a center portion and find their way out a tube end 104. Therefore, a fin 120 may have one or more configurations to give some and/or a lot of assistance to the treats to find their way to the center portion 101.

Figure 15A:
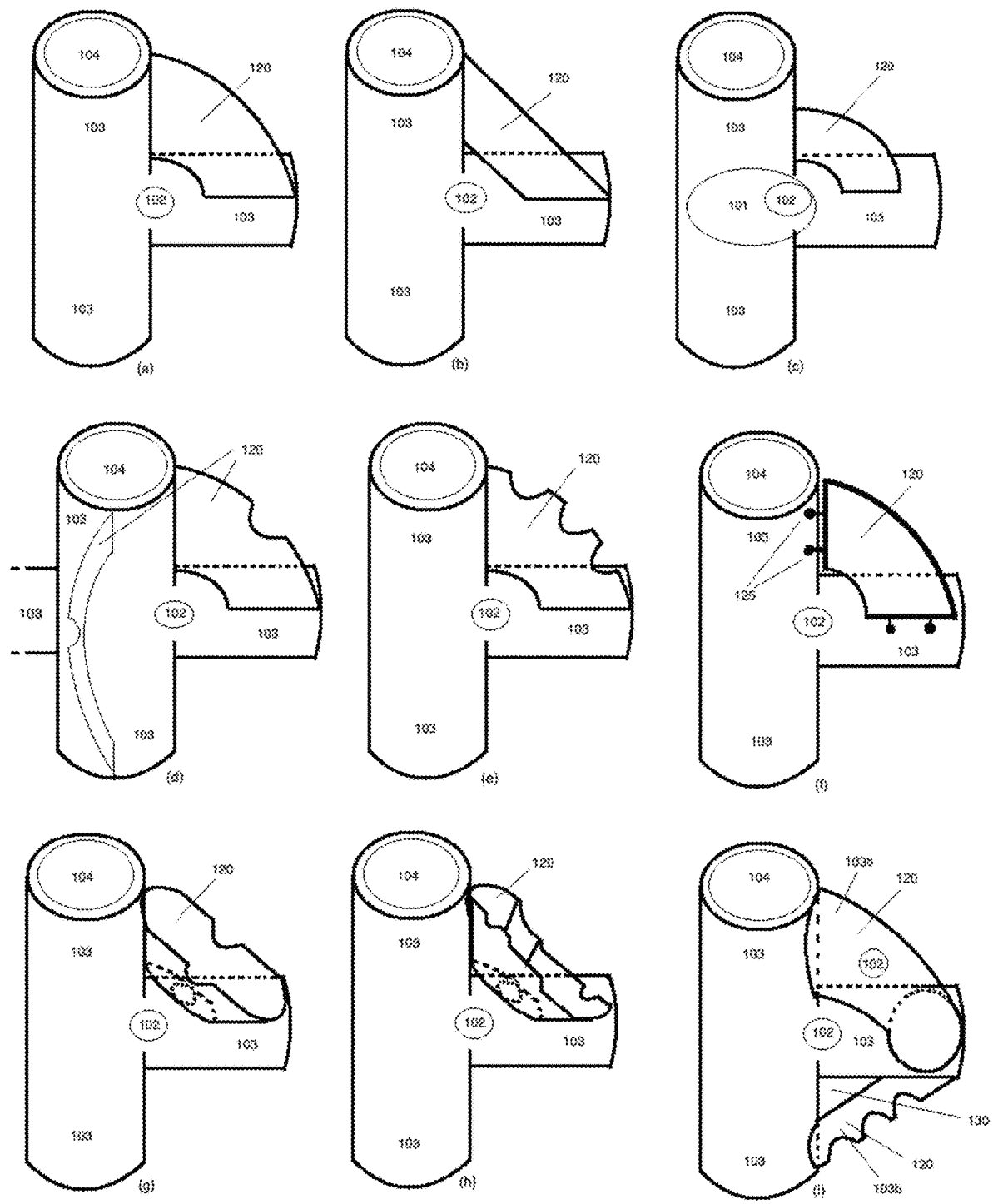
FIGS. 15A, 15B and 15C are diagrams illustrating some of the possible configurations of the fin(s) 120 used with apparatus 100 and/or apparatus 200 according to one or more embodiments described herein.

According to one or more embodiments, a fin 120 may have a curved top portion that is (substantially) parallel to the container/sphere's surface (e.g., FIGS. 15A(a), 15A(c), 15A(d), 15A(e), 15A(f), (etc.) whereby a curved top may be (almost) flushed with the container/sphere surface, and/or have a (e.g., small) gap(s) to allow some of the treats not to be scooped up, and/or a combination thereof (e.g., half of top is flushed and the other half is lower to include a gap), etc. It is noted that the top portion of FIGS. 15A(b), 15A(g), 15A(h), 15A(i), etc. may also be curved to be substantially parallel to the container/sphere's surface.

According to one or more embodiments, a fin 120 may have one or more open areas along the top surface of the fin blade in order to allow some treats to pass through to the next section while other treats are projected towards the exit hole(s) 102.

According to one or more embodiments, the fin 120 (e.g., any fin) may be a permanent part of the structure of the apparatus 100 (e.g., tube 103) and/or the container/sphere 200. In addition, according to one or more embodiments, the fin 120 (e.g., any fin) may be removable (e.g., connectable/disconnectable) to the apparatus 100 (e.g., tube 103) and/or the container/sphere 200. For example, a removable (e.g., connectable/disconnectable) fin 120 may be connectable/attachable via the apparatus 100 (e.g., tube 103) and/or the container/sphere 200 where the removable fin 120 is configured/structured to be able to be inserted into/along a grove(s) of the apparatus 100 (e.g., tube 103) and/or the container/sphere 200 (e.g., a groove as illustrated in FIG. 5(x), 5(p), 5(q), 5(t), etc.), and/or ball tipped connecting protrusions insertable into a matching hole (e.g., FIG. 15A(f)), and/or etc.

According to one or more embodiments, a fin 120 may be funnel shaped (e.g., FIGS. 15A(g), 15A(h), etc.). For example, a funnel with the top being curved shaped based used like in FIG. 15A(g), and/or a funnel with the top being straight shaped like FIG. 15A(b) based used like in FIG. 15A(g), a funnel with the top being curved shaped based used like in FIG. 15A(g) but where the structure on one or both side is stepped in (one or more times) to scoop/shovel the treats towards one or more open areas (e.g., FIG. 15A(h), etc.), and/or a funnel with the top being straight shaped like FIG. 15A(b) but where the structure on one or both side is stepped in (one or more times) to scoop/shovel the treats towards one or more open areas (e.g., FIG. 15A(h), etc.), and/or a combination thereof, and/or etc. It should be noted that the scoop/shovel may go in on one side while it goes in in the opposite direction on the other like illustrated in FIG. 15A(h).

According to one or more embodiments, the funnel end of the fin 120 may be open ended, and/or narrowed to a hole, etc. (as dashed lines in FIGS. 15A(g) and 15A(h) illustrates).

According to one or more embodiments, a fin(s) 120 on the container/sphere 200, like on the tubes 103, may be funnel shaped e.g., FIG. 15A(g). It should be noted that the funnel may extend out on one and/or both sides of the illustrated sheet fin to make the funnel fin larger and/or smaller.

According to one or more embodiments, a fin 120 may have a small gap (as illustrated), and/or a medium gap, and/or a larger gap so that a certain amount of treats are assisted to the center portion exit holes (e.g., the smaller the gap, the more the assistance).

According to one or more embodiments, a (e.g., minor) tube(s) may be used (and/or additionally added) in connecting any two or more (e.g., main) tubes 103 whereby the top of the tube surface maybe curved to be parallel/flush with the inner surface of the container/sphere, and/or be straight (e.g., FIG. 15A(i)), and/or etc. where the (e.g., minor) tube will act like a fin 120 to carry over the treats when in a roll. It should be noted that the top of the (e.g., minor) tube may include one or more (2, 3, 4, . . . ) open areas that that fully span from one side to the other lie FIG. 15A(e) to allow some treats to pass through.

Figure 15B:
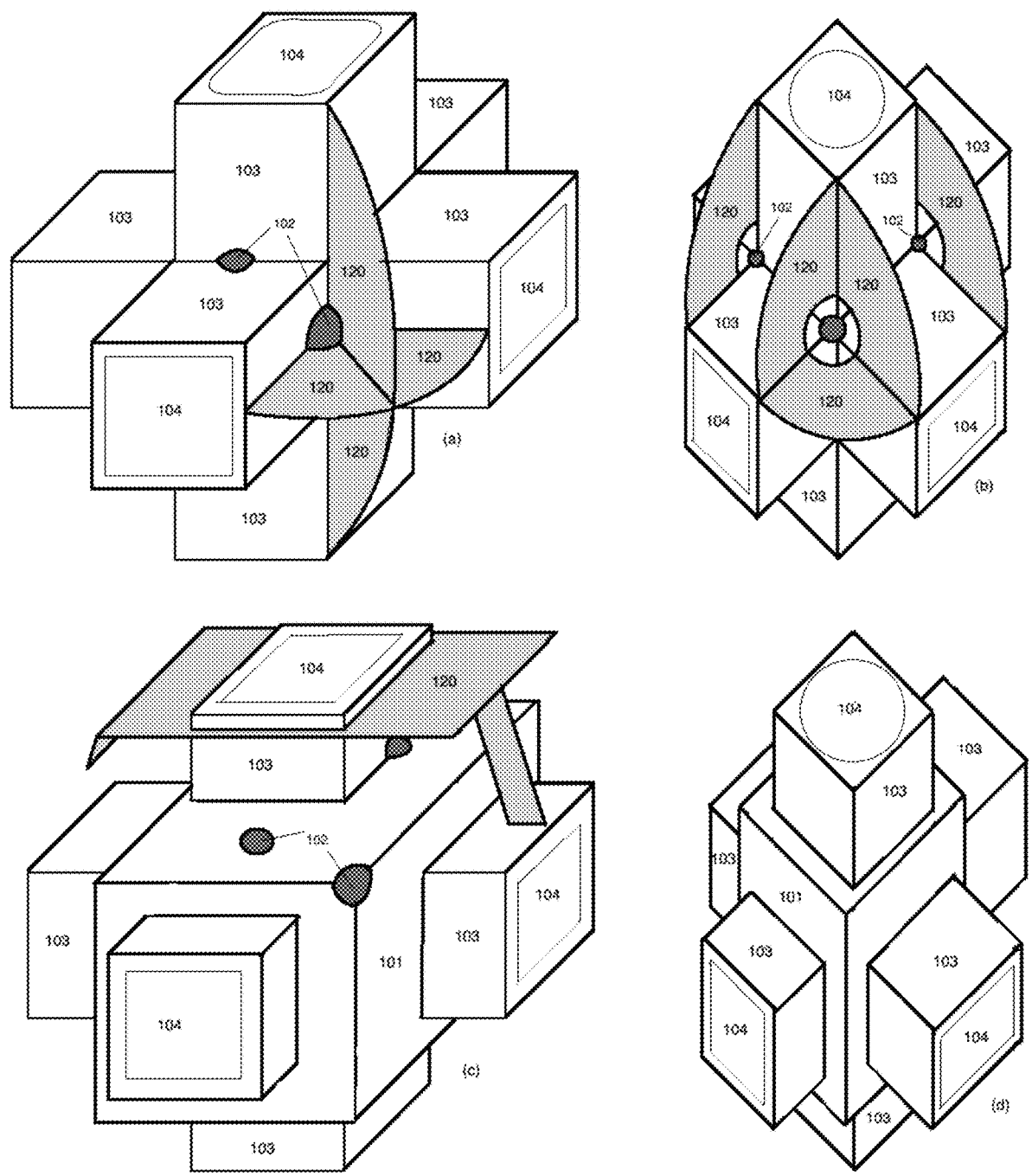

According to one or more embodiments, one or more fins 120 may be used to connect a first tube 103 on one side of a center portion 101 to a second tube 103 on another side of a center portion 101 (e.g., FIG. 15B(a)). According to one or more embodiments, one or more fins 120 may be used to connect a first tube 103 on one side of a center portion 101 to a second tube 103 on another side of a center portion 101 while being between at least two other tubes, e.g., a third and fourth tubes 103 (e.g., FIG. 15B(a)).

According to one or more embodiments, should be noted that each disclosed fin 120 may be combined with one or more fins 120 to be a single larger fin and/or individual fins 120 and/or a combination thereof. For example, the four fins 120 of FIG. 15B(a) may be one single fin, two separate fins, three separate fins, four separate fins, etc. As another example, the three fins 120 of FIG. 15B(b) may be one single fin, two separate fins, three separate fins, etc.

According to one or more embodiments, one or more fins 120 may be included in the central area of a first tube 103 to the central area of a second tube 103, e.g., FIG. 15B(a).

According to one or more embodiments, one or more fins 120 may be included in the corner area of a first tube 103 to the corner area of a second tube 103, e.g., FIG. 15B(a) and FIG. 15B(b).

According to one or more embodiments, the center portion 101 may be just the intersection area between tubes. For example, as illustrated in at least FIG. 15B(a), FIG. 15B(b), etc., the center portion 101 may just be the slim line/crease that intersects between each two tubes 103, and/or the point between each three tubes 103, and/or etc.

According to one or more embodiments, one or more fins 120 may be included on a tube 103 that is perpendicular to that tube 103, e.g., FIG. 15B(c).

Figure 15C:
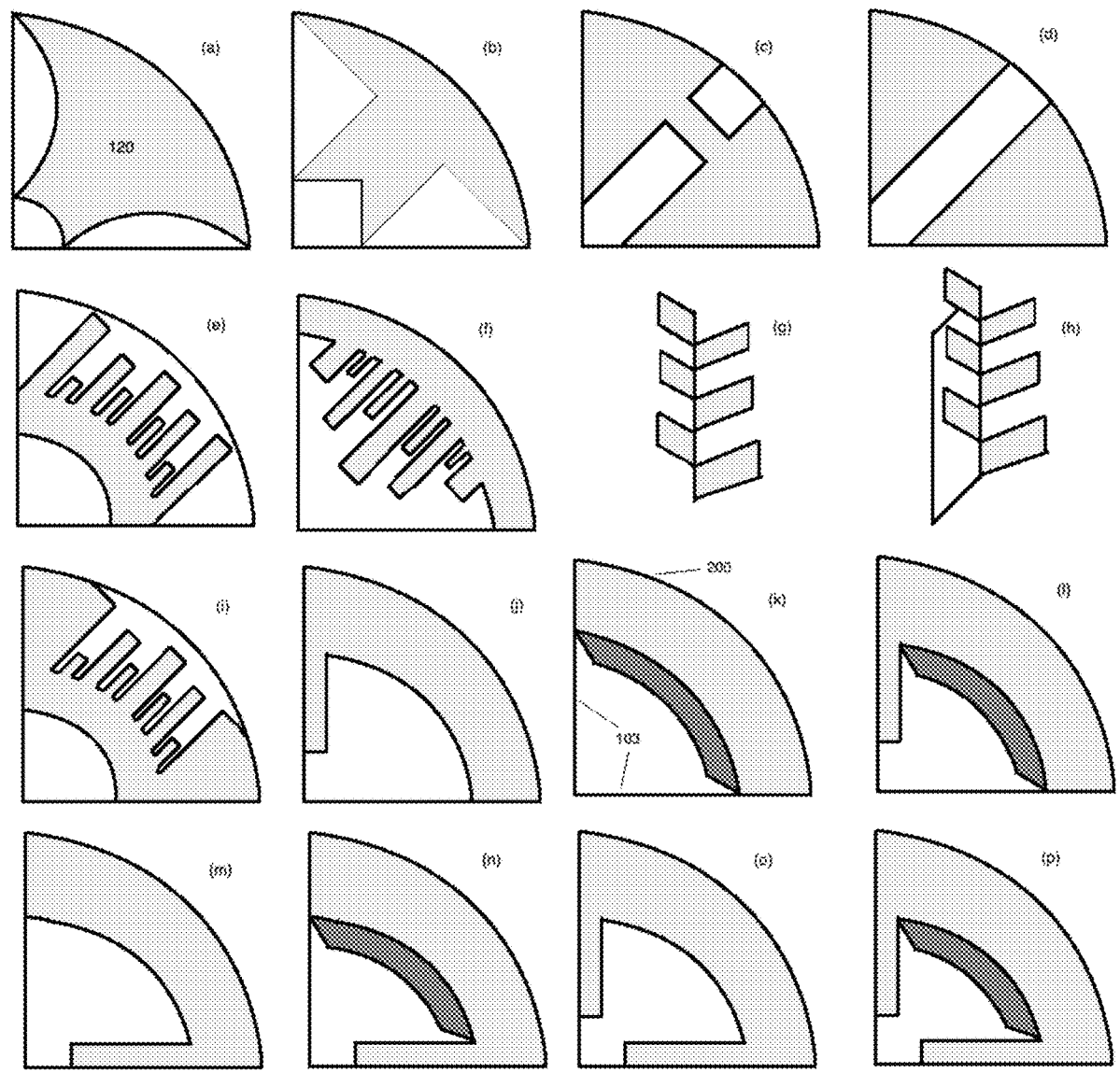

At least FIGS. 15C(a) through 15C(p) illustrate some possible configurations of fins 120 used with the container/spheres 200 and/or the apparatus 100 (e.g., tubes 103) according to one or more embodiments.

As pointed out in at least FIG. 15B, any fin 120 may be used with any container/sphere 200 as highlighted by the curved line, and/or any fin 120 may be used with any apparatus 100 via the (e.g., one, two, etc.) straight lines, and/or etc. Accordingly, the two straight lines and the curved line are not omitted in FIG. 15C for ease of illustration.

According to one or more embodiments, any fin 120 may be bent (e.g., −5 degrees, 5 degrees, −10 degrees, 10 degrees, −15 degrees, 15 degrees, −30 degrees, 30 degrees, −45 degrees, 45 degrees, etc.) in any bendable surface like the hanger tab(s) on FIG. 15B(c), 15C(b), 15C(e), 15C(f), 15C(g), 15C(h), 15C(i), 15C(j), 15C(k), 15C(l), 15C(m), 15C(n), 15C(o), 15C(p), etc. as illustrated in for example, FIGS. 15C(g) and 15C(h).

It should be noted that an inward protrusion and/or an outward protrusion on the outside and/or inside wall of the container/sphere 200 and/or apparatus 100, like a fin 102, may be used interchangeably with any and/or all embodiments. Accordingly, it should also be noted that an inward protrusion and/or an outward protrusion on the outside wall of the tube's tip end may be used interchangeably with any and/or all embodiments.

It should be noted that any and all features, individually and/or in any combination, as disclosed in at least FIG. 15 (A, B and C) and/or any other Figure(s) may be used interchangeable with any other embodiment disclosed here.

FIG. 16 illustrates some of the possible configurations of fins 120 used with the container/spheres according to one or more embodiments. It should noted that the fins 120 may be connected to the container/sphere either permanently and/or connectably similarly to the tube(s). It should also be noted that these fins 120 may also be used with the apparatus 100.

Figure 16A:
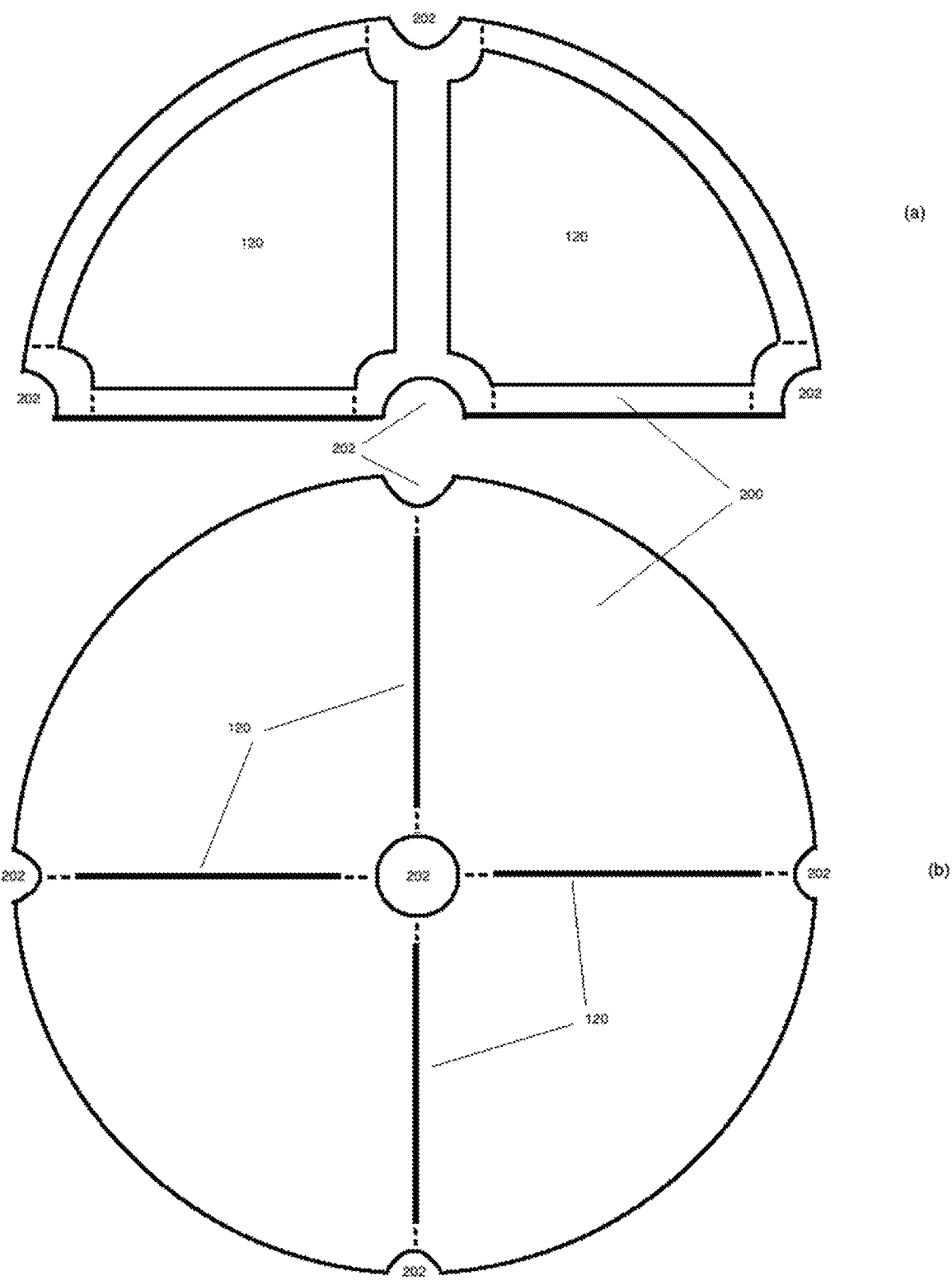
FIGS. 16A and 16B are diagrams illustrating some of the possible configurations of fins 120 used with the (apparatus 100 and/or) containers/spheres 200 according to one or more embodiments described herein.
Figure 16B:
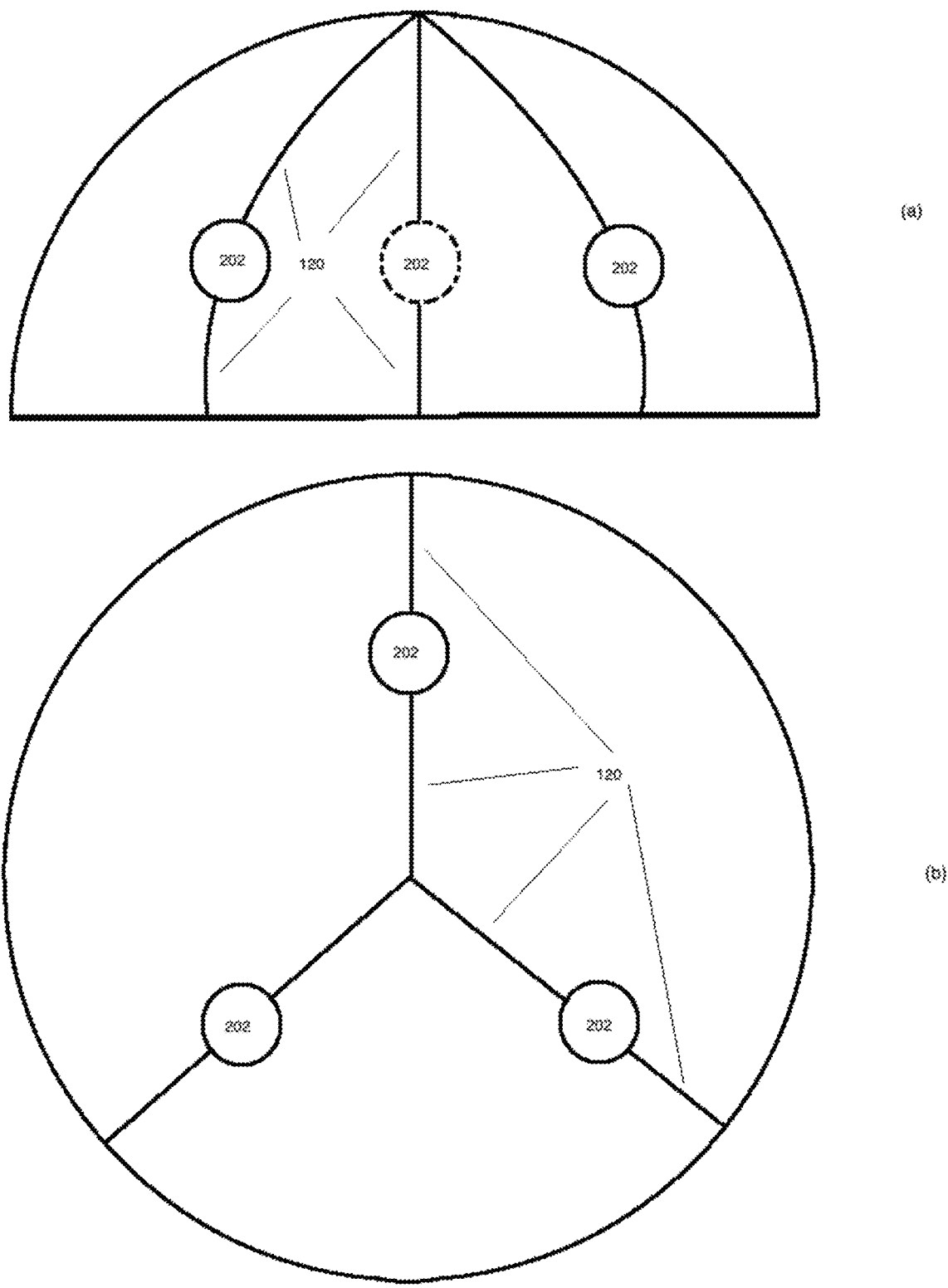

FIG. 16(A) illustrates one example of the maximum capacity of the fins 120 of a container/sphere 200 which is to be used with an apparatus 100 that may have 6 tubes 103 like FIG. 21. FIG. 16(B) illustrates one example of the maximum capacity of the fins 120 of a container/sphere 200 which is to be used with an apparatus 100 that may have 4 tubes 103 like FIG. 20. FIG. 16(a) illustrates the side view of the top and/or bottom of the container/sphere pieces. FIG. 16(a) illustrates the inside (and top) view of the top and/or bottom of the container/sphere pieces.

FIG. 16 illustrates one example of the maximum capacity (e.g., with the dotted lines) of the fins 120 of a container/sphere 200 which is to be used with an apparatus 100 that may have 6 tubes like FIG. 21. FIG. 16(a) illustrates the side view of the top and/or bottom of the container/sphere pieces. FIG. 16(a) illustrates the inside (and top) view of the top and/or bottom of the container/sphere pieces. It should be noted that more fins 120 may be used in the container/sphere 200 and/or the apparatus 100.

It should be noted that, according to one or more embodiments, any of the disclosed fin configuration(s)/feature(s) (e.g., raised center arch closest to the center portion which creates a big gap between the center portion and the fin 120 is increased) may be used on any other fin(s).

It should be noted that the dotted lines illustrate how the fins extend all the way to the top of the inner surface of the container/sphere rim while the solid line represents either the fin having a gap between the fin 120 and the container/sphere 200 (e.g., while the fin 120 is on the same plane as (e.g., being flush with) the opening of the container/sphere 200 (e.g., the rim of the container/sphere) and/or the fin 120 being flush with the inner surface of the container/sphere 200 but lower so that there is a distance from the rim of the container/sphere 200 to the start of the fin. As disclosed, the (e.g., curved) line of where the fin meets the inner container/sphere surface may have open pattern(s) and the lack of patterns (in for example FIGS. 15A(a), 15A(b), 15A(c), 15A(f), 16, 17, 18, 20, 21, etc.) should not limit the scope as the non-patterned fins as the non-patterned fins may be desired to have patterns to adjust the treat flow, apparatus size, container/sphere size, etc. and vice versa.

The same concept of FIG. 16A which is used with for example a 6-tube apparatus 100 may be used with any other type of apparatus 100. For example, FIG. 16B illustrates the fins 120 of FIG. 16A adapted to a 4-tube apparatus 100.

It should be noted that the second half of the container/sphere 200 of FIG. 16B would comprise (only) an exit port 202 at the top of the container/sphere.

It should be noted that any and all features, individually and/or in any combination, as disclosed in at least FIGS. 16(A and B) and/or any other Figure(s) may be used interchangeable with any other embodiment disclosed here.

FIG. 17 illustrates some of the possible configurations of fins/protrusions 120 used with the container/spheres 200 according to one or more embodiments. It should noted that the fins/protrusions 120 may be connected to the container/sphere 200 (and/or apparatus 100) either permanently and/or connectably similarly to the tube(s). It should also be noted that these fins 120 may also be used with the apparatus 100

Figure 17A:
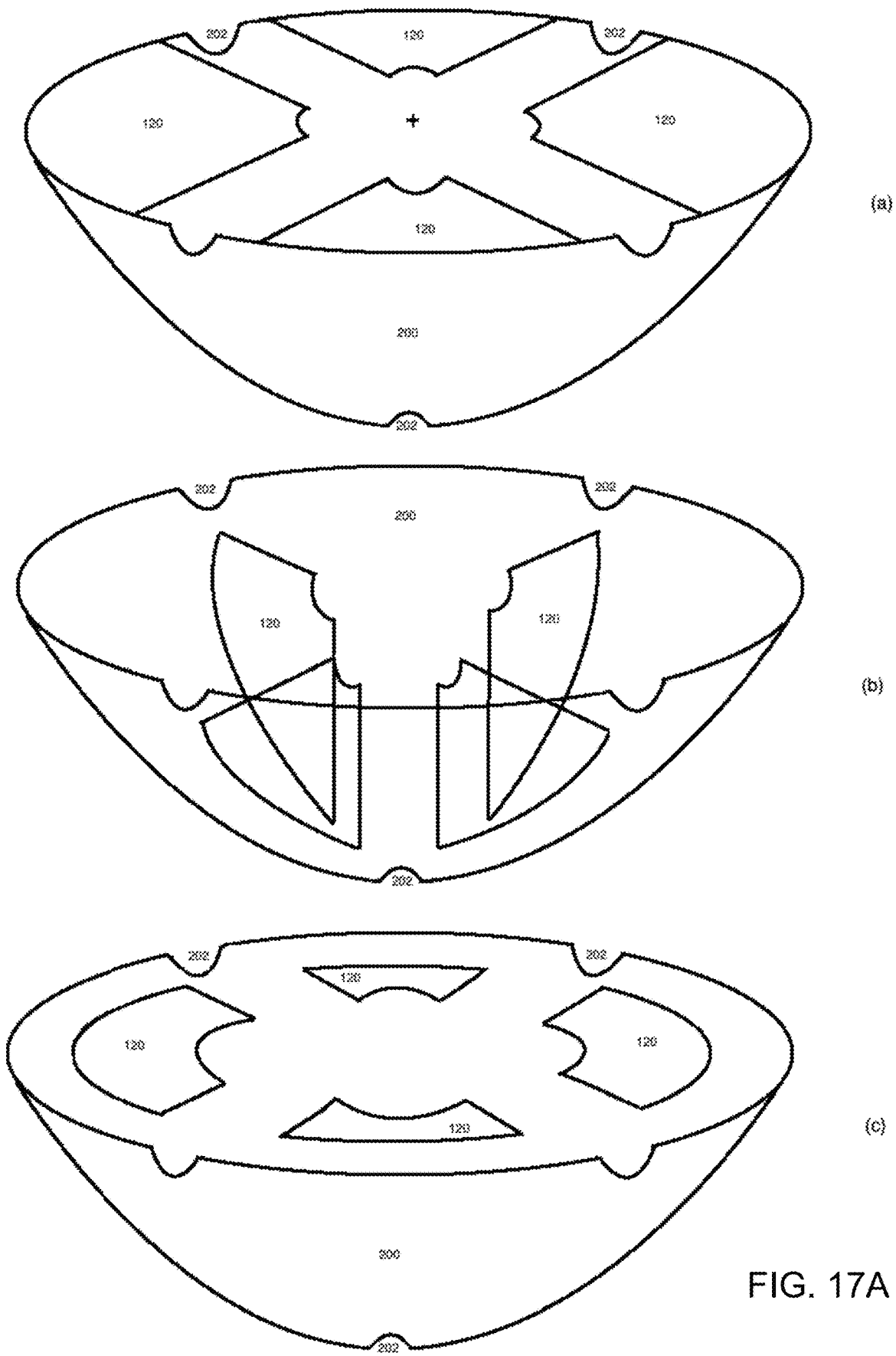
FIGS. 17A, 17B and 17C are diagrams illustrating some of the possible configurations of fins/protrusions 120 used with the (apparatus 100 and/or) containers/spheres 200 according to one or more embodiments described herein.
Figure 17B:
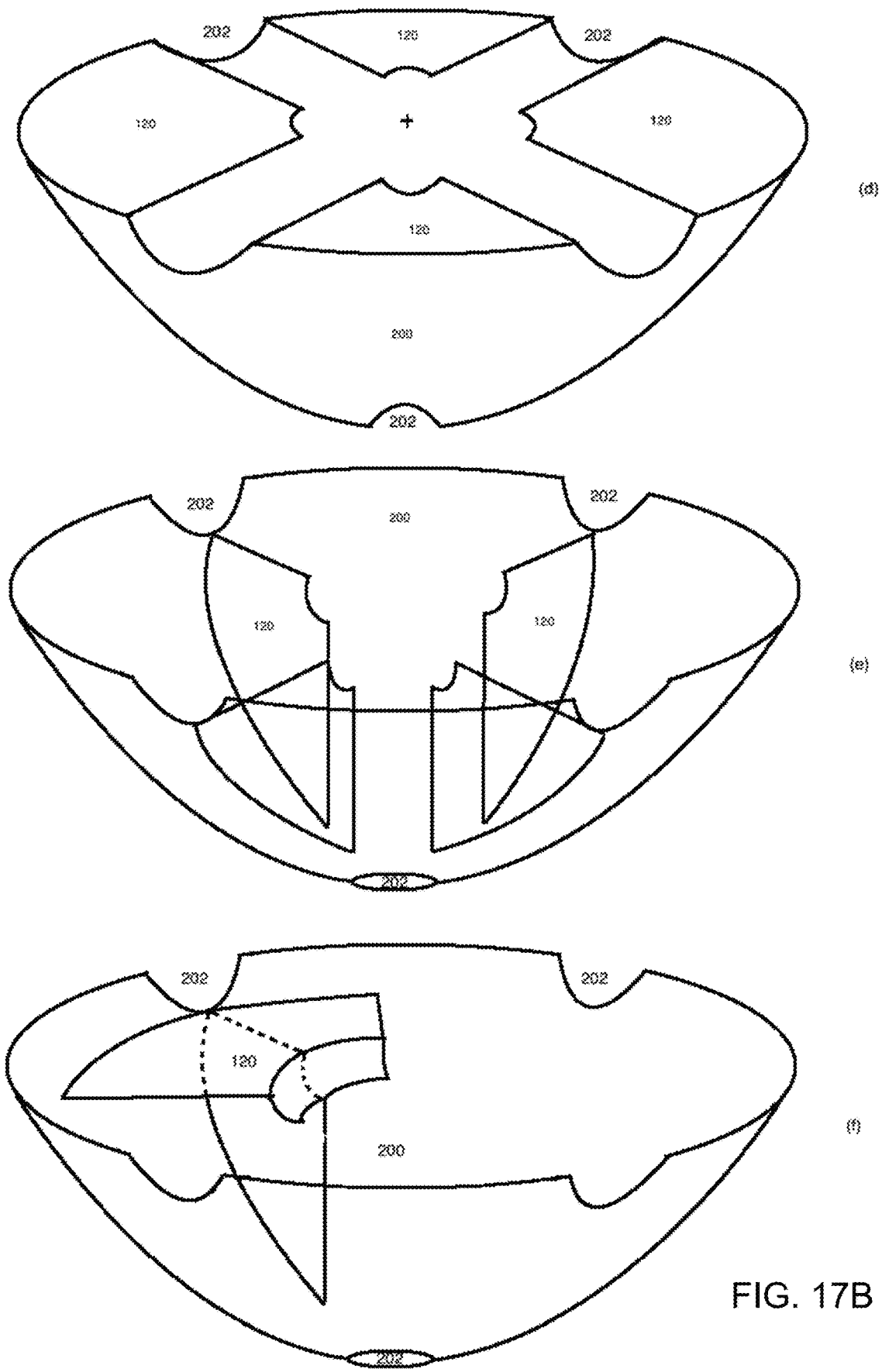
Figure 17C:
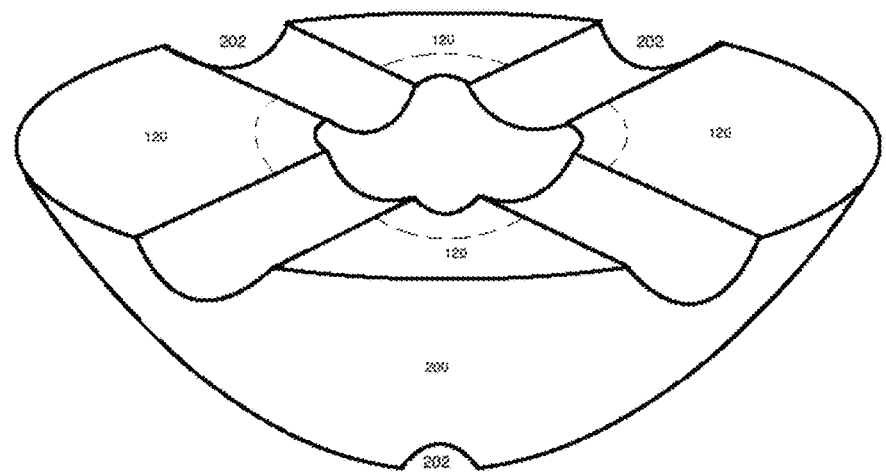
Figure 17C:
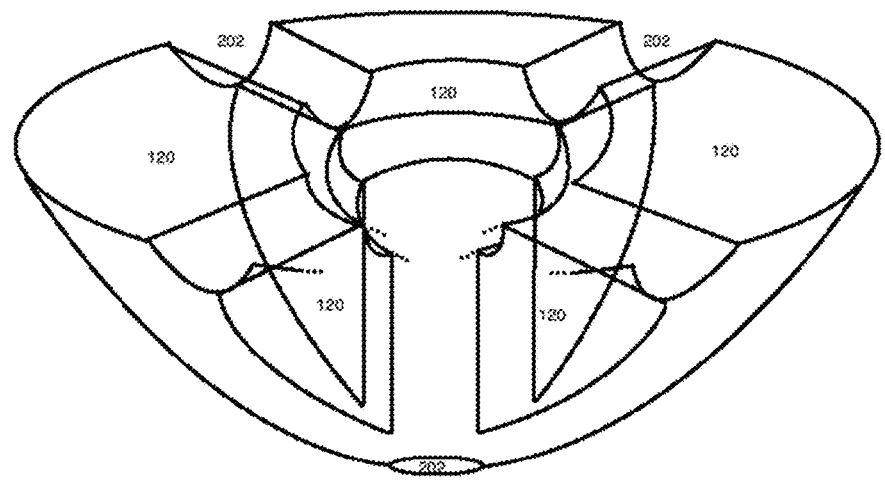
Figure 17C:
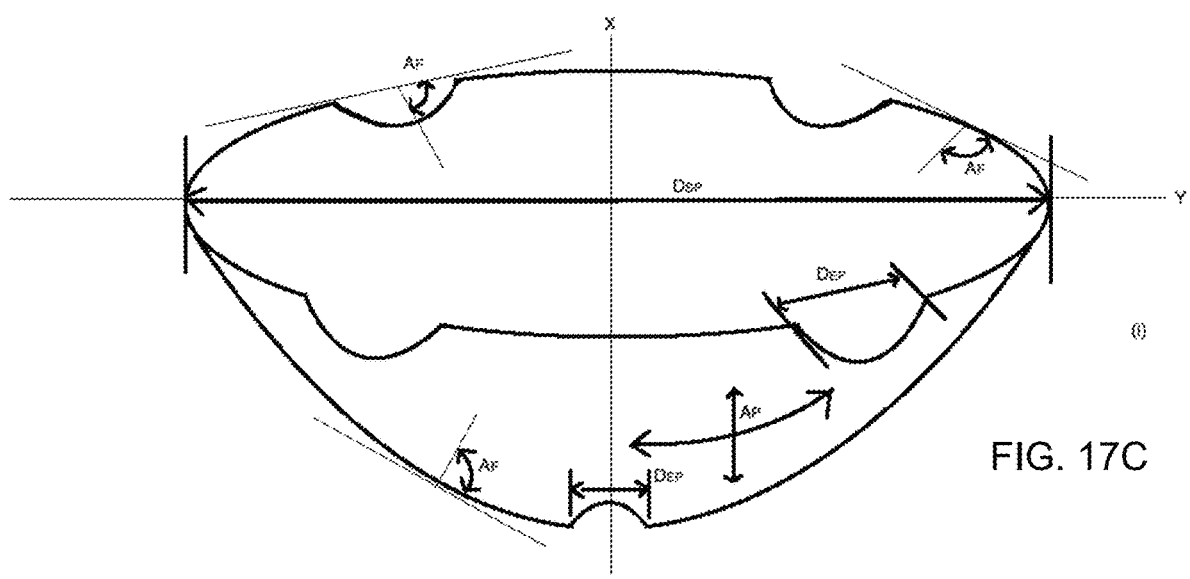
Figure 18A:
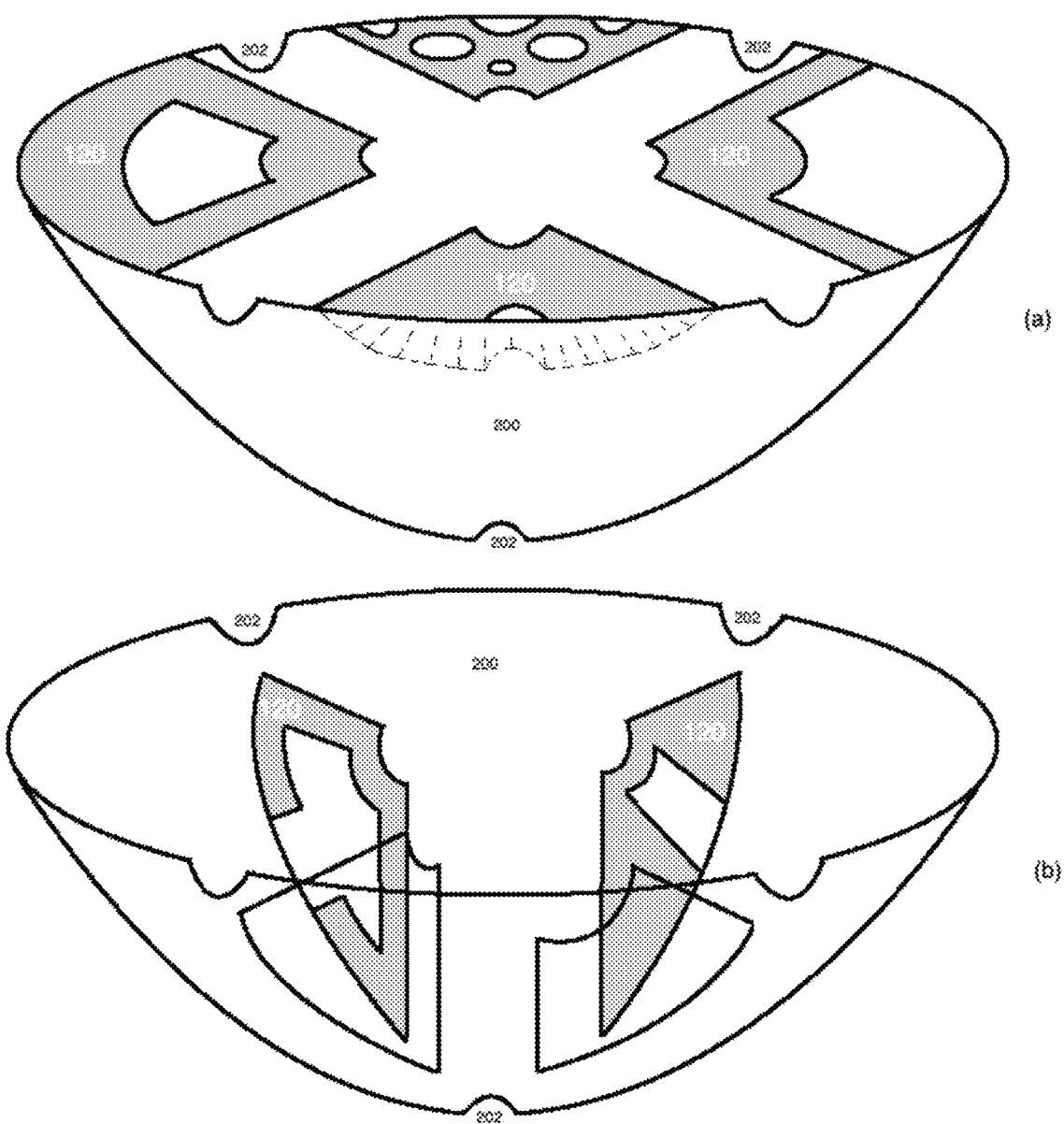
FIGS. 18A and 18B are diagrams illustrating some of the possible configurations of fins 120 used with the container/spheres 200 (and/or apparatus 100) according to one or more embodiments described herein.

FIGS. 17(A, B and C, and FIGS. 18(A and B)) is another view of at least FIG. 16A. It should be noted that FIG. 17(a) through 17(h) may be used individually and/or in combination (all fins of FIGS. 17(a) through 17(h) used in one half container/sphere). For example, if the fins of FIGS. 17(a) through 17(h) where combined, the apparatus 100 of e.g., FIG. 21 may be place directly into the half container/sphere when the similar half container/sphere can be used to close off the apparatus 100 and make a complete container/sphere 200.

According to one or more embodiments, the fins 120 that are located parallel to the opening plane of the container/sphere 200 may be located flushed with the opening plane (e.g., FIGS. 17(a), 17(d), 17(g), 17(h), etc.), and/or may be located within a distance away from the opening plane (e.g., FIG. 17(c)), and/or etc.

According to one or more embodiments, the fins 120 may be designed by combining two or more (whole and/or part) fins 120. For example, one vertical fin/protrusion 120 may be combined with two (half and/or whole) horizontal fins/protrusions 120 (or vice versa) as illustrated in at least FIG. 17(f) to create a T shaped fin. The T shape fin/protrusion 120 may or may not have a front scooped area.

FIGS. 17(g) and 17(h) illustrate some of the pieces of the fins/protrusions 120 that may be used, individually and/or in combination. It should be noted that any designs may be used with any and/or all of these surface pieces. It should be noted that the dashed line in FIG. 17(g) illustrates a larger open area. It should also be noted that FIG. 17(h) has an omitted section for better illustration purposes.

According to one or more embodiments, a fin(s)/protrusion(s) may be dimensioned in any manner (e.g., FIG. 3(j), FIG. 17(i)).

According to one or more embodiments, a fin(s)/protrusion(s) may be included at angle on the surface of container/sphere 200 and/or on the surface of the apparatus 100. For example, a fin(s)/protrusion(s) may extend outwardly from a surface at (approximately) 90° (e.g., between 45° to 90°) from any surface and/or at an angle (approximately)) perpendicular to any flat and/or curved surface.

According to one or more embodiments, a fin(s)/protrusion(s) 120 may be positioned along any place ($A_P$) on the surface of container/sphere 200 and/or on the surface of the apparatus 100. A fin(s)/protrusion(s) may be place in the middle of a surface area (e.g., a tube), on the end, on the start, a combination thereof, etc. For example, a fin/protrusion may start at the at the start of the tube length and/or may start at 1%, 2%, 3% . . . 99% (by increments of n, n=1), and/or any range thereof, of the tube length and where a fin/protrusion may end at the end of the tube length and/or may end at 2%, 3% . . . 100% (by increments of n, n=1), and/or any range thereof, of the tube length. For example, a fin/protrusion may extend/protrude/span between the range of 5 to 95% of the tube length.

According to one or more embodiments, a fin(s)/protrusion(s) 120 may be angled at any angle like 90° ($A_F$=90°, perpendicular to the surface it is on). For example, a fin/protrusion may be angled at $A_F$=0°, 1°, 2°, 3° . . . 180° (by increments of n, n=1), and/or any range thereof. For example, a fin/protrusion may be angled between the range of 45° and 135°.

According to one or more embodiments, an interior circumference of the tube 103 and/or tube end 104 ($D_{TE}$) and/or the exterior circumference of the tube 103 and/or tube end 104 ($D_T$) may be related to the circumference of the exit hole 102 ($D_{EH}$). For example, the relationship may be that $D_{TE}$ is greater than $D_{EH}$, and/or $$D_{TE}=n \times D_{EH}, n=1,2,3,4,5,6,7,8,9,10,11,12,13,13,14, 15, \text{and/or any range thereof}$$

$$D_T=n \times D_{EH}, n=1,2,3,4,5,6,7,8,9,10,11,12,13,13,14, 15, \text{and/or any range thereof}$$

For example, the interior circumference of the tube 103 and/or tube end 104 ($D_{TE}$) and/or the exterior circumference of the tube 103 and/or tube end 104 ($D_T$) and/or $D_{EH}$ may be in the range of 0.25 inches to 2.50 inches.

According to one or more embodiments, $D_{EH}$ may be any size to correspond to an individual treat. For example, the circumference of $D_{EH}$ may be at least/at most 0.20 inch, at least/at most 0.25 inch, at least/at most 0.50 inch, at least/at most 0.75 inch, etc.

According to one or more embodiments, $D_{EH}$ may be any size to correspond to accommodate a few treats to be inserted at one time. For example, the circumference of $D_{TE}$ may be at least/at most 0.50 inch, at least/at most 0.75 inch, at least/at most 1.00 inch, at least/at most 1.25 inch, at least/at most 1.50 inch, at least/at most 1.75 inch, at least/at most 2.00 inch, at least/at most 2.50 inch, etc.

According to one or more embodiments, the center portion 101 may have an internal and/or external length ($CP_{IL}$, $CP_{EL}$), an internal and/or external width ($CP_{IW}$, $CP_{EW}$), an internal and/or external height ($CP_{IH}$, $CP_{EH}$), an internal and/or external area ($CP_{IA}$, $CP_{EA}$), and/or an internal and/or external circumference ($CP_{IC}$, $CP_{EC}$). In addition, according to one or more embodiments, the center portion 101 may have an internal volume ($CP_{IV}$).

According to one or more embodiments, the tubes 103 may have an internal and/or external length ($T_{IL}$, $T_{EL}$), an internal and/or external width ($T_{IW}$, $T_{EW}$), an internal and/or external height ($T_{IH}$, $T_{EH}$), an internal and/or external area ($T_{IA}$, $T_{EA}$), and/or an internal and/or external circumference ($T_{IC}$, $T_{EC}$). In addition, according to one or more embodiments, the tubes 103 may have an internal volume ($T_{IV}$).

According to one or more embodiments, the $CP_{IL}$ and/or the $CP_{EL}$ may equal to, greater than and/or less than the $CP_{IW}$ and/or the $CP_{EW}$ which may equal to, greater than and/or less than the $CP_{IH}$ and/or the $CP_{EH}$.

According to one or more embodiments, the $T_{IL}$ and/or the $T_{EL}$ may equal to, greater than and/or less than the Tiw and/or the $T_{EW}$ which may equal to, greater than and/or less than the $T_{IH}$ and/or the $T_{EH}$.

According to one or more embodiments, the $CP_{IL}$ and/or the $CP_{EL}$ may equal to, greater than and/or less than the $T_{IL}$ and/or the $T_{EL}$. For example, the $CP_{IL}$ and/or the $CP_{EL}$ may equal to and/or less than the $T_{IL}$ and/or the $T_{EL}$.

According to one or more embodiments, the $CP_{IW}$ and/or the $CP_{EW}$ may equal to, greater than and/or less than the Tiw and/or the $T_{EW}$.

According to one or more embodiments, the $CP_{IH}$ and/or the $CP_{EH}$ may equal to, greater than and/or less than the $T_{IH}$ and/or the $T_{EH}$.

According to one or more embodiments, the $CP_{IC}$ and/or $CP_{EC}$ may equal to, greater than and/or less than the $T_{IC}$ and/or $T_{EC}$.

According to one or more embodiments, the $CP_{IA}$ and/or $CP_{EA}$ may equal to, greater than and/or less than the $T_{IA}$ and/or $T_{EA}$.

According to one or more embodiments, the $CP_{IV}$ and/or $CP_{EV}$ may equal to, greater than and/or less than the $T_{IV}$ and/or $T_{EV}$.

According to one or more embodiments, the protrusion 120 length may be of any length. For example, the protrusion 120 length/span may be less than the tube length that the protrusion 120 rests on. For example, the protrusion 120 length/span may be less than the tube length of the shortest tube that the protrusion 120 rests on.

For example, the protrusion 120 length may be in the range 1.00 inch to 8.00 inches.

According to one or more embodiments, the size of open portion(s) on the protrusion 120 may be any size to correspond to an individual treat. For example, the size of open portion(s) on the protrusion 120 may be at least/at most 0.20 inch, at least/at most 0.25 inch, at least/at most 0.50 inch, at least/at most 0.75 inch, etc. For example, $D_{EH}$ may be equal to, less than, and/or greater than the size of open portion(s) on the protrusion 120. For example, the size of open portion(s) on the protrusion 120 may be in the range of 0.20 inches to 2.0 inches.

According to one or more embodiments, the circumference of an (full) exit port 202 and/or the diameter of a partial exit port 202 (e.g., an exit port 202 which occurs at the connecting mechanism/between the two half containers/spheres 200) may be of any size and/or shape. For example, the circumference and/or diameter of an (partial or full) exit port 202 ($D_{EP}$) may be less than, equal to, and/or greater than $D_{TE}$ and/or $D_T$. For example, the circumference of an (full) exit port 202 and/or the diameter of a partial exit port 202 may be in the range of 0.25 inches to 2.50 inches.

According to one or more embodiments, a circumference of the tube 103 and/or tube end 104 ($D_{TE}$) and/or the exterior circumference of the tube 103 and/or tube end 104 ($D_T$) and/or the circumference of the exit port 202 ($D_{EP}$) may be related to the length/width/height of apparatus 100 and/or the diameter of the apparatus 200 ($D_{SP}$). For example, the length/width/height of apparatus 100 and/or the diameter of the apparatus 200 ($D_{SP}$) may be less than, greater than, and/or equal to 5×, 10×, 12×, 24×, 36×, either the inner circumference of the tube 103 and/or tube end 104 ($D_{TE}$) and/or the exterior circumference of the tube 103 and/or tube end 104 ($D_T$) and/or the circumference of the exit port 202 ($D_{EP}$), and/or any range thereof. For example, the length/width/height of apparatus 100 and/or the diameter of the apparatus 200 ($D_{SP}$) may be in the range of 8 times to 20 times the size of either the inner circumference of the tube 103 and/or tube end 104 ($D_{TE}$) and/or the exterior circumference of the tube 103 and/or tube end 104 ($D_T$) and/or the circumference of the exit port 202 ($D_{EP}$).

It should be noted that, according to one or more embodiments, the face of the tube end 104 may be perpendicular to the tube 103 and/or tube end 104. In addition, the face of the tube end 104 may be angled and/or curved at any angle for example to become flush with the interior and/or exterior surface apparatus 200. For example, $A_T$ may be at a flat angle and/or curved angle to match the circumference radius/diameter of the apparatus 100 using the center point of the apparatus 100.

It should be noted that any and all features, individually and/or in any combination, as disclosed in at least FIG. 17 and/or any other Figure(s) may be used interchangeable with any other embodiment disclosed here.

FIG. 18 illustrates some of the possible configurations of fins 120 used with the container/spheres 200 (and/or apparatus 100) according to one or more embodiments. It should noted that the fins 120 may be connected to the container/sphere 200 (and/or apparatus 100) either permanently and/or connectably similarly to the tube(s).

FIG. 18 (like other Figures) illustrates that the fins 120 are not limited to the maximum capacity, instead they use (or not used) to have holes, cut outs, etc.

Figure 18B:
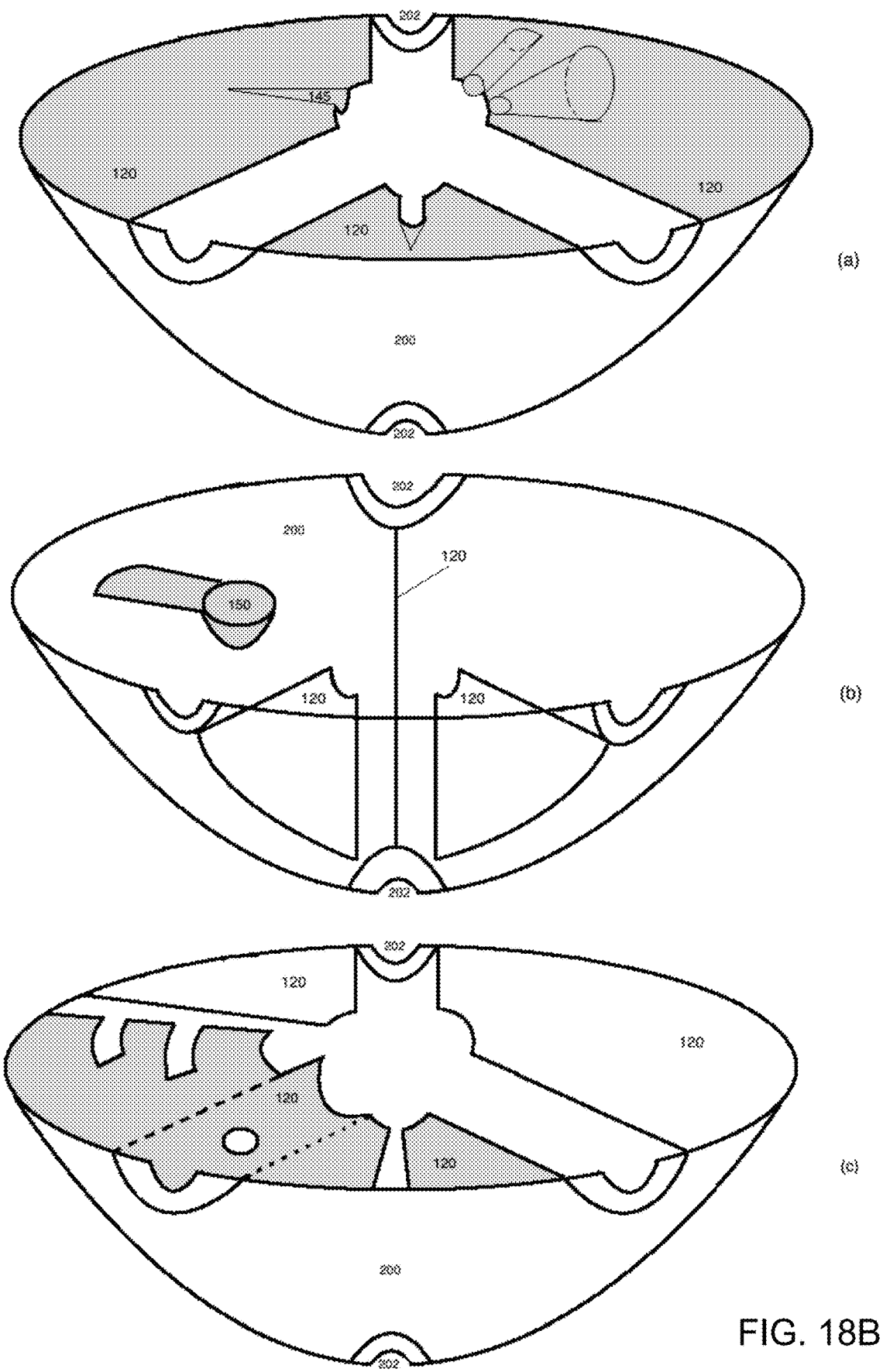

According to one or more embodiments, fins 120 may include one or more channel and/or one or more creases and/or one or more ridges and/or one or more grooves and/or one or more folds and/or one or more pleats and/or etc. For example, FIG. 18B(a) illustrates one channel 145 that starts at the container/sphere surface and/or from a distance from the container/sphere surface and extend towards an exit hole(s) 102 and/or the center portion 101. It should be noted that the channel, tunnel, etc. may be increasing in width (as illustrated in FIG. 18B(a)), uniform in width, and/or decreasing in width. It should be noted that one or more tunnels (e.g., open on both ends) may be used in place of a channel, tunnel, etc. where the tunnel may be included on top the fin or centrally incorporated in the fin (as illustrated in FIG. 18B(a)).

According to one or more embodiments, one or more scoop members 150 may be used anywhere in the container/sphere. One or more benefits of having a scoop member is that a pet owner may place a substance like peanut butter in it so that the smell of the substance can increase the drive in the pet. It should be noted that the scoop member 150 may have a connected lid with holes in order to better keep the substance inside while allowing the smell to protrude out. According to one or more embodiments, one or more scoop members 150 may be permanently attached to the inside of the container/sphere and/or one or more scoop members 150 may be detachable/attachable to the inside of the container/sphere.

According to one or more embodiments, the fins 120 may span underneath (and/or overtop) of the tubes as illustrated in at least FIG. 18(c). In addition, the fin surface which overlaps with a tube 103 may include one or more exit holes 102 which may correspond to exit hole(s) 102 on the tubes 103. Similarly, he fins 120 may span underneath (and/or overtop) of the center portions 101 where the fin surface which overlaps with the center portion 101 may include one or more exit holes 102 which may correspond to exit hole(s) 102 on the center portion 101.

It should be noted that any of the disclosed fin configurations (e.g., raised center arch closest to the center portion which creates a big gap between the center portion and the fin is increased) may be used on any other fin(s).

It should be noted that any and all features, individually and/or in any combination, as disclosed in at least FIG. 18 and/or any other Figure(s) may be used interchangeable with any other embodiment disclosed here.

At least FIGS. 1, 3 and 15-18, etc. illustrates some of the possible configurations of fins 120 used with the container/spheres 200 and/or the apparats 100 according to one or more embodiments. It should noted that the fins 120 may be connected to the container/sphere 200 and/or the apparatus 100 either permanently and/or connectably similarly to the tube(s).

In addition, the fins 120 of FIGS. 1, 3, and 15-18 may be designed and used in any other Figures, in any manner illustrated, and/or any combinations thereof.

According to one or more embodiments, a fin(s) 120 may be included to span from one tube 103 to another via one point and/or area on the tube to one point and/or area on another tube, for example, like the shortest span between the two tubes (e.g., as illustrated in most of the Figures, like FIG. 15A(d)). In addition, according to one or more embodiments, a fin 120 may be included along a tube axis (e.g., an entire axis and/or partial axis like halfway or a three quarter way e.g., from one tube end to the area of the center portion)) from one fin 120 to another fin 120 as illustrated FIG. 15A(d) and/or on one fin (e.g., half of the extended fin of FIG. 15A(d)). It should be noted that the extended fin 120 (e.g., FIG. 15A(d), FIG. 15B(a)) may extend at the angle illustrated and/or an at angle of (approximately) 180 degrees, (approximately) 135 degrees, (approximately) 90 degrees, (approximately) 45 degrees, (approximately) 15 degrees, etc., but the fins may be angle at any angle. (This also applies to the location of the fins in the container/spheres.)

According to one or more embodiments, any and all fins 120 may extend from the inside of the container/sphere's surface (and/or the tube's outer surface) toward the center of the container/sphere by an angle (and/or a length), etc.

According to one or more embodiments, any and all fins 120 that are illustrated on the apparatus 100 may be instead connected to the apparatus 200 at the corresponding locations, and/or be instead connected to both the apparatus 100 ad apparatus 200, etc. In addition, according to one or more embodiments, any and all fins 120 that are illustrated on the apparatus 200 may be instead connected to the apparatus 100 at the corresponding locations, and/or be instead connected to both the apparatus 100 ad apparatus 200, etc.

For example, the fin(s) 120 may extend between to container/sphere exit ports/holes 202 (and/or half container/sphere exit ports/holes along the rim of the half container/sphere). A fin(s) 120 may extend from the inner surface of the container/sphere 200 at an angle (substantially) perpendicular (e.g., approximately 90 degrees) to the (curved) surface of the container/sphere 200. However, the angle (substantially) perpendicular (e.g., approximately 90 degrees) to the (curved) surface of the container/sphere 200 may be angled slightly, e.g., 0-5%, 5-10%, 10-15%, 15-20%, 20-25%, 25-30%, 30-35%, 35-40%, etc. but preferably not more than 45%.

According to one or more embodiments, the number of fins 120 may be equal to, greater than, and/or less than the number of container/sphere exit port holes 202 (including the half holes presented along the rim), etc. For example, the number of fins 120 may be equal to the number of container/sphere exit port holes 202 (including the half holes presented along the rim), double the number of container/sphere exit port holes 202 (including the half holes presented along the rim), etc.

According to one or more embodiments, a fin(s) 120 may extend from the outside of the tube's surface (and/or the container/sphere's inside surface) and away from that tube (and/or away from the container/sphere) and/or towards the center portion 101.

For example, the fin(s) 120 may extend between to at least two tubes 103. A fin(s) 120 may extend from the outer surface of the tube(s) 103 at an angle (substantially) parallel (e.g., approximately 180 degrees) to the axis of the tube's extension. However, the angle (substantially) parallel (e.g., approximately 180 degrees) to the axis of the tube's extension may be angled slightly, e.g., 0-5%, 5-10%, 10-15%, 15-20%, 20-25%, 25-30%, 30-35%, 35-40%, etc. but preferably not more than 45%.

According to one or more embodiments, the number of fins 120 may be equal to, greater than, and/or less than the number of tubes 103, and/or equal to, greater than, and/or less than the number of exit holes 102 on the apparatus 100, and/or equal to, greater than, and/or less than the number of tube ends that are not permanently sealed off, and/or etc. For example, the number of fins 120 may be equal to the number of tubes 103, double the number of tubes 103, etc. In addition, the number of fins 120 may be equal to the number of exit holes (on the apparatus 100 and/or the container/sphere 200), double the number of exit holes (on the apparatus 100 and/or the container/sphere 200, etc.

According to one or more embodiments, a fin(s) 120 may extend from the inside of the container/sphere's surface (and/or the tube's outer surface) toward the center of the container/sphere 200 by a length (and/or an angle), etc.

According to one or more embodiments, a fin(s) 120 may extend between to container/sphere exit ports/holes (and/or half container/sphere exit holes along the rim of the half container/sphere). For example, a fin(s) 120 may extend from the inner surface of the container/sphere 200 for a length that is (no more than) equal to or less than the greatest radius minus half the radius of an exit port:

$Lfin \leq Rmax - 0.5(Rexitport)$

However, to account for the space needed so that the fin 120 can push the treats to the opening and allow for the treats to rush through the open area 130, a fin(s) 120 may extend from the inner surface of the container/sphere 200 for a length that is (no more than) equal to or less than 90% of the greatest radius minus half the radius of an exit port:

$Lfin \leq 0.90(Rmax - 0.5(Rexitport))$

Accordingly, the length of the fin 120 may be 0.00(Lfin) to Lfin. Therefore, (each of) the length of a fin(s) 120 may be between 0.0Lfin to 0.1Lfin, and/or 0.1Lfin to 0.2Lfin, and/or 0.3Lfin to 0.4Lfin, and/or 0.4Lfin to 0.5Lfin, and/or 0.5Lfin to 0.6Lfin, and/or 0.6Lfin to 0.7Lfin, and/or 0.7Lfin to 0.8Lfin, and/or 0.8Lfin to 0.9Lfin, etc.

According to one or more embodiments, the fin(s) 120 may extend between to at least two tubes 103. For example, a fin(s) may extend the outer surface of the tube(s) 103 for a length that is (no more than) equal to or less than the length of a tube 103:

$Lfin \leq Ltube$

However, to account for the space needed so that the fin 120 can push the treats to the opening and allow for the treats to rush through the open area 130, a fin(s) 120 may extend from the outer surface of the tube(s) 103 for a length that is (no more than) equal to or less than 90% of the length of a tube:

$$L\text{fin} \leq 0.90(L\text{tube})$$

Accordingly, the length of the fin 120 may be 0.00(Ltube) to Lfin. Therefore, (each of) the length of a fin(s) may be between 0.0 Ltube n to 0.1 Ltube, and/or 0.1 Ltube to 0.2 Ltube, and/or 0.3 Ltube to 0.4 Ltube, and/or 0.4 Ltube to 0.5 Ltube, and/or 0.5 Ltube to 0.6 Ltube, and/or 0.6 Ltube to 0.7 Ltube, and/or 0.7 Ltube to 0.8 Ltube, and/or 0.8 Ltube to 0.9 Ltube, etc.

According to one or more embodiments, a fin(s) may extend and/or protrude for any length and/or width except it is preferable for the fin(s) not to overlap with the path of a tube(s) and/or port hole(s).

Figure 19:
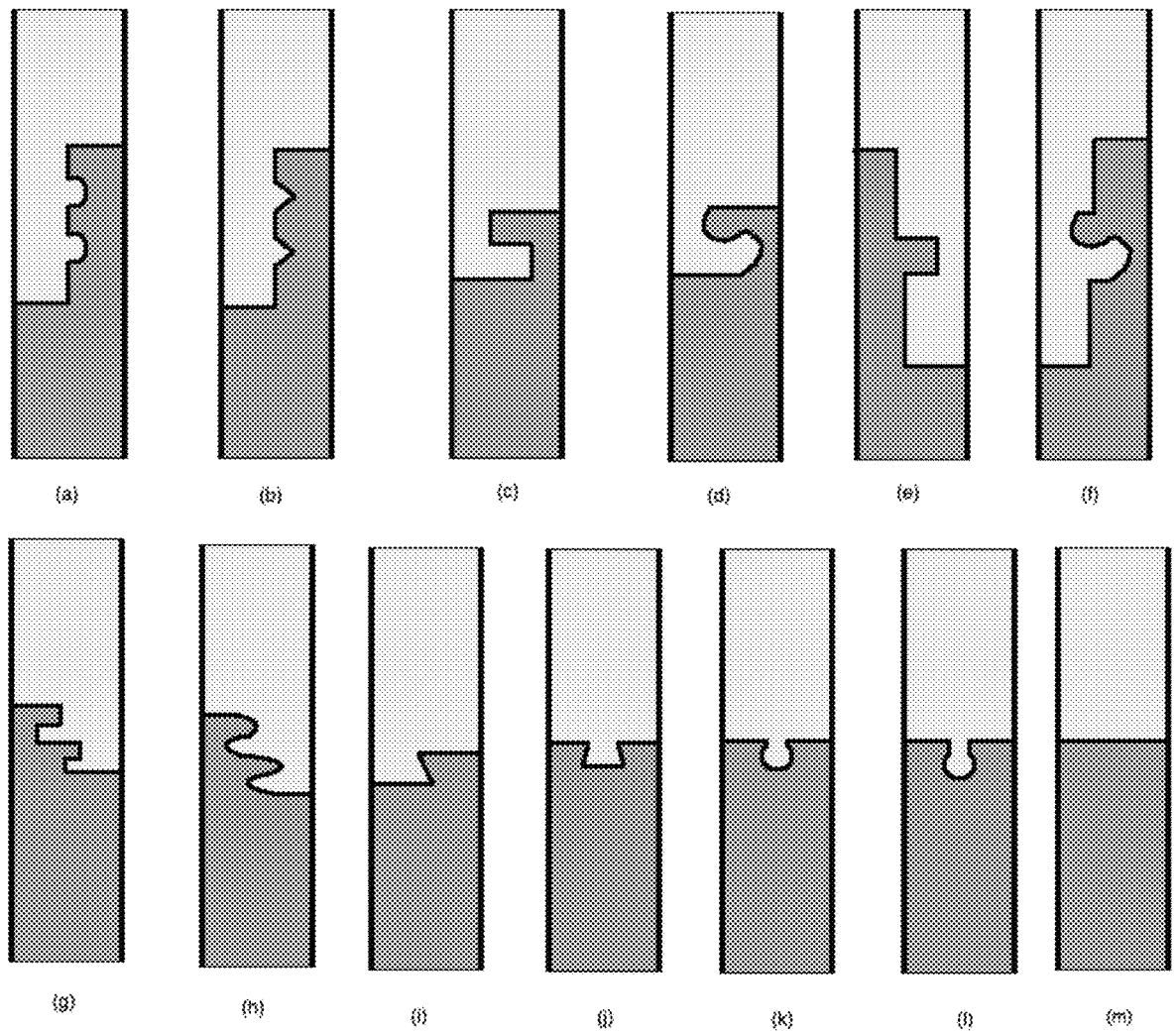
FIG. 19 is a diagram illustrating some of the possible configurations of the connecting and/or locking mechanisms 299 according to one or more embodiments described herein.

It should be noted that any and all features, individually and/or in any combination, as disclosed in at least FIG. 19 and/or any other Figure(s) may be used interchangeable with any other embodiment disclosed here.

FIG. 19 illustrates some of the possible configurations of the connecting and/or locking mechanisms 299 to connect the container/sphere pieces.

For example, a tongue and groove connection 299 may be used to connect the container/sphere pieces, and/or similar tongue and groove structures 299 may be used like FIG. 19(k) which illustrates a ball that provides sufficient locking for flexible materials, etc., and/or FIG. 19(l) which illustrates an extended ball, and/or FIG. 19(j) which illustrates a non-curved ball type structure, etc. FIG. 19(i) provides a simple snap and/or click in place type of structure.

FIG. 19(a) and FIG. 19(b) illustrates a double snap and/or click in place type of structure which can be used by ball structure, extended ball structure, triangular structure, non-curved ball type structure, etc.

FIGS. 19(c), 19(d), 19(e), 19(f), 19(g), 19(h), etc. illustrates some other possible configurations of the connecting and/or locking mechanisms 299 to connect the container/sphere pieces.

According to one or more embodiments, the connecting mechanism 299 may be a flat surface that is flush with one another when connected (e.g., FIG. 19(m)). While other connecting and/or locking mechanisms 299 may provide for better connection than a flat surface, a flat surface connector 299 still provides many benefits. For example, one benefit of providing a flat connecting section 299 on each of the (half) container/spheres may be designed to mirror each other and manufacturing may only require one mold. It should be noted that the use of tube caps (and/or the use of a cap end and sleeve cap end) become more beneficial as the holding of the two container/sphere pieces (e.g., hemicontainer/hemisphere/halfsphere) together.

It should be noted that any and all features, individually and/or in any combination, as disclosed in at least FIG. 19 and/or any other Figure(s) may be used interchangeable with any other embodiment disclosed here.

FIG. 20 illustrates an example of a four-tube apparatus 100 used with a four-hole capsulation apparatus 200.

According to one or more embodiments, any (or all) of the tubes may have a threaded external surface (either in part (e.g., tube tips) or in whole) in order to be screwed into the internal treaded portion of the exit ports on the sphere 200. For example, at least FIG. 20 illustrates apparatus 100 having a male threading on the top tube 103 which connects to a female threading of the top exit port 202 on the apparatus 200.

According to one or more embodiments, while any connection may be used (and/or none) in apparatus 200, a male or female threading may be used the end of the first member of the apparatus 200 while a female or male threading may be used the end of the second member of the apparatus 200.

One of the benefits is that the apparatus 100 would be held in place with the apparatus 200 without the need for tube caps that are not flush with the surface of the apparatus (e.g., additional lip on cap).

FIG. 21 illustrates an example of a six-tube apparatus 100 used with a four-hole capsulation apparatus 200.

According to one or more embodiments, any (or all) of the (e.g., aide) tubes may have a grooved external surface (either in part (e.g., tube tips) or in whole) in order to match the internal grooved portion of the (e.g., side) exit ports on the sphere 200. For example, the side exit ports may be flat, grooved to match tongued and groove, etc. while the tubes may be match accordingly.

It should be noted that, according to one or more embodiments, the first member of the apparatus 200 may the first half of the apparatus connector to be tongue while the second half of the apparatus connector to be groove where the second member of the apparatus 200 may the first half of the apparatus connector to be tongue while the second half of the apparatus connector to be groove so that manufacturing may be simplified by needing to only manufacture one side and being able to be used together.

According to one or more embodiments, the modular system may include the apparatus 100 being one single (first) piece while the first one-half container/sphere of container/sphere 200 being one single (second) piece while the second one-half container/sphere of container/sphere 200 being one single (third) piece. According to one or more embodiments, the modular system may include the apparatus 100 and the first one-half container/sphere of container/sphere 200 together being one single (first) piece while the second one-half container/sphere of container/sphere 200 being one single (second) piece.

It should be noted that the apparatus 100/container/sphere 200 may be formed where one-half container/sphere is formed as one piece to the treat dispensing toy whereby the user only has to attach the other half of the container/sphere to close it. Also, the container/sphere may be formed where most of the container/sphere is formed as one piece with the treat dispensing toy whereby there is only one input port (screw to open/close, etc.) to get the treats in.

The apparatus 100 and/or container/sphere 200 may be made of substantially all flexible (naturally bendable) material that makes the apparatus bouncier (and/or chewable), for example, materials like rubber, synthetic rubber, polymer, silicone, plastic, composite materials, durable natural rubber, nylon, combinations thereof, and/or etc. The apparatus 100 and/or container/sphere 200 may be made of a non-metal material, e.g., at least the majority (or all) of the apparatus is made of non-metal (non-metallic) material—accordingly, it may substantially be metal free. In other words, the apparatus 100 and/or container/sphere 200 may be made of (substantially) only material that comprise one and/or more and/or a combination of rubber, synthetic rubber, polymer, silicone, (e.g., hard and/or soft) plastic, composite materials, durable natural rubber, nylon, combinations thereof, and/or etc.

It should be noted that one or more main tubes 103 of one or more Figures can be used interchangeable in any embodiment(s), and/or one or more minor (e.g., short) tubes 103b (including the short ends comprised of multiple short tubes configurations illustrated in for example FIG. 1) of one or more Figures can be used interchangeable in any embodiment(s), one or more main center portions 101 of one or more Figures can be used interchangeable in any embodiment(s), one or more tube types of one or more Figures can be used interchangeable in any embodiment(s), one or more tube ends 104 of one or more Figures can be used interchangeable in any embodiment(s), one or more main tube end caps 105 of one or more Figures can be used interchangeable in any embodiment(s), one or more exit hole(s) 102 of one or more Figures can be used interchangeable in any embodiment(s), one or more exit ports 202 of one or more Figures can be used interchangeable in any embodiment(s), one or more fin(s) 120 of one or more Figures can be used interchangeable in any embodiment(s), one or more container/sphere(s) 200 of one or more Figures can be used interchangeable in any embodiment(s), one or more apparatuses 100 of one or more Figures can be used interchangeable in any embodiment(s), and/or etc.

According to one or more embodiments, an apparatus 100 may have one or more center portions 101 where the one or more center portions 101 may have a first (e.g., hollow, solid, etc.) tube 103 that extends in a first outwardly direction away from the center portion 101 for a first length (with a first internal and/or external circumference) where the first tube 103 has either an open tube end (with a first type of tube end cap 105) or a closed tube end 104, and/or a second (e.g., hollow, solid, etc.) tube 103 that extends in a second outwardly direction away from the center portion 101 for a second length (with a second internal and/or external circumference) where the second tube 103 has either an open tube end 104 (with a first or a second type of tube end cap) or a closed tube end 104, and/or a third (e.g., hollow, solid, etc.) tube 103 that extends in a third outwardly direction away from the center portion 101 for a third length (with a third internal and/or external circumference) where the third tube 103 has either an open tube end 104 (with a first type, a second type or a third type of tube end cap 105) or a closed tube end 104, and/or a fourth (e.g., hollow, solid, etc.) tube 103 that extends in a fourth outwardly direction away from the center portion 101 for a fourth length (with a fourth internal and/or external circumference) where the fourth tube 103 has either an open tube end 104 (with a first type, a second type, a third type or a fourth type of tube end cap 105) or a closed tube end 104, and/or a fifth (e.g., hollow, solid, etc.) tube 103 that extends in a fifth outwardly direction away from the center portion 101 for a fifth length (with a fifth internal and/or external circumference) where the fifth tube 103 has either an open tube end 104 (with a first type, a second type, a third type, a fourth type or a fifth type of tube end cap 105) or a closed tube end 104, and/or a sixth (e.g., hollow, solid, etc.) tube 103 that extends in a sixth outwardly direction away from the center portion 101 for a sixth length (with a sixth internal and/or external circumference) where the sixth tube 103 has either an open tube end 104 (with a first type, a second type, a third type, a fourth type, a fifth type or a sixth type of tube end cap 105) or a closed tube end 104, and/or, etc. It should be noted that the first length may be less than, equal to and/or greater than the second length; the second length may be less than, equal to and/or greater than the third length; the third length may be less than, equal to and/or greater than the fourth length; the fourth length may be less than, equal to and/or greater than the fifth length; the fifth length may be less than, equal to and/or greater than the sixth length; the sixth length may be less than, equal to and/or greater than the first length; etc. It should be noted that the first internal and/or external circumference may be less than, equal to and/or greater than the second internal and/or external circumference; the second internal and/or external circumference may be less than, equal to and/or greater than the third internal and/or external circumference; the third internal and/or external circumference may be less than, equal to and/or greater than the fourth internal and/or external circumference; the fourth internal and/or external circumference may be less than, equal to and/or greater than the fifth internal and/or external circumference; the fifth internal and/or external circumference may be less than, equal to and/or greater than the sixth internal and/or external circumference; the sixth internal and/or external circumference may be less than, equal to and/or greater than the first internal and/or external circumference; etc.

According to one or more embodiments, all of the tube lengths (and/or circumferences) may be (approximately) the same or different, two or more of the tube lengths (and/or circumferences) may be the same and/or different, three or more of the tube lengths (and/or circumferences) may be the same and/or different, four or more of the tube lengths (and/or circumferences) may be the same and/or different, five or more of the tube lengths (and/or circumferences) may be the same and/or different, six or more of the tube lengths (and/or circumferences) may be the same and/or different, etc. It should be noted that, according to one or more embodiments, regardless of the tube lengths (and/or circumferences), all (or some) of the tube ends may terminate one the same spherical plane (and/or two or more spherical planes).

According to one or more embodiments, the circumference of one or more exit holes 102 (and/or 102b) may be less than (and/or equal to and/or greater than) the (internal) circumference of one or more tube ends 104.

According to one or more embodiments, the circumference of one or more exit holes 102 (and/or 102b) may be less than (and/or equal to and/or greater than) the circumference of one or more container/sphere exit ports 202.

According to one or more embodiments, the (internal) circumference of one or more exit holes 102 (and/or 102b) may be less than (and/or equal to and/or greater than) the circumference of one or more container/sphere exit ports 202.

According to one or more embodiments, one or more exit holes 102 may be located on the center portion 101, for example, at the intersection of tubes e.g., where two, three, four tubes start/meet/intersect (the entire intersection area of the tubes, etc.) when for example the center portion 101 is just the area where the tubes meet.

According to one or more embodiments, one or more exit holes 102 may be located on the center portion 101 at an area that is central to the two or more (three, four, etc.) tubes when for example the center portion 101 is more than just the intersection area (like FIG. 15B(c)).

According to one or more embodiments, the open inside cavity/area of the center portion 101 may be less than, equal to and/or greater than the open inside cavity/area of one of the tubes, the open inside cavity/area of two of the tubes, the open inside cavity/area of three of the tubes, the open inside cavity/area of four of the tubes, the open inside cavity/area of five of the tubes, the open inside cavity/area of six of the tubes, . . . and/or the open inside cavity/area of all of the tubes, etc.

According to one or more embodiments, the circumference and/or the volume of the open inside cavity/area of the center portion 101 may be less than, equal to and/or greater than the circumference and/or the volume of the open inside cavity/area of one of the tubes, the circumference and/or the volume of the open inside cavity/area of two of the tubes, the circumference and/or the volume of the open inside cavity/area of three of the tubes, the circumference and/or the volume of the open inside cavity/area of four of the tubes, the circumference and/or the volume of the open inside cavity/area of five of the tubes, the circumference and/or the volume of the open inside cavity/area of six of the tubes, . . . and/or the circumference and/or the volume of the open inside cavity/area of all of the tubes, etc.

According to one or more embodiments, the dimensions of the apparatus 100 may be at least (approximately) 2.75 inches (length)×(approximately) 2.75 inches (width)×(approximately) 2.75 inches (height). According to one or more embodiments, the dimensions of the apparatus 100 may be at least (approximately) 7 cm (length)×(approximately) 7 cm (width)×(approximately) 7 cm (height).

According to one or more embodiments, the dimensions of the apparatus 100 may be between (approximately) 2.75 inches (length)×(approximately) 2.75 inches (width)×(approximately) 2.75 inches (height) and (approximately) 4.50 inches (length)×(approximately) 4.50 inches (width)×(approximately) 4.50 inches (height).

According to one or more embodiments, the dimensions of the apparatus 100 may be between (approximately) 4.50 inches (length)×(approximately) 4.50 inches (width)×(approximately) 4.50 inches (height) and (approximately) 7.75 inches (length)×(approximately) 7.75 inches (width)×(approximately) 7.75 inches (height).

According to one or more embodiments, the dimensions of the apparatus 100 may be between (approximately) 7.75 inches (length)×(approximately) 7.75 inches (width)×(approximately) 7.75 inches (height) and (approximately) 12.50 inches (length)×(approximately) 12.50 inches (width)×(approximately) 12.50 inches (height).

According to one or more embodiments, the dimensions of the apparatus 100 may be between (approximately) 12.50 inches (length)×(approximately) 12.50 inches (width)×(approximately) 12.50 inches (height) and (approximately) 18.75 inches (length)×(approximately) 18.75 inches (width)×(approximately) 18.75 inches (height).

According to one or more embodiments, the dimensions of the apparatus 100 may be between (approximately) 18.75 inches (length)×(approximately) 18.75 inches (width)×(approximately) 18.75 inches (height) and (approximately) 24.50 inches (length)×(approximately) 24.50 inches (width)×(approximately) 24.50 inches (height).

According to one or more embodiments, the diameter of the container/sphere 200 may be at least (approximately) 2.75 inches.

According to one or more embodiments, the diameter of the container/sphere 200 may be between (approximately) 2.75 inches and 4.50 inches.

According to one or more embodiments, the diameter of the container/sphere 200 may be between (approximately) 4.50 inches and 7.75 inches.

According to one or more embodiments, the diameter of the container/sphere 200 may be between (approximately) 7.75 inches and 12.50 inches.

According to one or more embodiments, the diameter of the container/sphere 200 may be between (approximately) 12.50 inches and 18.75 inches.

According to one or more embodiments, the diameter of the container/sphere 200 may be between (approximately) 18.75 inches and 24.50 inches.

According to one or more embodiments, the tube end may be (e.g., the last) 5% of the entire tube, (e.g., the last) 10% of the entire tube, (e.g., the last) 15% of the entire tube, (e.g., the last) 20% of the entire tube, (e.g., the last) 25% of the entire tube, (e.g., the last) 30% of the entire tube, (e.g., the last) 35% of the entire tube, (e.g., the last) 40% of the entire tube, (e.g., the last) 45% of the entire tube, (e.g., the last) 50% of the entire tube, etc.

According to one or more embodiments, the tube end may between 1 and (e.g., the last) 5% of the entire tube, 5 and (e.g., the last) 10% of the entire tube, 10 and (e.g., the last) 15% of the entire tube, 15 and (e.g., the last) 20% of the entire tube, (e.g., the last) 20 and 25% of the entire tube, 25 and (e.g., the last) 30% of the entire tube, 30 and (e.g., the last) 35% of the entire tube, 35 and (e.g., the last) 40% of the entire tube, 40 and (e.g., the last) 45% of the entire tube, 45 and (e.g., the last) 50% of the entire tube, etc.

It should be noted that, according to one or more embodiments, any disclosed tube end 104 may be terminated along a flat plane as illustrated but any tube end may terminate one any angle and/or along a curved plane. More specifically, any and/or all tube ends may be configured to be angled, curved, etc. in a manner where a container/sphere is drawn around the apparatus 100 (where the tube ends touch the drawn container/sphere) and the tube end is angled and/or curved, etc. to match the container/sphere surface. For example, the flat planar tube ends of FIG. 2(*e*) may be altered to be angled where the outermost part of the tube end starts and continues to incline to the innermost part of the tube end—thereby making it fit tightly to the inner surface of a container/sphere's inner surface.

It should be noted that any fin 120 may be used with any apparatus (100 and/or 200). For example, in at least FIGS. 20 and 21 a few fins are illustrated however there may be more and/or less fins used. More specifically, according to one or more embodiments, any of the disclose fins may be used individually or in combination with apparatus 100 and/or apparatus 200.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In this specification the terms "pet," "animal," "dog," and the like all deemed totally interchangeable and should be afforded the widest possible interpretation.

In this specification the terms "apparatus 200," "container/sphere," "spherical," "container," "capsule," "cube," "two half spheres," and the like all deemed totally interchangeable and should be afforded the widest possible interpretation.

In this specification the terms "comprise," "comprises," "comprised," "comprising" and the like and the terms "include," "includes," "included," "including" and the like are all deemed totally interchangeable and should be afforded the widest possible interpretation.

Exemplary embodiments are shown and described in the present disclosure. It is to be understood that the embodiments are capable of use in various other combinations and environments and are capable of changes or modifications within the scope of the inventive concept as expressed herein. Such variations are not to be regarded as departure from the spirit and scope of the invention, and all such modifications as would be obvious to one skilled in the art are intended to be included within the scope of the following claims.

I claim:

1. A treat dispensing apparatus for dispensing treats and/or food to a pet, the treat dispensing apparatus comprising:
a first tube;
a first tube end;
a second tube;
a second tube end;
a third tube;
a third tube end;
a fourth tube;
a fourth tube end;
a fifth tube;
a fifth tube end;
a sixth tube;
a sixth tube end;
a center portion;
a first closing and/or sealing member configured to close and/or seal the first tube end; and
at least one exit hole for allowing a treat to pass through said at least one exit hole, wherein
the center portion is connected to the first tube,
the center portion is connected to the second tube,
the center portion is connected to the third tube,
the center portion is connected to the fourth tube,
the center portion is connected to the fifth tube,
the center portion is connected to the sixth tube,
the center portion is located between the first tube, the second tube, the third tube, the fourth tube, the fifth tube and the sixth tube,
the first tube is a different tube than the second tube,
the first tube is a different tube than the third tube,
the first tube is a different tube than the fourth tube,
the second tube is a different tube than the third tube,
the second tube is a different tube than the fourth tube,
the third tube is a different tube than the fourth tube,
the fifth tube is a different tube than the first tube,
the fifth tube is a different tube than the second tube,
the fifth tube is a different tube than the third tube,
the fifth tube is a different tube than the fourth tube,
the sixth tube is a different tube than the first tube,
the sixth tube is a different tube than the second tube,
the sixth tube is a different tube than the third tube,
the sixth tube is a different tube than the fourth tube,
the sixth tube is a different tube than the fifth tube,
the first tube end is a different tube end than the second tube end,
the first tube end is a different tube end than the third tube end,
the first tube end is a different tube end than the fourth tube end,
the second tube end is a different tube end than the third tube end,
the second tube end is a different tube end than the fourth tube end,
the third tube end is a different tube end than the fourth tube end,
the fifth tube end is a different tube end than the first tube end,
the fifth tube end is a different tube end than the second tube end,
the fifth tube end is a different tube end than the third tube end,
the fifth tube end is a different tube end than the fourth tube end
the sixth tube end is a different tube end than the first tube end,
the sixth tube end is a different tube end than the second tube end,
the sixth tube end is a different tube end than the third tube end,
the sixth tube end is a different tube end than the fourth tube end,
the sixth tube end is a different tube end than the fifth tube end,
the first tube extends or projects in a first direction from the center portion to the first tube end,
the second tube extends or projects in a second direction from the center portion to the second tube end,
the third tube extends or projects in a third direction from the center portion to the third tube end,
the fourth tube extends or projects in a fourth direction from the center portion to the fourth tube end,
the fifth tube extends or projects in a fifth direction from the center portion to the fifth tube end,
the sixth tube extends or projects in a sixth direction from the center portion to the sixth tube end,
the first direction is a different direction than the second direction,
the first direction is a different direction than the third direction,
the first direction is a different direction than the fourth direction,
the second direction is a different direction than the third direction,
the second direction is a different direction than the fourth direction,
the third direction is a different direction than the fourth direction,
the fifth direction is a different direction than the first direction,
the fifth direction is a different direction than the second direction,
the fifth direction is a different direction than the third direction,
the fifth direction is a different direction than the fourth direction,
the sixth direction is a different direction than the first direction,
the sixth direction is a different direction than the second direction,
the sixth direction is a different direction than the third direction,
the sixth direction is a different direction than the fourth direction,
the sixth direction is a different direction than the fifth direction,
the first tube is hollow from the center portion to the first tube end,
the second tube is hollow from the center portion to the second tube end,
the third tube is hollow from the center portion to the third tube end,
the fourth tube is hollow from the center portion to the fourth tube end,
the fifth tube is hollow from the center portion to the fifth tube end,
the sixth tube is hollow from the center portion to the sixth tube end,
the center portion is hollow,
the treat dispensing apparatus is hollow from each and every tube end through the center portion,
said at least one exit hole is located on the center portion, the first tube end is open to an ambient external environment, the first tube extends or projects in the first direction substantially along a first axis, the second tube extends or projects in the first direction substantially along the first axis, the first tube and the second tube extend or project in approximately opposite directions, the third tube extends or projects in the third direction substantially along a third axis, the third axis is approximately perpendicular to the first axis, the fourth tube extends or projects in the fourth direction substantially along a fourth axis, the fourth axis is approximately perpendicular to the first axis, the fifth tube extends or projects in the fifth direction substantially along a fifth axis, the fifth axis is approximately perpendicular to the first axis, the sixth tube extends or projects in the sixth direction substantially along a sixth axis, the sixth axis is approximately or exactly perpendicular to the first axis, and the first tube, the second tube, the third tube, the fourth tube, the fifth tube, the sixth tube, the first tube end, the second tube end, the third tube end, the fourth tube end, the fifth tube end, the sixth tube end and the center portion are a single non-disconnectable piece.

2. The treat dispensing apparatus according to claim 1, wherein the internal circumference of said first tube is at least 0.875 inches, the internal circumference of said second tube is at least 0.875 inches, the internal circumference of said third tube is at least 0.875 inches, the internal circumference of said fourth tube is at least 0.875 inches, the internal circumference of said fifth tube is at least 0.875 inches, and the internal circumference of said sixth tube is at least 0.875 inches.

3. The treat dispensing apparatus according to claim 1, wherein the internal circumference of said first tube is at least 0.875 inches, the internal circumference of said second tube is at least 0.875 inches, the internal circumference of said third tube is at least 0.875 inches, the internal circumference of said fourth tube is at least 0.875 inches, the internal circumference of said fifth tube is at least 0.875 inches, the internal circumference of said sixth tube is at least 0.875 inches, and the circumference of said at least one exit hole is at least 0.375 inches.

4. The treat dispensing apparatus according to claim 1, wherein the second tube end is completely closed to the ambient external environment, the third tube end is completely closed to the ambient external environment, the fourth tube end is completely closed to the ambient external environment, the fifth tube end is completely closed to the ambient external environment, and the sixth tube end is completely closed to the ambient external environment.

5. The treat dispensing apparatus according to claim 1, further comprising:

a first connecting tube or member directly connecting the first tube to the second tube;

a second connecting tube or member directly connecting the first tube to the third tube, a third connecting tube or member directly connecting the first tube to the fourth tube, a fourth connecting tube or member directly connecting the first tube to the fifth tube, a fifth connecting tube or member directly connecting the second tube to the third tube, a sixth connecting tube or member directly connecting the second tube to the fifth tube, a seventh connecting tube or member directly connecting the second tube to the sixth tube, an eight connecting tube or member directly connecting the third tube to the fourth tube, a ninth connecting tube or member directly connecting the third tube to the sixth tube, a tenth connecting tube or member directly connecting the fourth tube to the fifth tube, an eleventh connecting tube or member directly connecting the fourth tube to the sixth tube, and a twelfth connecting tube or member directly connecting the fifth tube to the sixth tube.

6. A treat dispensing system, the treat dispensing system comprising:

the treat dispensing apparatus according to claim 1; and a container configured to encapsulate the treat dispensing apparatus, wherein the container includes a first structural piece;

a second structural piece; and a first exit port hole, wherein the first structural piece is a structure that is separate from the second structural piece, the first structural piece is a structure that is separate from the treat dispensing apparatus, the second structural piece is a structure that is separate from the treat dispensing apparatus, the first exit port hole is located on either the first structural piece or the second structural piece, and the first exit port hole aligns with the first tube end creating an opening in the case that the container encapsulates the treat dispensing apparatus.

7. A treat dispensing system, the treat dispensing system comprising:

the treat dispensing apparatus according to claim 1; and a container configured to encapsulate the treat dispensing apparatus, wherein the container includes a first structural piece;

a second structural piece;

a first exit port hole; and a second exit port hole, wherein the first structural piece is a structure that is separate from the second structural piece, the first structural piece is a structure that is separate from the treat dispensing apparatus, the second structural piece is a structure that is separate from the treat dispensing apparatus, the first exit port hole is located on either the first structural piece or the second structural piece, the second exit port hole is located on either the first structural piece or the second structural piece, the first structural piece includes either the first exit port hole or the second exit port hole, the second structural piece includes either the first exit port hole or the second exit port hole, and the first exit port hole aligns with the first tube end creating an opening in the case that the container encapsulates the treat dispensing apparatus.

8. A treat dispensing apparatus for dispensing treats and/or food to a pet, the treat dispensing apparatus comprising:

a first extending member;
a first extending member end;
a second extending member;
a second extending member end;
a third extending member;
a third extending member end;
a fourth extending member;
a fourth extending member end;
a fifth extending member;
a fifth extending member end;
a sixth extending member;
a sixth extending member end;
a center portion;
a first closing and/or sealing member configured to close and/or seal the first extending member end; and
at least one exit hole for allowing a treat to pass through said at least one exit hole, wherein
the center portion is connected to the first extending member,
the center portion is connected to the second extending member,
the center portion is connected to the third extending member,
the center portion is connected to the fourth extending member,
the center portion is connected to the fifth extending member,
the center portion is connected to the sixth extending member,
the center portion is located between the first extending member, the second extending member, the third extending member, the fourth extending member, the fifth extending member and the sixth extending member,
the first extending member is a different extending member than the second extending member,
the first extending member is a different extending member than the third extending member,
the first extending member is a different extending member than the fourth extending member,
the second extending member is a different extending member than the third extending member,
the second extending member is a different extending member than the fourth extending member,
the third extending member is a different extending member than the fourth extending member,
the fifth extending member is a different extending member than the first extending member,
the fifth extending member is a different extending member than the second extending member,
the fifth extending member is a different extending member than the third extending member,
the fifth extending member is a different extending member than the fourth extending member,
the sixth extending member is a different extending member than the first extending member,
the sixth extending member is a different extending member than the second extending member,
the sixth extending member is a different extending member than the third extending member,
the sixth extending member is a different extending member than the fourth extending member,
the sixth extending member is a different extending member than the fifth extending member,
the first extending member end is a different extending member end than the second extending member end,
the first extending member end is a different extending member end than the third extending member end,
the first extending member end is a different extending member end than the fourth extending member end,
the second extending member end is a different extending member end than the third extending member end,
the second extending member end is a different extending member end than the fourth extending member end,
the third extending member end is a different extending member end than the fourth extending member end,
the fifth extending member end is a different extending member end than the first extending member end,
the fifth extending member end is a different extending member end than the second extending member end,
the fifth extending member end is a different extending member end than the third extending member end,
the fifth extending member end is a different extending member end than the fourth extending member end
the sixth extending member end is a different extending member end than the first extending member end,
the sixth extending member end is a different extending member end than the second extending member end,
the sixth extending member end is a different extending member end than the third extending member end,
the sixth extending member end is a different extending member end than the fourth extending member end,
the sixth extending member end is a different extending member end than the fifth extending member end,
the first extending member extends or projects in a first direction from the center portion to the first extending member end,
the second extending member extends or projects in a second direction from the center portion to the second extending member end,
the third extending member extends or projects in a third direction from the center portion to the third extending member end,
the fourth extending member extends or projects in a fourth direction from the center portion to the fourth extending member end,
the fifth extending member extends or projects in a fifth direction from the center portion to the fifth extending member end,
the sixth extending member extends or projects in a sixth direction from the center portion to the sixth extending member end,
the first direction is a different direction than the second direction,
the first direction is a different direction than the third direction,
the first direction is a different direction than the fourth direction,
the second direction is a different direction than the third direction,
the second direction is a different direction than the fourth direction, the third direction is a different direction than the fourth direction,
the fifth direction is a different direction than the first direction,
the fifth direction is a different direction than the second direction,
the fifth direction is a different direction than the third direction,
the fifth direction is a different direction than the fourth direction,
the sixth direction is a different direction than the first direction,
the sixth direction is a different direction than the second direction,
the sixth direction is a different direction than the third direction,
the sixth direction is a different direction than the fourth direction,
the sixth direction is a different direction than the fifth direction,
the first extending member is hollow from the center portion to the first extending member end,
the second extending member is hollow from the center portion to the second extending member end,
the third extending member is hollow from the center portion to the third extending member end,
the fourth extending member is hollow from the center portion to the fourth extending member end,
the fifth extending member is hollow from the center portion to the fifth extending member end,
the sixth extending member is hollow from the center portion to the sixth extending member end,
the center portion is hollow,
the treat dispensing apparatus is hollow from each and every extending member end through the center portion,
said at least one exit hole is located on the center portion,
the first extending member end is open to an ambient external environment,
the first extending member extends or projects in the first direction substantially along a first axis,
the second extending member extends or projects in the first direction substantially along the first axis,
the first extending member and the second extending member extend or project in approximately opposite directions, the third extending member extends or projects in the third direction substantially along a third axis, the third axis is approximately perpendicular to the first axis, the fourth extending member extends or projects in the fourth direction substantially along a fourth axis, the fourth axis is approximately perpendicular to the first axis, the fifth extending member extends or projects in the fifth direction substantially along a fifth axis, the fifth axis is approximately perpendicular to the first axis, the sixth extending member extends or projects in the sixth direction substantially along a sixth axis, the sixth axis is approximately perpendicular to the first axis, and
the first extending member, the second extending member, the third extending member, the fourth extending member, the fifth extending member, the sixth extending member, the first extending member end, the second extending member end, the third extending member end, the fourth extending member end, the fifth extending member end, the sixth extending member end and the center portion are a single non-disconnectable piece.

9. The treat dispensing apparatus according to claim 8, wherein
the internal circumference of said first extending member is at least 0.875 inches,
the internal circumference of said second extending member is at least 0.875 inches,
the internal circumference of said third extending member is at least 0.875 inches,
the internal circumference of said fourth extending member is at least 0.875 inches,
the internal circumference of said fifth extending member is at least 0.875 inches, and
the internal circumference of said sixth extending member is at least 0.875 inches.

10. The treat dispensing apparatus according to claim 8, wherein
the internal circumference of said first extending member is at least 0.875 inches,
the internal circumference of said second extending member is at least 0.875 inches,
the internal circumference of said third extending member is at least 0.875 inches,
the internal circumference of said fourth extending member is at least 0.875 inches,
the internal circumference of said fifth extending member is at least 0.875 inches,
the internal circumference of said sixth extending member is at least 0.875 inches, and
the circumference of said at least one exit hole is at least 0.375 inches.

11. The treat dispensing apparatus according to claim 8, wherein
the second extending member end is completely closed to the ambient external environment,
the third extending member end is completely closed to the ambient external environment,
the fourth extending member end is completely closed to the ambient external environment,
the fifth extending member end is completely closed to the ambient external environment, and
the sixth extending member end is completely closed to the ambient external environment.

12. The treat dispensing apparatus according to claim 8, further comprising:
a first connecting tube or member directly connecting the first extending member to the second extending member;
a second connecting tube or member directly connecting the first extending member to the third extending member,
a third connecting tube or member directly connecting the first extending member to the fourth extending member,
a fourth connecting tube or member directly connecting the first extending member to the fifth extending member,
a fifth connecting tube or member directly connecting the second extending member to the third extending member,
a sixth connecting tube or member directly connecting the second extending member to the fifth extending member,
a seventh connecting tube or member directly connecting the second extending member to the sixth extending member, an eight connecting tube or member directly connecting the third extending member to the fourth extending member,
a ninth connecting tube or member directly connecting the third extending member to the sixth extending member,
a tenth connecting tube or member directly connecting the fourth extending member to the fifth extending member,
an eleventh connecting tube or member directly connecting the fourth extending member to the sixth extending member, and
a twelfth connecting tube or member directly connecting the fifth extending member to the sixth extending member.

13. A treat dispensing system, the treat dispensing system comprising:
the treat dispensing apparatus according to claim 8; and
a container configured to encapsulate the treat dispensing apparatus,
wherein the container includes
a first structural piece;
a second structural piece; and
a first exit port hole, wherein
the first structural piece is a structure that is separate from the second structural piece,
the first structural piece is a structure that is separate from the treat dispensing apparatus,
the second structural piece is a structure that is separate from the treat dispensing apparatus,
the first exit port hole is located on either the first structural piece or the second structural piece, and
the first exit port hole aligns with the first extending member end creating an opening in the case that the container encapsulates the treat dispensing apparatus.

14. A treat dispensing system, the treat dispensing system comprising:
the treat dispensing apparatus according to claim 8; and
a container configured to encapsulate the treat dispensing apparatus,
wherein the container includes
a first structural piece;
a second structural piece;
a first exit port hole; and
a second exit port hole, wherein
the first structural piece is a structure that is separate from the second structural piece,
the first structural piece is a structure that is separate from the treat dispensing apparatus,
the second structural piece is a structure that is separate from the treat dispensing apparatus,
the first exit port hole is located on either the first structural piece or the second structural piece,
the second exit port hole is located on either the first structural piece or the second structural piece,
the first structural piece includes either the first exit port hole or the second exit port hole,
the second structural piece includes either the first exit port hole or the second exit port hole, and
the first exit port hole aligns with the first extending member end creating an opening in the case that the container encapsulates the treat dispensing apparatus.

* * * * *